(12) United States Patent
Khaldi et al.

US012491230B2

(10) Patent No.: US 12,491,230 B2
(45) Date of Patent: Dec. 9, 2025

(54) PEPTIDES FOR USE IN PROMOTING TRANSPORT OF GLUCOSE

(71) Applicant: NURITAS LIMITED, South Dublin (IE)

(72) Inventors: Nora Khaldi, Dublin (IE); Cyril Lopez, Dublin (IE)

(73) Assignee: NURITAS LIMITED, South Dublin (IE)

( * ) Notice: Subject to any disclaimer, the term of this patent is extended or adjusted under 35 U.S.C. 154(b) by 398 days.

(21) Appl. No.: 17/141,778

(22) Filed: Jan. 5, 2021

(65) Prior Publication Data

US 2021/0196784 A1 Jul. 1, 2021

Related U.S. Application Data

(63) Continuation of application No. 15/744,403, filed as application No. PCT/EP2016/067098 on Jul. 18, 2016, now abandoned.

(30) Foreign Application Priority Data

Jul. 16, 2015 (EP) .................................... 15177018

(51) Int. Cl.
| | |
|---|---|
| *A61K 38/10* | (2006.01) |
| *A23L 33/18* | (2016.01) |
| *A61K 8/9789* | (2017.01) |
| *A61K 8/9794* | (2017.01) |
| *A61K 9/14* | (2006.01) |
| *A61K 38/00* | (2006.01) |
| *A61K 38/08* | (2019.01) |
| *A61P 3/10* | (2006.01) |
| *C07K 7/06* | (2006.01) |
| *C07K 7/08* | (2006.01) |
| *C07K 14/415* | (2006.01) |

(52) U.S. Cl.
CPC ............ *A61K 38/10* (2013.01); *A23L 33/18* (2016.08); *A61K 8/9789* (2017.08); *A61K 8/9794* (2017.08); *A61K 9/14* (2013.01); *A61K 38/08* (2013.01); *A61P 3/10* (2018.01); *C07K 7/06* (2013.01); *C07K 7/08* (2013.01); *C07K 14/415* (2013.01); *A23V 2002/00* (2013.01); *A61K 38/00* (2013.01)

(58) Field of Classification Search
None
See application file for complete search history.

(56) References Cited

U.S. PATENT DOCUMENTS

| | | |
|---|---|---|
| 5,516,642 A | 5/1996 | Mapelli et al. |
| 5,520,935 A | 5/1996 | Eriksen et al. |
| 5,837,218 A | 11/1998 | Peers et al. |
| 9,561,266 B2 | 2/2017 | Hunt et al. |
| 2004/0031072 A1 | 2/2004 | La Rosa et al. |
| 2004/0123343 A1 | 6/2004 | La Rosa et al. |
| 2011/0214199 A1 | 9/2011 | Coffin |
| 2015/0174192 A1 | 6/2015 | Georgi et al. |
| 2016/0158143 A1 | 6/2016 | Gan et al. |
| 2018/0291070 A1 | 10/2018 | Khaldi et al. |

FOREIGN PATENT DOCUMENTS

| | | |
|---|---|---|
| EP | 2039366 A1 | 3/2009 |
| EP | 1896496 B1 | 1/2012 |
| JP | H07224093 A | 8/1995 |
| JP | 2001335596 A | 12/2001 |
| WO | 2002084250 A2 | 10/2002 |
| WO | 2004042026 A2 | 5/2004 |
| WO | 2007094570 A1 | 8/2007 |
| WO | 2008131008 A2 | 10/2008 |
| WO | 2009026622 A1 | 3/2009 |
| WO | 2011122937 A1 | 10/2011 |
| WO | 2013092851 A1 | 6/2013 |

OTHER PUBLICATIONS

Merriam-Webster, "Definition of comestible," available online at https://www.merriam-webster.com/dictionary/comestible, 12 pages (accessible on Jun. 5, 2019) (Year: 2019).*
UniProt Accession No. P13918, 2 pages (2010) (Year: 2010).*
NCBI Database, GenBank Accession No. OXB77465, 6 pages (2017) (Year: 2017).*
Texas Health Resources article (See Texas Health Resources, "Pea is for Protein: What You Need to Know About Pea Protein Powder," available online at https://areyouawellbeing.texashealth.org/pea-protein-need-know-pea-protein-powder/, 7 pages (2017) (Year: 2017).*
Watson et al (Biochem. J., 1988, 251, pp. 857-864) (Year: 1988).*
Kircik et al. "Vehicles Matter Part I: Formulation Development, Testing, and Approval." Supplement to Practical Dermatology pp. 1-16 (2010).
Drumm et al., "Genetic Variation and Clinical Heterogeneity in Cystic Fibrosis", Annu. Rev. Pathol. Mech. Dis., 267-282, (2012).
Yampolsky et al., "The Exchangeability of Amino Acids in Proteins", Genetics, 170, 1459-1472, (2005).
Geneseq Database Accession No. AAO05687, "Human polypeptide SEQ ID No. 19579", (2001).
Geneseq Database Accession No. ABB05466, "Polypeptide with growth hormone production increasing activity SEQ ID: 21", (2002).
Geneseq Database Accession No. AJE68402, "Human bone sialoprotein peptide SEQ ID No. 33", (2008).
Niehues et al. "Peptides from *Pisum sativum* L. enzymatic protein digest with anti-adhesive activity against Helicobacter pylori: Structure-activity and inhibitory activity against BabA, SabA, HpaA and a fibronectin-binding adhesin." Molecular Nutrition & Food Research 54(12): 1851-1861 (2010).

(Continued)

*Primary Examiner* — Thea D'Ambrosio
(74) *Attorney, Agent, or Firm* — Nixon Peabody LLP; David S. Resnick; Ravinderjit S. Braich

(57) ABSTRACT

A natural glucose transport promoting peptide comprising a glucose transport promoting fragment of a protein selected from SEQ ID NOs: 1 to 6, and a composition comprising a plurality of glucose transport promoting peptides, is described. Also disclosed is the use of the peptides and compositions in improving muscle status in a mammal, especially promoting recovery of muscle following exercise or enhancing physical performance.

12 Claims, 3 Drawing Sheets
Specification includes a Sequence Listing.

(56) References Cited

OTHER PUBLICATIONS

Geneseq Database Accession No. ANM73492, "Oryza sativa amino acid sequence Seq ID No. 187493", (2007).
Geneseq Database Accession No. AWH80057, "Human PHLDA1 protein PH domain peptide, Seq ID 414", (2009).
Geneseq Database Acession No. AFP68974 XP-002789557 "Glycline max protein Seq ID No. 160152" (2007).
Geneseq Database Acession No. AD043092 XP-002756637 "Cashew nut major allergen Ana o 2 peptide fragment" (2004).
Kipp et al., "Comparative studies of high M (r) subunits of rye and wheat. II. Partial amino acid sequences." Journal of Cereal Science 30:303-313 (1999).
Tong et al., "Rice a-globulin decreases serum cholesterol concentrations in rats fed a hypercholesterolemic diet and ameliorates atherosclerotic lesions in apolipoprotein E-deficient mice", Food Chemistry 132:194-200 (2012).
Uniprot Database Accession No. P29835 (1993).
Definition of SERUM by Merriam-Webster, from https://merriam-webster.com/dictionary/serum, pp. 1-2 accessed May 8, 2019.
What is a humectant, from https://www.annmariegianni.com/what-is-a-humectant-and-which-natural-ones-to-look-for-in-anti-aging-products/, pp. 1-7 accessed May 8, 2019.
Water, from http://biology-online.org/dictionary/Water, pp. 1-3 accessed Apr. 24, 2014.
Human Ribosomal protein S6 kinase beta-1, from https://www.uniprot.org/uniprot/P23443, pp. 1-24 accessed May 2, 2019.
Wang et al., "Ana o 2, a Major Cashew (Anacardium occidentale L.) Nut Allergen of the Legumin Family" Int Arch Allergy Immunol 132(1): 27-39 (2003).
Definition of COMESTIBLE by Merriam-Webster, from https://merriam-webster.com/dictionary/comestible, 12 Pages, accessed Jun. 5, 2019.
Texas Health Resources Article "Pea is for Protein: What You Need to Know About Pea Protein Powder," Available online at https://areyouwellbeing.texashealth.org/pea-protein-need-know-pea-protein-powder/, 7 pages (2017).
Lammi et al., "Three Peptides from Soy Glycinin Modulate Glucose Metabolism in Human Hepatic HepG2 Cells", International Journal of Molecular Sciences 16:27362-27370 (2015).
Pak et al., "Design of a highly potent inhibitory peptide acting as a competitive inhibitor of HMG-CoA reductase", Amino Acids 43(5):2015-2025 (2012).
Shibata et al., "Dissection of GLUT4 Recycling Pathway into Exocytosis and Endocytosis in Rat Adipocytes: Evidence That Gtp-Binding Proteins Are Involved in Both Processes", The Journal of Biological Chemistry 270(19):11489-11495 (1995).
Stagsted et al., "Amino acid residues essential for biological activity of a peptide derived from a major histocompatibility complex class I antigen", Proceedings of the National Academy of Sciences 90:7686-7690 (1993).
Uniprot Database Accession No. P13918 (1990).
Watson et al., "Isolation and expression of a pea vicilin cDNA in the yeast Saccharomyces cerevisiae", Biochemical Journal 251:857-864 (1988).
Hughes et al., "Characterization of authentic recombinant pea-seed lipoxygenases with distinct properties and reaction mechanisms", Biochemical Journal, 333, (1.), 33-43 (1998).
Sequence Listing XP-002794154 (2019).

\* cited by examiner

SEQUENCE LISTING

<160> NUMBER OF SEQ ID NOS: 237

<210> SEQ ID NO 1
<211> LENGTH: 459
<212> TYPE: PRT
<213> ORGANISM: Pisum sativum

<400> SEQUENCE: 1

Met Ala Ala Thr Thr Met Lys Ala Ser Phe Pro Leu Leu Met Leu Met
1               5                   10                  15

Gly Ile Ser Phe Leu Ala Ser Val Cys Val Ser Ser Arg Ser Asp Pro
            20                  25                  30

Gln Asn Pro Phe Ile Phe Lys Ser Asn Lys Phe Gln Thr Leu Phe Glu
        35                  40                  45

Asn Glu Asn Gly His Ile Arg Leu Leu Gln Lys Phe Asp Gln Arg Ser
    50                  55                  60

Lys Ile Phe Glu Asn Leu Gln Asn Tyr Arg Leu Leu Glu Tyr Lys Ser
65                  70                  75                  80

Lys Pro His Thr Ile Phe Leu Pro Gln His Thr Asp Ala Asp Tyr Ile
                85                  90                  95

Leu Val Val Leu Ser Gly Lys Ala Ile Leu Thr Val Leu Lys Pro Asp
            100                 105                 110

Asp Arg Asn Ser Phe Asn Leu Glu Arg Gly Asp Thr Ile Lys Leu Pro
        115                 120                 125

Ala Gly Thr Ile Ala Tyr Leu Val Asn Arg Asp Asp Asn Glu Glu Leu
    130                 135                 140

Arg Val Leu Asp Leu Ala Ile Pro Val Asn Arg Pro Gly Gln Leu Gln
145                 150                 155                 160

Ser Phe Leu Leu Ser Gly Asn Gln Asn Gln Gln Asn Tyr Leu Ser Gly
                165                 170                 175

Phe Ser Lys Asn Ile Leu Glu Ala Ser Phe Asn Thr Asp Tyr Glu Glu
            180                 185                 190

Ile Glu Lys Val Leu Leu Glu Glu His Glu Lys Glu Thr Gln His Arg
        195                 200                 205

-continued

```
Arg Ser Leu Lys Asp Lys Arg Gln Gln Ser Gln Glu Glu Asn Val Ile
    210             215                 220

Val Lys Leu Ser Arg Gly Gln Ile Glu Glu Leu Ser Lys Asn Ala Lys
225             230                 235                 240

Ser Thr Ser Lys Lys Ser Val Ser Ser Glu Ser Glu Pro Phe Asn Leu
                245                 250                 255

Arg Ser Arg Gly Pro Ile Tyr Ser Asn Glu Phe Gly Lys Phe Phe Glu
                260                 265                 270

Ile Thr Pro Glu Lys Asn Pro Gln Leu Gln Asp Leu Asp Ile Phe Val
                275                 280                 285

Asn Ser Val Glu Ile Lys Glu Gly Ser Leu Leu Leu Pro His Tyr Asn
290                 295                 300

Ser Arg Ala Ile Val Ile Val Thr Val Asn Glu Gly Lys Gly Asp Phe
305                 310                 315                 320

Glu Leu Val Gly Gln Arg Asn Glu Asn Gln Gln Glu Gln Arg Lys Glu
                325                 330                 335

Asp Asp Glu Glu Glu Gln Gly Glu Glu Ile Asn Lys Gln Val
                340                 345                 350

Gln Asn Tyr Lys Ala Lys Leu Ser Ser Gly Asp Val Phe Val Ile Pro
                355                 360                 365

Ala Gly His Pro Val Ala Val Lys Ala Ser Ser Asn Leu Asp Leu Leu
370                 375                 380

Gly Phe Gly Ile Asn Ala Glu Asn Asn Gln Arg Asn Phe Leu Ala Gly
385                 390                 395                 400

Asp Glu Asp Asn Val Ile Ser Gln Ile Gln Arg Pro Val Lys Glu Leu
                405                 410                 415

Ala Phe Pro Gly Ser Ala Gln Glu Val Asp Arg Ile Leu Glu Asn Gln
                420                 425                 430

Lys Gln Ser His Phe Ala Asp Ala Gln Pro Gln Gln Arg Glu Arg Gly
                435                 440                 445

Ser Arg Glu Thr Arg Asp Arg Leu Ser Ser Val
                450                 455
```

<210> SEQ ID NO 2
<211> LENGTH: 613
<212> TYPE: PRT
<213> ORGANISM: Pisum sativum

<400> SEQUENCE: 2

```
Met Ala Thr Thr Ile Lys Ser Arg Phe Pro Leu Leu Leu Leu Leu Gly
1               5                   10                  15

Ile Ile Phe Leu Ala Ser Val Val Cys Val Thr Tyr Ala Asn Tyr Asp
                20                  25                  30

Glu Gly Ser Glu Pro Arg Val Pro Ala Gln Arg Glu Arg Gly Arg Gln
            35                  40                  45

Glu Gly Glu Lys Glu Glu Lys Arg His Gly Glu Trp Arg Pro Ser Tyr
        50                  55                  60

Glu Lys Glu Glu Asp Glu Glu Glu Gly Gln Arg Glu Arg Gly Arg Gln
65                  70                  75                  80

Glu Gly Glu Lys Glu Glu Lys Arg His Gly Glu Trp Arg Pro Ser Tyr
                85                  90                  95

Glu Lys Gln Glu Asp Glu Glu Glu Lys Gln Lys Tyr Arg Tyr Gln Arg
                100                 105                 110

Glu Lys Glu Asp Glu Glu Glu Lys Gln Lys Tyr Gln Tyr Gln Arg Glu
```

-continued

```
            115                 120                 125
Lys Lys Glu Gln Lys Glu Val Gln Pro Gly Arg Glu Arg Trp Glu Arg
            130                 135                 140

Glu Glu Asp Glu Glu Gln Val Asp Glu Glu Trp Arg Gly Ser Gln Arg
145                 150                 155                 160

Arg Glu Asp Pro Glu Arg Ala Arg Leu Arg His Arg Glu Glu Arg
                    165                 170                 175

Thr Lys Arg Asp Arg Arg His Gln Arg Glu Gly Glu Glu Glu Arg
                    180                 185                 190

Ser Ser Glu Ser Gln Glu Arg Arg Asn Pro Phe Leu Phe Lys Ser Asn
                195                 200                 205

Lys Phe Leu Thr Leu Phe Glu Asn Glu Asn Gly His Ile Arg Leu Leu
210                 215                 220

Gln Arg Phe Asp Lys Arg Ser Asp Leu Phe Glu Asn Leu Gln Asn Tyr
225                 230                 235                 240

Arg Leu Val Glu Tyr Arg Ala Lys Pro His Thr Ile Phe Leu Pro Gln
                    245                 250                 255

His Ile Asp Ala Asp Leu Ile Leu Val Val Leu Ser Gly Lys Ala Ile
                260                 265                 270

Leu Thr Val Leu Ser Pro Asn Asp Arg Asn Ser Tyr Asn Leu Glu Arg
                275                 280                 285

Gly Asp Thr Ile Lys Leu Pro Ala Gly Thr Thr Ser Tyr Leu Val Asn
290                 295                 300

Gln Asp Asp Glu Glu Asp Leu Arg Leu Val Asp Leu Ile Pro Val
305                 310                 315                 320

Asn Gly Pro Gly Lys Phe Glu Ala Phe Asp Leu Ala Lys Asn Lys Asn
                    325                 330                 335

Gln Tyr Leu Arg Gly Phe Ser Lys Asn Ile Leu Glu Ala Ser Tyr Asn
                340                 345                 350

Thr Arg Tyr Glu Thr Ile Glu Lys Val Leu Leu Glu Glu Gln Glu Lys
                355                 360                 365

Asp Arg Lys Arg Arg Gln Gln Gly Glu Glu Thr Asp Ala Ile Val Lys
370                 375                 380

Val Ser Arg Glu Gln Ile Glu Glu Leu Lys Lys Leu Ala Lys Ser Ser
385                 390                 395                 400

Ser Lys Lys Ser Leu Pro Ser Glu Phe Glu Pro Ile Asn Leu Arg Ser
                    405                 410                 415

His Lys Pro Glu Tyr Ser Asn Lys Phe Gly Lys Leu Phe Glu Ile Thr
                420                 425                 430

Pro Glu Lys Lys Tyr Pro Gln Leu Gln Asp Leu Asp Leu Phe Val Ser
                435                 440                 445

Cys Val Glu Ile Asn Glu Gly Ala Leu Met Leu Pro His Tyr Asn Ser
450                 455                 460

Arg Ala Ile Val Val Leu Leu Val Asn Glu Gly Lys Gly Asn Leu Glu
465                 470                 475                 480

Leu Leu Gly Leu Lys Asn Glu Gln Gln Glu Arg Glu Asp Arg Lys Glu
                    485                 490                 495

Arg Asn Asn Glu Val Gln Arg Tyr Glu Ala Arg Leu Ser Pro Gly Asp
                500                 505                 510

Val Val Ile Ile Pro Ala Gly His Pro Val Ala Ile Thr Ala Ser Ser
                515                 520                 525

Asn Leu Asn Leu Leu Gly Phe Gly Ile Asn Ala Glu Asn Asn Glu Arg
530                 535                 540
```

-continued

Asn Phe Leu Ser Gly Ser Asp Asp Asn Val Ile Ser Gln Ile Glu Asn
545                 550                 555                 560

Pro Val Lys Glu Leu Thr Phe Pro Gly Ser Val Gln Glu Ile Asn Arg
            565                 570                 575

Leu Ile Lys Asn Gln Lys Gln Ser His Phe Ala Asn Ala Glu Pro Glu
        580                 585                 590

Gln Lys Glu Gln Gly Ser Gln Gly Lys Arg Ser Pro Leu Ser Ser Ile
    595                 600                 605

Leu Gly Thr Phe Tyr
    610

<210> SEQ ID NO 3
<211> LENGTH: 609
<212> TYPE: PRT
<213> ORGANISM: Oryza sativa

<400> SEQUENCE: 3

Met Ser Ala Leu Thr Thr Ser Gln Leu Ala Thr Ser Ala Thr Gly Phe
1               5                   10                  15

Gly Ile Ala Asp Arg Ser Ala Pro Ser Ser Leu Leu Arg His Gly Phe
            20                  25                  30

Gln Gly Leu Lys Pro Arg Ser Pro Ala Gly Gly Asp Ala Thr Ser Leu
        35                  40                  45

Ser Val Thr Thr Ser Ala Arg Ala Thr Pro Lys Gln Gln Arg Ser Val
    50                  55                  60

Gln Arg Gly Ser Arg Arg Phe Pro Ser Val Val Val Tyr Ala Thr Gly
65                  70                  75                  80

Ala Gly Met Asn Val Val Phe Val Gly Ala Glu Met Ala Pro Trp Ser
                85                  90                  95

Lys Thr Gly Gly Leu Gly Asp Val Leu Gly Gly Leu Pro Pro Ala Met
            100                 105                 110

Ala Ala Asn Gly His Arg Val Met Val Ile Ser Pro Arg Tyr Asp Gln
        115                 120                 125

Tyr Lys Asp Ala Trp Asp Thr Ser Val Val Ala Glu Ile Lys Val Ala
    130                 135                 140

Asp Arg Tyr Glu Arg Val Arg Phe Phe His Cys Tyr Lys Arg Gly Val
145                 150                 155                 160

Asp Arg Val Phe Ile Asp His Pro Ser Phe Leu Glu Lys Val Trp Gly
                165                 170                 175

Lys Thr Gly Glu Lys Ile Tyr Gly Pro Asp Thr Gly Val Asp Tyr Lys
            180                 185                 190

Asp Asn Gln Met Arg Phe Ser Leu Leu Cys Gln Ala Ala Leu Glu Ala
        195                 200                 205

Pro Arg Ile Leu Asn Leu Asn Asn Asn Pro Tyr Phe Lys Gly Thr Tyr
    210                 215                 220

Gly Glu Asp Val Val Phe Val Cys Asn Asp Trp His Thr Gly Pro Leu
225                 230                 235                 240

Ala Ser Tyr Leu Lys Asn Asn Tyr Gln Pro Asn Gly Ile Tyr Arg Asn
                245                 250                 255

Ala Lys Val Ala Phe Cys Ile His Asn Ile Ser Tyr Gln Gly Arg Phe
            260                 265                 270

Ala Phe Glu Asp Tyr Pro Glu Leu Asn Leu Ser Glu Arg Phe Arg Ser
        275                 280                 285

Ser Phe Asp Phe Ile Asp Gly Tyr Asp Thr Pro Val Glu Gly Arg Lys

```
            290                 295                 300
Ile Asn Trp Met Lys Ala Gly Ile Leu Glu Ala Asp Arg Val Leu Thr
305                 310                 315                 320

Val Ser Pro Tyr Tyr Ala Glu Glu Leu Ile Ser Gly Ile Ala Arg Gly
                325                 330                 335

Cys Glu Leu Asp Asn Ile Met Arg Leu Thr Gly Ile Thr Gly Ile Val
            340                 345                 350

Asn Gly Met Asp Val Ser Glu Trp Asp Pro Ser Lys Asp Lys Tyr Ile
        355                 360                 365

Thr Ala Lys Tyr Asp Ala Thr Thr Ala Ile Glu Ala Lys Ala Leu Asn
    370                 375                 380

Lys Glu Ala Leu Gln Ala Glu Ala Gly Leu Pro Val Asp Arg Lys Ile
385                 390                 395                 400

Pro Leu Ile Ala Phe Ile Gly Arg Leu Glu Glu Gln Lys Gly Pro Asp
                405                 410                 415

Val Met Ala Ala Ala Ile Pro Glu Leu Met Gln Glu Asp Val Gln Ile
            420                 425                 430

Val Leu Leu Gly Thr Gly Lys Lys Lys Phe Glu Lys Leu Leu Lys Ser
        435                 440                 445

Met Glu Glu Lys Tyr Pro Gly Lys Val Arg Ala Val Val Lys Phe Asn
    450                 455                 460

Ala Pro Leu Ala His Leu Ile Met Ala Gly Ala Asp Val Leu Ala Val
465                 470                 475                 480

Pro Ser Arg Phe Glu Pro Cys Gly Leu Ile Gln Leu Gln Gly Met Arg
                485                 490                 495

Tyr Gly Thr Pro Cys Ala Cys Ala Ser Thr Gly Gly Leu Val Asp Thr
            500                 505                 510

Val Ile Glu Gly Lys Thr Gly Phe His Met Gly Arg Leu Ser Val Asp
        515                 520                 525

Cys Lys Val Val Glu Pro Ser Asp Val Lys Lys Val Ala Ala Thr Leu
    530                 535                 540

Lys Arg Ala Ile Lys Val Val Gly Thr Pro Ala Tyr Glu Glu Met Val
545                 550                 555                 560

Arg Asn Cys Met Asn Gln Asp Leu Ser Trp Lys Gly Pro Ala Lys Asn
                565                 570                 575

Trp Glu Asn Val Leu Leu Gly Leu Gly Val Ala Gly Ser Ala Pro Gly
            580                 585                 590

Ile Glu Gly Asp Glu Ile Ala Pro Leu Ala Lys Glu Asn Val Ala Ala
        595                 600                 605

Pro

<210> SEQ ID NO 4
<211> LENGTH: 499
<212> TYPE: PRT
<213> ORGANISM: Oryza sativa

<400> SEQUENCE: 4

Met Ala Ser Ser Val Phe Ser Arg Phe Ser Ile Tyr Phe Cys Val Leu
1               5                   10                  15

Leu Leu Cys His Gly Ser Met Ala Gln Leu Phe Asn Pro Ser Thr Asn
                20                  25                  30

Pro Trp His Ser Pro Arg Gln Gly Ser Phe Arg Glu Cys Arg Phe Asp
            35                  40                  45

Arg Leu Gln Ala Phe Glu Pro Leu Arg Lys Val Arg Ser Glu Ala Gly
```

```
            50                  55                  60
Val Thr Glu Tyr Phe Asp Glu Lys Asn Glu Leu Phe Gln Cys Thr Gly
65                  70                  75                  80

Thr Phe Val Ile Arg Arg Val Ile Gln Pro Gln Gly Leu Leu Val Pro
                85                  90                  95

Arg Tyr Thr Asn Ile Pro Gly Val Val Tyr Ile Ile Gln Gly Arg Gly
                    100                 105                 110

Ser Met Gly Leu Thr Phe Pro Gly Cys Pro Ala Thr Tyr Gln Gln Gln
                115                 120                 125

Phe Gln Gln Phe Ser Ser Gln Gly Gln Ser Gln Ser Gln Lys Phe Arg
                130                 135                 140

Asp Glu His Gln Lys Ile His Gln Phe Arg Gln Gly Asp Ile Val Ala
145                 150                 155                 160

Leu Pro Ala Gly Val Ala His Trp Phe Tyr Asn Asp Gly Asp Ala Pro
                    165                 170                 175

Ile Val Ala Val Tyr Val Tyr Asp Val Asn Asn Asn Ala Asn Gln Leu
                180                 185                 190

Glu Pro Arg Gln Lys Glu Phe Leu Leu Ala Gly Asn Asn Arg Ala
                195                 200                 205

Gln Gln Gln Gln Val Tyr Gly Ser Ser Ile Glu Gln His Ser Gly Gln
                210                 215                 220

Asn Ile Phe Ser Gly Phe Gly Val Glu Met Leu Ser Glu Ala Leu Gly
225                 230                 235                 240

Ile Asn Ala Val Ala Ala Lys Arg Leu Gln Ser Gln Asn Asp Gln Arg
                    245                 250                 255

Gly Glu Ile Ile His Val Lys Asn Gly Leu Gln Leu Leu Lys Pro Thr
                260                 265                 270

Leu Thr Gln Gln Gln Glu Gln Ala Gln Ala Gln Asp Gln Tyr Gln Gln
                275                 280                 285

Val Gln Tyr Ser Glu Arg Gln Gln Thr Ser Ser Arg Trp Asn Gly Leu
                290                 295                 300

Glu Glu Asn Phe Cys Thr Ile Lys Val Arg Val Asn Ile Glu Asn Pro
305                 310                 315                 320

Ser Arg Ala Asp Ser Tyr Asn Pro Arg Ala Gly Arg Ile Thr Ser Val
                    325                 330                 335

Asn Ser Gln Lys Phe Pro Ile Leu Asn Leu Ile Gln Met Ser Ala Thr
                340                 345                 350

Arg Val Asn Leu Tyr Gln Asn Ala Ile Leu Ser Pro Phe Trp Asn Val
                355                 360                 365

Asn Ala His Ser Leu Val Tyr Met Ile Gln Gly Arg Ser Arg Val Gln
                370                 375                 380

Val Val Ser Asn Phe Gly Lys Thr Val Phe Asp Gly Val Leu Arg Pro
385                 390                 395                 400

Gly Gln Leu Leu Ile Ile Pro Gln His Tyr Ala Val Leu Lys Lys Ala
                    405                 410                 415

Glu Arg Glu Gly Cys Gln Tyr Ile Ala Ile Lys Thr Asn Ala Asn Ala
                420                 425                 430

Phe Val Ser His Leu Ala Gly Lys Asn Ser Val Phe Arg Ala Leu Pro
                435                 440                 445

Val Asp Val Val Ala Asn Ala Tyr Arg Ile Ser Arg Glu Gln Ala Arg
                450                 455                 460

Ser Leu Lys Asn Asn Arg Gly Glu Glu His Gly Ala Phe Thr Pro Arg
465                 470                 475                 480
```

-continued

```
Phe Gln Gln Gln Tyr Tyr Pro Gly Leu Ser Asn Glu Ser Glu Ser Glu
                485                 490                 495

Thr Ser Glu

<210> SEQ ID NO 5
<211> LENGTH: 500
<212> TYPE: PRT
<213> ORGANISM: Oryza sativa

<400> SEQUENCE: 5

Met Ala Thr Ile Ala Phe Ser Arg Leu Ser Ile Tyr Phe Cys Val Leu
1               5                   10                  15

Leu Leu Cys His Gly Ser Met Ala Gln Leu Phe Gly Pro Asn Val Asn
            20                  25                  30

Pro Trp His Asn Pro Arg Gln Gly Gly Phe Arg Glu Cys Arg Phe Asp
        35                  40                  45

Arg Leu Gln Ala Phe Glu Pro Leu Arg Arg Val Arg Ser Glu Ala Gly
    50                  55                  60

Val Thr Glu Tyr Phe Asp Glu Lys Asn Glu Gln Phe Gln Cys Thr Gly
65                  70                  75                  80

Thr Phe Val Ile Arg Arg Val Ile Glu Pro Gln Gly Leu Leu Val Pro
                85                  90                  95

Arg Tyr Ser Asn Thr Pro Gly Met Val Tyr Ile Ile Gln Gly Arg Gly
            100                 105                 110

Ser Met Gly Leu Thr Phe Pro Gly Cys Pro Ala Thr Tyr Gln Gln Gln
        115                 120                 125

Phe Gln Gln Phe Leu Pro Glu Gly Gln Ser Gln Ser Gln Lys Phe Arg
    130                 135                 140

Asp Glu His Gln Lys Ile His Gln Phe Arg Gln Gly Asp Ile Val Ala
145                 150                 155                 160

Leu Pro Ala Gly Val Ala His Trp Phe Tyr Asn Glu Gly Asp Ala Pro
                165                 170                 175

Val Val Ala Leu Tyr Val Phe Asp Leu Asn Asn Asn Ala Asn Gln Leu
            180                 185                 190

Glu Pro Arg Gln Lys Glu Phe Leu Leu Ala Gly Asn Asn Arg Glu
        195                 200                 205

Gln Gln Met Tyr Gly Arg Ser Ile Glu Gln His Ser Gly Gln Asn Ile
    210                 215                 220

Phe Ser Gly Phe Asn Asn Glu Leu Leu Ser Glu Ala Leu Gly Val Asn
225                 230                 235                 240

Ala Leu Val Ala Lys Arg Leu Gln Gly Gln Asn Asp Gln Arg Gly Glu
                245                 250                 255

Ile Ile Arg Val Lys Asn Gly Leu Lys Leu Leu Arg Pro Ala Phe Ala
            260                 265                 270

Gln Gln Gln Glu Gln Ala Gln Gln Glu Gln Ala Gln Ala Gln Tyr
        275                 280                 285

Gln Val Gln Tyr Ser Glu Glu Gln Pro Ser Thr Arg Cys Asn Gly
    290                 295                 300

Leu Asp Glu Asn Phe Cys Thr Ile Lys Ala Arg Leu Asn Ile Glu Asn
305                 310                 315                 320

Pro Ser His Ala Asp Thr Tyr Asn Pro Arg Ala Gly Arg Ile Thr Arg
                325                 330                 335

Leu Asn Ser Gln Lys Phe Pro Ile Leu Asn Leu Val Gln Leu Ser Ala
            340                 345                 350
```

Thr Arg Val Asn Leu Tyr Gln Asn Ala Ile Leu Ser Pro Phe Trp Asn
            355                 360                 365

Val Asn Ala His Ser Leu Val Tyr Ile Val Gln Gly His Ala Arg Val
    370                 375                 380

Gln Val Val Ser Asn Leu Gly Lys Thr Val Phe Asn Gly Val Leu Arg
385                 390                 395                 400

Pro Gly Gln Leu Leu Ile Ile Pro Gln His Tyr Val Val Leu Lys Lys
                405                 410                 415

Ala Glu His Glu Gly Cys Gln Tyr Ile Ser Phe Lys Thr Asn Ala Asn
                420                 425                 430

Ser Met Val Ser His Leu Ala Gly Lys Asn Ser Ile Phe Arg Ala Met
            435                 440                 445

Pro Val Asp Val Ile Ala Asn Ala Tyr Arg Ile Ser Arg Glu Gln Ala
        450                 455                 460

Arg Ser Leu Lys Asn Asn Arg Gly Glu Glu Leu Gly Ala Phe Thr Pro
465                 470                 475                 480

Arg Tyr Gln Gln Gln Thr Tyr Pro Gly Phe Ser Asn Glu Ser Glu Asn
                485                 490                 495

Glu Ala Leu Glu
            500

<210> SEQ ID NO 6
<211> LENGTH: 499
<212> TYPE: PRT
<213> ORGANISM: Oryza sativa

<400> SEQUENCE: 6

Met Ala Ser Ile Asn Arg Pro Ile Val Phe Phe Thr Val Cys Leu Phe
1               5                   10                  15

Leu Leu Cys Asn Gly Ser Leu Ala Gln Gln Leu Leu Gly Gln Ser Thr
                20                  25                  30

Ser Gln Trp Gln Ser Ser Arg Arg Gly Ser Pro Arg Glu Cys Arg Phe
            35                  40                  45

Asp Arg Leu Gln Ala Phe Glu Pro Ile Arg Ser Val Arg Ser Gln Ala
    50                  55                  60

Gly Thr Thr Glu Phe Phe Asp Val Ser Asn Glu Gln Phe Gln Cys Thr
65                  70                  75                  80

Gly Val Ser Val Val Arg Arg Val Ile Glu Pro Arg Gly Leu Leu Leu
                85                  90                  95

Pro His Tyr Thr Asn Gly Ala Ser Leu Val Tyr Ile Ile Gln Gly Arg
                100                 105                 110

Gly Ile Thr Gly Pro Thr Phe Pro Gly Cys Pro Glu Ser Tyr Gln Gln
            115                 120                 125

Gln Phe Gln Gln Ser Gly Gln Ala Gln Leu Thr Glu Ser Gln Ser Gln
    130                 135                 140

Ser Gln Lys Phe Lys Asp Glu His Gln Lys Ile His Arg Phe Arg Gln
145                 150                 155                 160

Gly Asp Val Ile Ala Leu Pro Ala Gly Val Ala His Trp Cys Tyr Asn
                165                 170                 175

Asp Gly Glu Val Pro Val Val Ala Ile Tyr Val Thr Asp Leu Asn Asn
                180                 185                 190

Gly Ala Asn Gln Leu Asp Pro Arg Gln Arg Asp Phe Leu Leu Ala Gly
            195                 200                 205

Asn Lys Arg Asn Pro Gln Ala Tyr Arg Arg Glu Val Glu Glu Arg Ser

```
            210                 215                 220
Gln Asn Ile Phe Ser Gly Phe Ser Thr Glu Leu Leu Ser Glu Ala Leu
225                 230                 235                 240

Gly Val Ser Ser Gln Val Ala Arg Gln Leu Gln Cys Gln Asn Asp Gln
                245                 250                 255

Arg Gly Glu Ile Val Arg Val Glu His Gly Leu Ser Leu Leu Gln Pro
            260                 265                 270

Tyr Ala Ser Leu Gln Glu Gln Glu Gln Gly Gln Val Gln Ser Arg Glu
                275                 280                 285

Arg Tyr Gln Glu Gly Gln Tyr Gln Ser Gln Tyr Gly Ser Gly Cys
            290                 295                 300

Ser Asn Gly Leu Asp Glu Thr Phe Cys Thr Leu Arg Val Arg Gln Asn
305                 310                 315                 320

Ile Asp Asn Pro Asn Arg Ala Asp Thr Tyr Asn Pro Arg Ala Gly Arg
                325                 330                 335

Val Thr Asn Leu Asn Thr Gln Asn Phe Pro Ile Leu Ser Leu Val Gln
            340                 345                 350

Met Ser Ala Val Lys Val Asn Leu Tyr Gln Asn Ala Leu Leu Ser Pro
        355                 360                 365

Phe Trp Asn Ile Asn Ala His Ser Val Val Tyr Ile Thr Gln Gly Arg
    370                 375                 380

Ala Arg Val Gln Val Val Asn Asn Asn Gly Lys Thr Val Phe Asn Gly
385                 390                 395                 400

Glu Leu Arg Arg Gly Gln Leu Leu Ile Ile Pro Gln His Tyr Ala Val
                405                 410                 415

Val Lys Lys Ala Gln Arg Glu Gly Cys Ala Tyr Ile Ala Phe Lys Thr
            420                 425                 430

Asn Pro Asn Ser Met Val Ser His Ile Ala Gly Lys Ser Ser Ile Phe
        435                 440                 445

Arg Ala Leu Pro Asn Asp Val Leu Ala Asn Ala Tyr Arg Ile Ser Arg
    450                 455                 460

Glu Glu Ala Gln Arg Leu Lys His Asn Arg Gly Asp Glu Phe Gly Ala
465                 470                 475                 480

Phe Thr Pro Ile Gln Tyr Lys Ser Tyr Gln Asp Val Tyr Asn Ala Ala
                485                 490                 495

Glu Ser Ser
```

<210> SEQ ID NO 7
<211> LENGTH: 14
<212> TYPE: PRT
<213> ORGANISM: Artificial Sequence
<220> FEATURE:
<223> OTHER INFORMATION: Synthetic peptide

<400> SEQUENCE: 7

```
Val Leu Asp Leu Ala Ile Pro Val Asn Arg Pro Gly Gln Leu
1               5                   10
```

<210> SEQ ID NO 8
<211> LENGTH: 17
<212> TYPE: PRT
<213> ORGANISM: Artificial Sequence
<220> FEATURE:
<223> OTHER INFORMATION: Synthetic peptide

<400> SEQUENCE: 8

Val Leu Asp Leu Ala Ile Pro Val Asn Arg Pro Gly Gln Leu Gln Ser

-continued

```
<210> SEQ ID NO 9
<211> LENGTH: 15
<212> TYPE: PRT
<213> ORGANISM: Artificial Sequence
<220> FEATURE:
<223> OTHER INFORMATION: Synthetic peptide

<400> SEQUENCE: 9

Ser Phe Leu Leu Ser Gly Asn Gln Asn Gln Gln Asn Tyr Leu Ser
1               5                   10                  15

<210> SEQ ID NO 10
<211> LENGTH: 10
<212> TYPE: PRT
<213> ORGANISM: Artificial Sequence
<220> FEATURE:
<223> OTHER INFORMATION: Synthetic peptide

<400> SEQUENCE: 10

Val Leu Asp Leu Ala Ile Pro Val Asn Arg
1               5                   10

<210> SEQ ID NO 11
<211> LENGTH: 18
<212> TYPE: PRT
<213> ORGANISM: Artificial Sequence
<220> FEATURE:
<223> OTHER INFORMATION: Synthetic peptide

<400> SEQUENCE: 11

Ser Phe Leu Leu Ser Gly Asn Gln Asn Gln Gln Asn Tyr Leu Ser Gly
1               5                   10                  15

Phe Ser

<210> SEQ ID NO 12
<211> LENGTH: 18
<212> TYPE: PRT
<213> ORGANISM: Artificial Sequence
<220> FEATURE:
<223> OTHER INFORMATION: Synthetic peptide

<400> SEQUENCE: 12

Leu Ala Ile Pro Val Asn Arg Pro Gly Gln Leu Gln Ser Phe Leu Leu
1               5                   10                  15

Ser Gly

<210> SEQ ID NO 13
<211> LENGTH: 16
<212> TYPE: PRT
<213> ORGANISM: Artificial Sequence
<220> FEATURE:
<223> OTHER INFORMATION: Synthetic peptide

<400> SEQUENCE: 13

Ser Phe Leu Leu Ser Gly Asn Gln Asn Gln Gln Asn Tyr Leu Ser Gly
1               5                   10                  15

<210> SEQ ID NO 14
<211> LENGTH: 13
<212> TYPE: PRT
<213> ORGANISM: Artificial Sequence
<220> FEATURE:
```

```
<223> OTHER INFORMATION: Synthetic peptide

<400> SEQUENCE: 14

Leu Asp Leu Ala Ile Pro Val Asn Arg Pro Gly Gln Leu
1               5                   10

<210> SEQ ID NO 15
<211> LENGTH: 15
<212> TYPE: PRT
<213> ORGANISM: Artificial Sequence
<220> FEATURE:
<223> OTHER INFORMATION: Synthetic peptide

<400> SEQUENCE: 15

Val Leu Asp Leu Ala Ile Pro Val Asn Arg Pro Gly Gln Leu Gln
1               5                   10                  15

<210> SEQ ID NO 16
<211> LENGTH: 22
<212> TYPE: PRT
<213> ORGANISM: Artificial Sequence
<220> FEATURE:
<223> OTHER INFORMATION: Synthetic peptide

<400> SEQUENCE: 16

Leu Ala Ile Pro Val Asn Arg Pro Gly Gln Leu Gln Ser Phe Leu Leu
1               5                   10                  15

Ser Gly Asn Gln Asn Gln
            20

<210> SEQ ID NO 17
<211> LENGTH: 23
<212> TYPE: PRT
<213> ORGANISM: Artificial Sequence
<220> FEATURE:
<223> OTHER INFORMATION: Synthetic peptide

<400> SEQUENCE: 17

Ser Phe Leu Leu Ser Gly Asn Gln Asn Gln Asn Tyr Leu Ser Gly
1               5                   10                  15

Phe Ser Lys Asn Ile Leu Glu
            20

<210> SEQ ID NO 18
<211> LENGTH: 9
<212> TYPE: PRT
<213> ORGANISM: Artificial Sequence
<220> FEATURE:
<223> OTHER INFORMATION: Synthetic peptide

<400> SEQUENCE: 18

Gly Ser Leu Leu Leu Pro His Tyr Asn
1               5

<210> SEQ ID NO 19
<211> LENGTH: 10
<212> TYPE: PRT
<213> ORGANISM: Artificial Sequence
<220> FEATURE:
<223> OTHER INFORMATION: Synthetic peptide

<400> SEQUENCE: 19

Gly Ser Leu Leu Leu Pro His Tyr Asn Ser
1               5                   10
```

```
<210> SEQ ID NO 20
<211> LENGTH: 10
<212> TYPE: PRT
<213> ORGANISM: Artificial Sequence
<220> FEATURE:
<223> OTHER INFORMATION: Synthetic peptide

<400> SEQUENCE: 20

Ser Ser Asn Leu Asp Leu Leu Gly Phe Gly
1               5                   10

<210> SEQ ID NO 21
<211> LENGTH: 16
<212> TYPE: PRT
<213> ORGANISM: Artificial Sequence
<220> FEATURE:
<223> OTHER INFORMATION: Synthetic peptide

<400> SEQUENCE: 21

Ala Phe Asp Leu Ala Lys Asn Lys Asn Gln Tyr Leu Arg Gly Phe Ser
1               5                   10                  15

<210> SEQ ID NO 22
<211> LENGTH: 12
<212> TYPE: PRT
<213> ORGANISM: Artificial Sequence
<220> FEATURE:
<223> OTHER INFORMATION: Synthetic peptide

<400> SEQUENCE: 22

Gln Tyr Leu Arg Gly Phe Ser Lys Asn Ile Leu Glu
1               5                   10

<210> SEQ ID NO 23
<211> LENGTH: 10
<212> TYPE: PRT
<213> ORGANISM: Artificial Sequence
<220> FEATURE:
<223> OTHER INFORMATION: Synthetic peptide

<400> SEQUENCE: 23

Asn Leu Leu Gly Phe Gly Ile Asn Ala Glu
1               5                   10

<210> SEQ ID NO 24
<211> LENGTH: 9
<212> TYPE: PRT
<213> ORGANISM: Artificial Sequence
<220> FEATURE:
<223> OTHER INFORMATION: Synthetic peptide

<400> SEQUENCE: 24

Ser Asn Leu Asn Leu Leu Gly Phe Gly
1               5

<210> SEQ ID NO 25
<211> LENGTH: 15
<212> TYPE: PRT
<213> ORGANISM: Artificial Sequence
<220> FEATURE:
<223> OTHER INFORMATION: Synthetic peptide

<400> SEQUENCE: 25

Leu Ala Lys Asn Lys Asn Gln Tyr Leu Arg Gly Phe Ser Lys Asn
1               5                   10                  15

<210> SEQ ID NO 26
```

```
<211> LENGTH: 14
<212> TYPE: PRT
<213> ORGANISM: Artificial Sequence
<220> FEATURE:
<223> OTHER INFORMATION: Synthetic peptide

<400> SEQUENCE: 26

Leu Ala Lys Asn Lys Asn Gln Tyr Leu Arg Gly Phe Ser Lys
1               5                   10

<210> SEQ ID NO 27
<211> LENGTH: 10
<212> TYPE: PRT
<213> ORGANISM: Artificial Sequence
<220> FEATURE:
<223> OTHER INFORMATION: Synthetic peptide

<400> SEQUENCE: 27

Leu Arg Gly Phe Ser Lys Asn Ile Leu Glu
1               5                   10

<210> SEQ ID NO 28
<211> LENGTH: 10
<212> TYPE: PRT
<213> ORGANISM: Artificial Sequence
<220> FEATURE:
<223> OTHER INFORMATION: Synthetic peptide

<400> SEQUENCE: 28

Tyr Ser Asn Lys Phe Gly Lys Leu Phe Glu
1               5                   10

<210> SEQ ID NO 29
<211> LENGTH: 15
<212> TYPE: PRT
<213> ORGANISM: Artificial Sequence
<220> FEATURE:
<223> OTHER INFORMATION: Synthetic peptide

<400> SEQUENCE: 29

Ala Phe Asp Leu Ala Lys Asn Lys Asn Gln Tyr Leu Arg Gly Phe
1               5                   10                  15

<210> SEQ ID NO 30
<211> LENGTH: 17
<212> TYPE: PRT
<213> ORGANISM: Artificial Sequence
<220> FEATURE:
<223> OTHER INFORMATION: Synthetic peptide

<400> SEQUENCE: 30

Ala Phe Asp Leu Ala Lys Asn Lys Asn Gln Tyr Leu Arg Gly Phe Ser
1               5                   10                  15

Lys

<210> SEQ ID NO 31
<211> LENGTH: 10
<212> TYPE: PRT
<213> ORGANISM: Artificial Sequence
<220> FEATURE:
<223> OTHER INFORMATION: Synthetic peptide

<400> SEQUENCE: 31

Asn Lys Asn Gln Tyr Leu Arg Gly Phe Ser
1               5                   10
```

```
<210> SEQ ID NO 32
<211> LENGTH: 15
<212> TYPE: PRT
<213> ORGANISM: Artificial Sequence
<220> FEATURE:
<223> OTHER INFORMATION: Synthetic peptide

<400> SEQUENCE: 32

Asn Lys Asn Gln Tyr Leu Arg Gly Phe Ser Lys Asn Ile Leu Glu
1               5                   10                  15

<210> SEQ ID NO 33
<211> LENGTH: 10
<212> TYPE: PRT
<213> ORGANISM: Artificial Sequence
<220> FEATURE:
<223> OTHER INFORMATION: Synthetic peptide

<400> SEQUENCE: 33

Ser Ser Asn Leu Asn Leu Leu Gly Phe Gly
1               5                   10

<210> SEQ ID NO 34
<211> LENGTH: 11
<212> TYPE: PRT
<213> ORGANISM: Artificial Sequence
<220> FEATURE:
<223> OTHER INFORMATION: Synthetic peptide

<400> SEQUENCE: 34

Glu Tyr Ser Asn Lys Phe Gly Lys Leu Phe Glu
1               5                   10

<210> SEQ ID NO 35
<211> LENGTH: 9
<212> TYPE: PRT
<213> ORGANISM: Artificial Sequence
<220> FEATURE:
<223> OTHER INFORMATION: Synthetic peptide

<400> SEQUENCE: 35

Ala Ser Ser Asn Leu Asn Leu Leu Gly
1               5

<210> SEQ ID NO 36
<211> LENGTH: 8
<212> TYPE: PRT
<213> ORGANISM: Artificial Sequence
<220> FEATURE:
<223> OTHER INFORMATION: Synthetic peptide

<400> SEQUENCE: 36

Leu Asn Leu Leu Gly Phe Gly Ile
1               5

<210> SEQ ID NO 37
<211> LENGTH: 8
<212> TYPE: PRT
<213> ORGANISM: Artificial Sequence
<220> FEATURE:
<223> OTHER INFORMATION: Synthetic peptide

<400> SEQUENCE: 37

Asn Lys Phe Gly Lys Leu Phe Glu
1               5

<210> SEQ ID NO 38
```

```
<211> LENGTH: 19
<212> TYPE: PRT
<213> ORGANISM: Artificial Sequence
<220> FEATURE:
<223> OTHER INFORMATION: Synthetic peptide

<400> SEQUENCE: 38

Val Gln Pro Gly Arg Glu Arg Trp Glu Arg Glu Glu Asp Glu Glu Gln
1               5                   10                  15

Val Asp Glu

<210> SEQ ID NO 39
<211> LENGTH: 15
<212> TYPE: PRT
<213> ORGANISM: Artificial Sequence
<220> FEATURE:
<223> OTHER INFORMATION: Synthetic peptide

<400> SEQUENCE: 39

Arg Glu Arg Trp Glu Arg Glu Glu Asp Glu Glu Gln Val Asp Glu
1               5                   10                  15

<210> SEQ ID NO 40
<211> LENGTH: 10
<212> TYPE: PRT
<213> ORGANISM: Artificial Sequence
<220> FEATURE:
<223> OTHER INFORMATION: Synthetic peptide

<400> SEQUENCE: 40

Ala Ser Ser Asn Leu Asn Leu Leu Gly Phe
1               5                   10

<210> SEQ ID NO 41
<211> LENGTH: 13
<212> TYPE: PRT
<213> ORGANISM: Artificial Sequence
<220> FEATURE:
<223> OTHER INFORMATION: Synthetic peptide

<400> SEQUENCE: 41

Leu Ala Lys Asn Lys Asn Gln Tyr Leu Arg Gly Phe Ser
1               5                   10

<210> SEQ ID NO 42
<211> LENGTH: 8
<212> TYPE: PRT
<213> ORGANISM: Artificial Sequence
<220> FEATURE:
<223> OTHER INFORMATION: Synthetic peptide

<400> SEQUENCE: 42

Glu Leu Leu Gly Leu Lys Asn Glu
1               5

<210> SEQ ID NO 43
<211> LENGTH: 8
<212> TYPE: PRT
<213> ORGANISM: Artificial Sequence
<220> FEATURE:
<223> OTHER INFORMATION: Synthetic peptide

<400> SEQUENCE: 43

Ala Ser Ser Asn Leu Asn Leu Leu
1               5
```

```
<210> SEQ ID NO 44
<211> LENGTH: 9
<212> TYPE: PRT
<213> ORGANISM: Artificial Sequence
<220> FEATURE:
<223> OTHER INFORMATION: Synthetic peptide

<400> SEQUENCE: 44

Tyr Pro Gln Leu Gln Asp Leu Asp Leu
1               5

<210> SEQ ID NO 45
<211> LENGTH: 10
<212> TYPE: PRT
<213> ORGANISM: Artificial Sequence
<220> FEATURE:
<223> OTHER INFORMATION: Synthetic peptide

<400> SEQUENCE: 45

Leu Leu Gly Leu Lys Asn Glu Gln Gln Glu
1               5                   10

<210> SEQ ID NO 46
<211> LENGTH: 10
<212> TYPE: PRT
<213> ORGANISM: Artificial Sequence
<220> FEATURE:
<223> OTHER INFORMATION: Synthetic peptide

<400> SEQUENCE: 46

Leu Val Val Leu Ser Gly Lys Ala Ile Leu
1               5                   10

<210> SEQ ID NO 47
<211> LENGTH: 10
<212> TYPE: PRT
<213> ORGANISM: Artificial Sequence
<220> FEATURE:
<223> OTHER INFORMATION: Synthetic peptide

<400> SEQUENCE: 47

Tyr Asp Ala Thr Thr Ala Ile Glu Ala Lys
1               5                   10

<210> SEQ ID NO 48
<211> LENGTH: 10
<212> TYPE: PRT
<213> ORGANISM: Artificial Sequence
<220> FEATURE:
<223> OTHER INFORMATION: Synthetic peptide

<400> SEQUENCE: 48

Asn Gly Leu Gln Leu Leu Lys Pro Thr Leu
1               5                   10

<210> SEQ ID NO 49
<211> LENGTH: 9
<212> TYPE: PRT
<213> ORGANISM: Artificial Sequence
<220> FEATURE:
<223> OTHER INFORMATION: Synthetic peptide

<400> SEQUENCE: 49

Gly Leu Gln Leu Leu Lys Pro Thr Leu
1               5

<210> SEQ ID NO 50
```

```
<211> LENGTH: 9
<212> TYPE: PRT
<213> ORGANISM: Artificial Sequence
<220> FEATURE:
<223> OTHER INFORMATION: Synthetic peptide

<400> SEQUENCE: 50

Gly Val Leu Arg Pro Gly Gln Leu Leu
1               5

<210> SEQ ID NO 51
<211> LENGTH: 10
<212> TYPE: PRT
<213> ORGANISM: Artificial Sequence
<220> FEATURE:
<223> OTHER INFORMATION: Synthetic peptide

<400> SEQUENCE: 51

Asp Gly Val Leu Arg Pro Gly Gln Leu Leu
1               5                   10

<210> SEQ ID NO 52
<211> LENGTH: 13
<212> TYPE: PRT
<213> ORGANISM: Artificial Sequence
<220> FEATURE:
<223> OTHER INFORMATION: Synthetic peptide

<400> SEQUENCE: 52

Leu Gln Leu Leu Lys Pro Thr Leu Thr Gln Gln Gln Glu
1               5                   10

<210> SEQ ID NO 53
<211> LENGTH: 9
<212> TYPE: PRT
<213> ORGANISM: Artificial Sequence
<220> FEATURE:
<223> OTHER INFORMATION: Synthetic peptide

<400> SEQUENCE: 53

Phe Leu Leu Ala Gly Asn Asn Asn Arg
1               5

<210> SEQ ID NO 54
<211> LENGTH: 10
<212> TYPE: PRT
<213> ORGANISM: Artificial Sequence
<220> FEATURE:
<223> OTHER INFORMATION: Synthetic peptide

<400> SEQUENCE: 54

Glu Phe Leu Leu Ala Gly Asn Asn Asn Arg
1               5                   10

<210> SEQ ID NO 55
<211> LENGTH: 21
<212> TYPE: PRT
<213> ORGANISM: Artificial Sequence
<220> FEATURE:
<223> OTHER INFORMATION: Synthetic peptide

<400> SEQUENCE: 55

Phe Leu Leu Ala Gly Asn Asn Asn Arg Ala Gln Gln Gln Gln Val Tyr
1               5                   10                  15

Gly Ser Ser Ile Glu
            20
```

<210> SEQ ID NO 56
<211> LENGTH: 14
<212> TYPE: PRT
<213> ORGANISM: Artificial Sequence
<220> FEATURE:
<223> OTHER INFORMATION: Synthetic peptide

<400> SEQUENCE: 56

Phe Leu Leu Ala Gly Asn Asn Asn Arg Ala Gln Gln Gln Gln
1               5                   10

<210> SEQ ID NO 57
<211> LENGTH: 17
<212> TYPE: PRT
<213> ORGANISM: Artificial Sequence
<220> FEATURE:
<223> OTHER INFORMATION: Synthetic peptide

<400> SEQUENCE: 57

Phe Leu Leu Ala Gly Asn Asn Asn Arg Ala Gln Gln Gln Gln Val Tyr
1               5                   10                  15

Gly

<210> SEQ ID NO 58
<211> LENGTH: 16
<212> TYPE: PRT
<213> ORGANISM: Artificial Sequence
<220> FEATURE:
<223> OTHER INFORMATION: Synthetic peptide

<400> SEQUENCE: 58

Phe Leu Leu Ala Gly Asn Asn Asn Arg Ala Gln Gln Gln Gln Val Tyr
1               5                   10                  15

<210> SEQ ID NO 59
<211> LENGTH: 19
<212> TYPE: PRT
<213> ORGANISM: Artificial Sequence
<220> FEATURE:
<223> OTHER INFORMATION: Synthetic peptide

<400> SEQUENCE: 59

Phe Gln Gln Gln Tyr Tyr Pro Gly Leu Ser Asn Glu Ser Glu Ser Glu
1               5                   10                  15

Thr Ser Glu

<210> SEQ ID NO 60
<211> LENGTH: 10
<212> TYPE: PRT
<213> ORGANISM: Artificial Sequence
<220> FEATURE:
<223> OTHER INFORMATION: Synthetic peptide

<400> SEQUENCE: 60

Leu Ser Glu Ala Leu Gly Val Asn Ala Leu
1               5                   10

<210> SEQ ID NO 61
<211> LENGTH: 18
<212> TYPE: PRT
<213> ORGANISM: Artificial Sequence
<220> FEATURE:
<223> OTHER INFORMATION: Synthetic peptide

<400> SEQUENCE: 61

```
Leu Arg Pro Ala Phe Ala Gln Gln Gln Glu Gln Ala Gln Gln Gln Glu
1               5                   10                  15

Gln Ala

<210> SEQ ID NO 62
<211> LENGTH: 10
<212> TYPE: PRT
<213> ORGANISM: Artificial Sequence
<220> FEATURE:
<223> OTHER INFORMATION: Synthetic peptide

<400> SEQUENCE: 62

Leu Arg Pro Ala Phe Ala Gln Gln Gln Glu
1               5                   10

<210> SEQ ID NO 63
<211> LENGTH: 16
<212> TYPE: PRT
<213> ORGANISM: Artificial Sequence
<220> FEATURE:
<223> OTHER INFORMATION: Synthetic peptide

<400> SEQUENCE: 63

Leu Arg Pro Ala Phe Ala Gln Gln Gln Glu Gln Ala Gln Gln Gln Glu
1               5                   10                  15

<210> SEQ ID NO 64
<211> LENGTH: 10
<212> TYPE: PRT
<213> ORGANISM: Artificial Sequence
<220> FEATURE:
<223> OTHER INFORMATION: Synthetic peptide

<400> SEQUENCE: 64

His Gly Leu Ser Leu Leu Gln Pro Tyr Ala
1               5                   10

<210> SEQ ID NO 65
<211> LENGTH: 12
<212> TYPE: PRT
<213> ORGANISM: Artificial Sequence
<220> FEATURE:
<223> OTHER INFORMATION: Synthetic peptide

<400> SEQUENCE: 65

His Gly Leu Ser Leu Leu Gln Pro Tyr Ala Ser Leu
1               5                   10

<210> SEQ ID NO 66
<211> LENGTH: 9
<212> TYPE: PRT
<213> ORGANISM: Artificial Sequence
<220> FEATURE:
<223> OTHER INFORMATION: Synthetic peptide

<400> SEQUENCE: 66

His Gly Leu Ser Leu Leu Gln Pro Tyr
1               5

<210> SEQ ID NO 67
<211> LENGTH: 463
<212> TYPE: PRT
<213> ORGANISM: Vicia faba

<400> SEQUENCE: 67

Met Ala Ala Thr Thr Leu Lys Asp Ser Phe Pro Leu Leu Thr Leu Leu
```

-continued

```
 1               5                  10                 15
Gly Ile Ala Phe Leu Ala Ser Val Cys Leu Ser Ser Arg Ser Asp Gln
                20                 25                 30

Asp Asn Pro Phe Val Phe Glu Ser Asn Arg Phe Gln Thr Leu Phe Glu
                35                 40                 45

Asn Glu Asn Gly His Ile Arg Leu Leu Gln Lys Phe Asp Gln His Ser
            50                 55                 60

Lys Leu Leu Glu Asn Leu Gln Asn Tyr Arg Leu Leu Glu Tyr Lys Ser
 65                 70                 75                 80

Lys Pro His Thr Ile Phe Leu Pro Gln Gln Thr Asp Ala Asp Phe Ile
                85                 90                 95

Leu Val Val Leu Ser Gly Lys Ala Ile Leu Thr Val Leu Leu Pro Asn
                100                105                110

Asp Arg Asn Ser Phe Ser Leu Glu Arg Gly Asp Thr Ile Lys Leu Pro
                115                120                125

Ala Gly Thr Ile Gly Tyr Leu Val Asn Arg Asp Asp Glu Glu Asp Leu
            130                135                140

Arg Val Leu Asp Leu Val Ile Pro Val Asn Arg Pro Gly Glu Pro Gln
145                 150                155                160

Ser Phe Leu Leu Ser Gly Asn Gln Asn Gln Pro Ser Ile Leu Ser Gly
                165                170                175

Phe Ser Lys Asn Ile Leu Glu Ala Ser Phe Asn Thr Asp Tyr Lys Glu
                180                185                190

Ile Glu Lys Val Leu Leu Glu Glu His Gly Lys Glu Lys Tyr His Arg
                195                200                205

Arg Gly Leu Lys Asp Arg Arg Gln Arg Gly Gln Glu Glu Asn Val Ile
            210                215                220

Val Lys Ile Ser Arg Lys Gln Ile Glu Glu Leu Asn Lys Asn Ala Lys
225                 230                235                240

Ser Ser Ser Lys Lys Ser Thr Ser Ser Glu Ser Glu Pro Phe Asn Leu
                245                250                255

Arg Ser Arg Glu Pro Ile Tyr Ser Asn Lys Phe Gly Lys Phe Phe Glu
                260                265                270

Ile Thr Pro Lys Arg Asn Pro Gln Leu Gln Asp Leu Asn Ile Phe Val
                275                280                285

Asn Tyr Val Glu Ile Asn Glu Gly Ser Leu Leu Leu Pro His Tyr Asn
            290                295                300

Ser Arg Ala Ile Val Ile Val Thr Val Asn Glu Gly Lys Gly Asp Phe
305                 310                315                320

Glu Leu Val Gly Gln Arg Asn Glu Asn Gln Gln Gly Leu Arg Glu Glu
                325                330                335

Tyr Asp Glu Glu Lys Glu Gln Gly Glu Glu Ile Arg Lys Gln Val
                340                345                350

Gln Asn Tyr Lys Ala Lys Leu Ser Pro Gly Asp Val Leu Val Ile Pro
            355                360                365

Ala Gly Tyr Pro Val Ala Ile Lys Ala Ser Ser Asn Leu Asn Leu Val
            370                375                380

Gly Phe Gly Ile Asn Ala Glu Asn Asn Gln Arg Tyr Phe Leu Ala Gly
385                 390                395                400

Glu Glu Asp Asn Val Ile Ser Gln Ile His Lys Pro Val Lys Glu Leu
                405                410                415

Ala Phe Pro Gly Ser Ala Gln Glu Val Asp Thr Leu Leu Glu Asn Gln
                420                425                430
```

```
Lys Gln Ser His Phe Ala Asn Ala Gln Pro Arg Glu Arg Glu Arg Gly
            435                 440                 445

Ser Gln Glu Ile Lys Asp His Leu Tyr Ser Ile Leu Gly Ser Phe
    450                 455                 460

<210> SEQ ID NO 68
<211> LENGTH: 446
<212> TYPE: PRT
<213> ORGANISM: Cicer arietinum

<400> SEQUENCE: 68

Met Ala Ile Lys Ala Arg Phe Pro Leu Leu Val Leu Leu Gly Ile Val
1               5                   10                  15

Phe Leu Ala Ser Val Cys Ala Lys Ser Asp Lys Glu Asn Pro Phe Phe
            20                  25                  30

Phe Lys Ser Asn Asn Cys Gln Thr Leu Phe Glu Asn Glu Asn Gly His
        35                  40                  45

Val Arg Leu Leu Gln Arg Phe Asp Lys Arg Ser Gln Leu Phe Glu Asn
    50                  55                  60

Leu Gln Asn Tyr Arg Leu Met Glu Tyr Asn Ser Lys Pro His Thr Leu
65                  70                  75                  80

Phe Leu Pro Gln His Asn Asp Ala Asp Phe Ile Leu Val Val Leu Arg
                85                  90                  95

Gly Arg Ala Ile Leu Thr Val Leu Asn Pro Asn Asp Arg Asn Thr Phe
            100                 105                 110

Lys Leu Glu Arg Gly Asp Thr Ile Lys Leu Pro Ala Gly Thr Ile Ala
        115                 120                 125

Tyr Leu Ala Asn Arg Asp Asp Asn Glu Asp Leu Arg Val Leu Asp Leu
    130                 135                 140

Ala Ile Pro Val Asn Arg Pro Gly Gln Phe Gln Ser Phe Ser Leu Ser
145                 150                 155                 160

Gly Asn Glu Asn Gln Gln Ser Tyr Phe Gln Gly Phe Ser Lys Lys Ile
                165                 170                 175

Leu Glu Ala Ser Phe Asn Ser Asp Tyr Glu Glu Ile Glu Arg Val Leu
            180                 185                 190

Leu Glu Glu Gln Glu Gln Lys Pro Glu Gln Arg Arg Gly His Lys Gly
        195                 200                 205

Arg Gln Gln Ser Gln Glu Thr Asp Val Ile Val Lys Ile Ser Arg Glu
    210                 215                 220

Gln Ile Glu Glu Leu Ser Lys Asn Ala Lys Ser Asn Cys Lys Lys Ser
225                 230                 235                 240

Val Ser Ser Glu Ser Glu Pro Phe Asn Leu Arg Ser Arg Ser Pro Ile
                245                 250                 255

Tyr Ser Asn Arg Phe Gly Asn Phe Phe Glu Ile Thr Pro Glu Lys Asn
            260                 265                 270

Pro Gln Leu Lys Asp Leu Asp Ile Phe Val Asn Ser Val Glu Ile Lys
        275                 280                 285

Glu Gly Ser Leu Leu Leu Pro His Phe Asn Ser Arg Ala Thr Val Ile
    290                 295                 300

Leu Val Val Asn Glu Gly Lys Gly Glu Val Leu Val Gly Leu Arg
305                 310                 315                 320

Asn Glu Asn Glu Gln Glu Asn Lys Lys Glu Asp Glu Glu Glu Glu
                325                 330                 335

Asp Arg Asn Val Gln Val Gln Arg Phe Gln Ser Lys Leu Ser Ser Gly
```

```
            340                 345                 350
Asp Val Val Ile Pro Ala Ser His Pro Phe Ser Ile Asn Ala Ser
            355                 360                 365

Ser Asp Leu Phe Leu Leu Gly Phe Gly Ile Asn Ala Gln Asn Gln
            370                 375                 380

Arg Asn Phe Leu Ala Gly Glu Glu Asp Asn Val Ile Ser Gln Ile Gln
385                 390                 395                 400

Arg Pro Val Lys Glu Val Ala Phe Pro Gly Ser Ala Glu Val Asp
            405                 410                 415

Arg Leu Leu Lys Asn Gln Arg Gln Ser His Phe Ala Asn Ala Gln Pro
            420                 425                 430

Gln Gln Lys Arg Lys Gly Ser Gln Arg Ile Arg Ser Pro Phe
            435                 440                 445

<210> SEQ ID NO 69
<211> LENGTH: 418
<212> TYPE: PRT
<213> ORGANISM: Lens culinaris

<400> SEQUENCE: 69

Ser Arg Ser Asp Gln Glu Asn Pro Phe Ile Phe Lys Ser Asn Arg Phe
1               5                   10                  15

Gln Thr Ile Tyr Glu Asn Glu Asn Gly His Ile Arg Leu Leu Gln Arg
            20                  25                  30

Phe Asp Lys Arg Ser Lys Ile Phe Glu Asn Leu Gln Asn Tyr Arg Leu
        35                  40                  45

Leu Glu Tyr Lys Ser Lys Pro His Thr Ile Phe Leu Pro Gln Phe Thr
50                  55                  60

Asp Ala Asp Phe Ile Leu Val Val Leu Ser Gly Lys Ala Ile Leu Thr
65                  70                  75                  80

Val Leu Asn Ser Asn Asp Arg Asn Ser Phe Asn Leu Glu Arg Gly Asp
                85                  90                  95

Thr Ile Lys Leu Pro Ala Gly Thr Ile Ala Tyr Leu Ala Asn Arg Asp
            100                 105                 110

Asp Asn Glu Asp Leu Arg Val Leu Asp Leu Ala Ile Pro Val Asn Arg
        115                 120                 125

Pro Gly Gln Leu Gln Ser Phe Leu Leu Ser Gly Thr Gln Asn Gln Pro
130                 135                 140

Ser Phe Leu Ser Gly Phe Ser Lys Asn Ile Leu Glu Ala Ala Phe Asn
145                 150                 155                 160

Thr Glu Tyr Glu Glu Ile Glu Lys Val Leu Leu Glu Gln Glu Gln
                165                 170                 175

Lys Ser Gln His Arg Arg Ser Leu Arg Asp Lys Arg Gln Glu Ile Thr
            180                 185                 190

Asn Glu Asp Val Ile Val Lys Val Ser Arg Glu Gln Ile Glu Glu Leu
        195                 200                 205

Ser Lys Asn Ala Lys Ser Ser Lys Lys Ser Val Ser Ser Glu Ser
210                 215                 220

Glu Pro Phe Asn Leu Arg Ser Arg Asn Pro Ile Tyr Ser Asn Lys Phe
225                 230                 235                 240

Gly Lys Phe Phe Glu Ile Thr Pro Glu Lys Asn Pro Gln Leu Gln Asp
                245                 250                 255

Leu Asp Ile Phe Val Asn Ser Val Glu Ile Lys Glu Gly Ser Leu Leu
            260                 265                 270
```

```
Leu Pro Asn Tyr Asn Ser Arg Ala Ile Val Ile Val Thr Val Asn Glu
            275                 280                 285

Gly Lys Gly Asp Phe Glu Leu Val Gly Gln Arg Asn Glu Asn Gln Gln
290                 295                 300

Glu Gln Arg Glu Glu Asn Asp Glu Glu Glu Gly Gln Glu Glu Glu Thr
305                 310                 315                 320

Thr Lys Gln Val Gln Arg Tyr Arg Ala Arg Leu Ser Pro Gly Asp Val
                325                 330                 335

Leu Val Ile Pro Ala Gly His Pro Val Ala Ile Asn Ala Ser Ser Asp
                340                 345                 350

Leu Asn Leu Ile Gly Phe Gly Ile Asn Ala Lys Asn Asn Gln Arg Asn
            355                 360                 365

Phe Leu Ala Gly Glu Glu Asp Asn Val Ile Ser Gln Ile Gln Arg Pro
370                 375                 380

Val Lys Glu Leu Ala Phe Pro Gly Ser Ser Arg Glu Val Asp Arg Leu
385                 390                 395                 400

Leu Thr Asn Gln Lys Gln Ser His Phe Ala Asn Ala Gln Pro Leu Gln
                405                 410                 415

Ile Glu

<210> SEQ ID NO 70
<211> LENGTH: 526
<212> TYPE: PRT
<213> ORGANISM: Pisum abyssinicum

<400> SEQUENCE: 70

Met Ala Thr Thr Val Glu Ser Arg Phe Pro Leu Leu Leu Phe Pro Gly
1               5                   10                  15

Ile Ile Phe Leu Ala Ser Val Cys Val Thr Tyr Ala Asn Tyr Asp Glu
                20                  25                  30

Gly Ser Glu Thr Arg Val Pro Gly Gln Arg Glu Arg Gly Arg Gln Glu
            35                  40                  45

Gly Glu Lys Glu Glu Lys Arg His Gly Glu Trp Arg Pro Ser Tyr Glu
50                  55                  60

Lys Glu Glu Asp Glu Glu Lys Gln Lys Tyr Arg Tyr Gln Arg Glu
65                  70                  75                  80

Lys Glu Asp Glu Glu Lys Gln Lys Tyr Arg Tyr Gln Arg Glu Lys
                85                  90                  95

Lys Glu Glu Lys Glu Val Gln Pro Gly Arg Glu Arg Trp Glu Arg Glu
            100                 105                 110

Glu Asp Glu Glu Gln Val Asp Glu Trp Arg Gly Ser Gln Arg Arg
115                 120                 125

Gln Asp Pro Glu Glu Arg Ala Arg Leu Arg His Arg Glu Glu Arg Thr
            130                 135                 140

Lys Arg Asp Arg Arg His Lys Arg Glu Gly Glu Glu Glu Arg Ser
145                 150                 155                 160

Ser Glu Ser Gln Glu Gln Arg Asn Pro Phe Leu Phe Lys Ser Asn Lys
                165                 170                 175

Phe Leu Thr Leu Phe Glu Asn Glu Asn Gly His Ile Arg Arg Leu Gln
            180                 185                 190

Arg Phe Asp Lys Arg Ser Asp Leu Phe Glu Asn Leu Gln Asn Tyr Arg
        195                 200                 205

Leu Val Glu Tyr Arg Ala Lys Pro His Thr Ile Phe Leu Pro Gln His
    210                 215                 220
```

-continued

Ile Asp Ala Asp Leu Ile Leu Val Val Leu Asn Gly Lys Ala Ile Leu
225                 230                 235                 240

Thr Val Leu Ser Pro Asn Asp Arg Asn Ser Tyr Asn Leu Glu Arg Gly
            245                 250                 255

Asp Thr Ile Lys Ile Pro Ala Gly Thr Thr Ser Tyr Leu Val Asn Gln
            260                 265                 270

Asp Asp Glu Asp Leu Arg Val Asp Phe Val Ile Pro Val Asn
        275                 280                 285

Arg Pro Gly Lys Phe Glu Ala Phe Gly Leu Ser Asn Lys Asn Gln
        290                 295                 300

Tyr Leu Arg Gly Phe Ser Lys Asn Ile Leu Glu Ala Ser Leu Asn Thr
305                 310                 315                 320

Lys Tyr Glu Thr Ile Glu Lys Val Leu Leu Glu Glu Gln Glu Lys Lys
            325                 330                 335

Pro Gln Gln Leu Arg Asp Arg Lys Arg Gln Gln Gly Gly Glu Arg
        340                 345                 350

Asp Ala Ile Ile Lys Val Ser Arg Glu Gln Ile Glu Glu Leu Arg Lys
            355                 360                 365

Leu Ala Lys Ser Ser Ser Lys Lys Ser Leu Pro Ser Glu Phe Glu Pro
370                 375                 380

Phe Asn Leu Arg Ser His Lys Pro Glu Tyr Ser Asn Lys Phe Gly Lys
385                 390                 395                 400

Leu Phe Glu Ile Thr Pro Glu Lys Lys Tyr Pro Gln Leu Gln Asp Leu
                405                 410                 415

Asp Ile Leu Val Ser Cys Val Glu Ile Asn Lys Gly Ala Leu Met Leu
            420                 425                 430

Pro His Tyr Asn Ser Arg Ala Ile Val Val Leu Leu Val Asn Glu Gly
            435                 440                 445

Lys Gly Asn Leu Glu Leu Leu Gly Leu Lys Asn Glu Gln Gln Glu Arg
        450                 455                 460

Glu Asp Arg Lys Glu Arg Asn Asn Glu Val Gln Arg Tyr Glu Ala Arg
465                 470                 475                 480

Leu Ser Pro Gly Asp Val Val Ile Ile Pro Ala Gly His Pro Val Ala
                485                 490                 495

Ile Ser Ala Ser Ser Asn Leu Asn Leu Leu Gly Phe Gly Thr Asn Ala
            500                 505                 510

Glu Asn Asn Gln Arg Asn Phe Leu Ser Gly Ser Asp Asp Asn
        515                 520                 525

<210> SEQ ID NO 71
<211> LENGTH: 541
<212> TYPE: PRT
<213> ORGANISM: Lathyrus annuus

<400> SEQUENCE: 71

Met Ala Thr Thr Ile Lys Ser Arg Phe Pro Leu Leu Leu Leu Leu Gly
1               5                   10                  15

Ile Ile Phe Leu Ala Ser Val Cys Val Thr Trp Ala Asn Tyr Asp Glu
            20                  25                  30

Gly Ser Glu Pro Arg Val Pro Gly Gln Arg Glu Arg Gly Arg Gln Glu
        35                  40                  45

Gly Glu Lys Glu Glu Lys Arg His Gly Glu Trp Arg Pro Ser Tyr Glu
    50                  55                  60

Glu Glu Tyr Asp Glu Gly Leu Glu Pro Lys Val Pro Gly Lys Arg Glu
65                  70                  75                  80

```
Arg Gly Arg Gln Glu Gly Lys Glu Glu Lys Arg His Glu Glu Trp
            85                  90                  95

Arg Pro Ser Tyr Glu Lys Glu Glu Asp Glu Glu Lys Gln Lys Tyr
            100                 105                 110

Asn Tyr Gln Arg Glu Lys Lys Glu His Lys Glu Val Gln Pro Gly Arg
            115                 120                 125

Glu Arg Trp Glu Arg Lys Gln Asp Lys Gln Val Glu Glu Asp Glu
130                 135                 140

Glu Pro Gly Glu Glu Gln Trp Arg Gly Ser Lys Arg His Glu Asp Pro
145                 150                 155                 160

Glu Glu Arg Ala Arg Leu Arg His Arg Glu Lys Thr Lys Ser Tyr
            165                 170                 175

Val Glu Asp Asn Glu Glu Thr Ser Ser Lys Glu Gly Arg Asn Pro Phe
            180                 185                 190

Leu Phe Lys Ser Asn Lys Phe Leu Thr Leu Phe Glu Asn Glu Asn Gly
            195                 200                 205

His Ile Arg Arg Leu Gln Arg Phe Asp Glu Arg Ser Asp Ile Phe Glu
            210                 215                 220

Asn Leu Gln Asn Tyr Arg Leu Val Glu Tyr Arg Ala Lys Pro His Thr
225                 230                 235                 240

Met Phe Leu Pro Gln His Ile Asp Ala Asp Leu Ile Leu Val Val Leu
            245                 250                 255

Asn Gly Lys Ala Ile Leu Thr Val Leu Ser Pro Asn Asp Arg Asn Ser
            260                 265                 270

Tyr Asn Leu Glu Arg Gly Asp Thr Val Lys Leu Pro Ala Gly Thr Thr
            275                 280                 285

Ser Tyr Leu Val Asn Gln Asp Asp Glu Glu Asp Leu Arg Val Val Asp
            290                 295                 300

Leu Ala Ile Pro Val Asn Arg Pro Gly Lys Phe Glu Ala Phe Gly Leu
305                 310                 315                 320

Ser Ala Asn Lys Asn Gln Tyr Leu Arg Gly Phe Ser Lys Asn Ile Leu
            325                 330                 335

Glu Ala Ser Leu Asn Thr Lys Tyr Glu Thr Ile Glu Lys Val Leu Leu
            340                 345                 350

Glu Glu Arg Arg Asp Gln Lys Gly Arg Gln Gln Gly Gln Glu Thr Asn
            355                 360                 365

Ala Ile Val Lys Val Ser Arg Glu Gln Ile Glu Glu Leu Arg Lys Leu
370                 375                 380

Ala Lys Ser Ser Ser Lys Lys Ser Leu Leu Ser Glu Ser Glu Pro Leu
385                 390                 395                 400

Asn Leu Arg Ser Gln Asn Pro Lys Tyr Ser Asn Lys Phe Gly Lys Phe
            405                 410                 415

Phe Glu Ile Thr Pro Gln Lys Lys Tyr Pro Gln Leu Gln Asp Leu Asp
            420                 425                 430

Val Ser Ile Ser Cys Val Glu Ile Asn Lys Gly Ala Leu Leu Leu Pro
            435                 440                 445

His Tyr Asn Ser Arg Ser Ile Gly Ile Leu Leu Val Asn Glu Gly Lys
            450                 455                 460

Gly Asn Leu Glu Leu Val Gly Phe Lys Asn Glu Gln Gln Arg Gln Arg
465                 470                 475                 480

Glu Asn Glu Glu Thr Asn Lys Lys Leu Gln Arg Tyr Glu Ala Arg Leu
            485                 490                 495
```

```
Ser Ser Gly Asp Val Val Ile Pro Glu Gly His Pro Val Ala Ile
            500             505             510

Ser Ala Ser Ser Asn Leu Asn Leu Leu Gly Phe Gly Ile Asn Ala Ala
            515             520             525

Asn Asn Gln Arg Asn Phe Leu Thr Gly Ser Asp Asp Asn
530             535             540

<210> SEQ ID NO 72
<211> LENGTH: 589
<212> TYPE: PRT
<213> ORGANISM: Vicia villosa

<400> SEQUENCE: 72

Met Ala Thr Thr Ile Lys Ser Arg Phe Pro Val Leu Leu Leu Gly
1                 5              10              15

Ile Ile Phe Leu Thr Ser Val Cys Val Thr Tyr Ala Asn Tyr Asp Glu
            20              25              30

Gly Arg Glu Pro Ser Val Pro Gly Gln Arg Glu Arg Gly Arg Gln Glu
            35              40              45

Gly Glu Lys Glu Glu Lys Arg His Gly Glu Trp Arg Pro Ser Glu Glu
50              55              60

Asp Glu Glu Glu Lys Tyr Lys Tyr Glu Glu Gly Arg Val Pro Gly Gln
65              70              75              80

Arg Glu Arg Gly Arg Gln Glu Gly Glu Lys Glu Glu Lys Arg His Gly
            85              90              95

Lys Trp Arg Pro Ser Glu Glu Glu Asp Glu Glu Glu Lys Tyr Arg Tyr
            100             105             110

Glu Glu Gly Ser Glu Pro Arg Gly Pro Gly Gln Arg Glu Thr Gly Arg
            115             120             125

Gln Glu Gly Glu Lys Glu Lys Gln Arg Pro Glu Arg Glu Pro Ser Tyr
            130             135             140

Glu Lys Glu Glu Asp Glu Glu Lys Gln Lys Tyr Gln Tyr His Arg
145             150             155             160

Glu Lys Lys Glu Gln Arg Glu Val Arg Pro Gly Arg Glu Arg Phe Glu
            165             170             175

Arg His Glu Asp Glu Glu Gln Trp Arg Gly Ile Gln Arg His Glu Asp
            180             185             190

Pro Glu Glu Arg Ala Arg Glu Arg Tyr Arg Ala Glu Ile Ala Lys Arg
            195             200             205

Gln Val Glu Glu Glu Arg Glu Glu Arg Asp Ile Pro His Glu Arg Glu
            210             215             220

Gln Arg Asn Pro Phe Leu Phe Lys Ser Asn Lys Phe Gln Thr Leu Phe
225             230             235             240

Gln Asn Glu Asn Gly Tyr Ile Arg Arg Leu Gln Arg Phe Asp Lys Arg
            245             250             255

Ser Asp Leu Phe Glu Asn Leu Gln Asn Tyr Arg Leu Val Glu Tyr Arg
            260             265             270

Ala Lys Pro His Thr Ile Phe Leu Pro Gln His Ile Asp Ala Asp Leu
            275             280             285

Ile Ile Val Val Leu Ser Gly Arg Ala Ile Leu Thr Val Leu Ser Pro
            290             295             300

Asp Asp Arg Asn Ser Tyr Asn Leu Glu Arg Gly Asp Thr Ile Lys Leu
305             310             315             320

Pro Ala Gly Thr Thr Ser Tyr Leu Val Asn Gln Asp Asp Glu Glu Asp
            325             330             335
```

-continued

Leu Arg Val Val Asp Leu Ala Ile Pro Val Asn Arg Pro Gly Lys Val
            340                 345                 350

Glu Ser Phe Leu Leu Ser Gly Asn Lys Asn Gln Tyr Leu Arg Gly Phe
            355                 360                 365

Ser Lys Asn Ile Leu Glu Ala Ser Phe Asn Thr Asn Tyr Glu Thr Ile
370                 375                 380

Glu Arg Val Leu Leu Glu Glu Asp Lys Glu Ser Gln Gln Ser Ile
385                 390                 395                 400

Gly Gln Lys Arg Arg Ser Gln Arg Gln Glu Thr Asn Ala Leu Val Lys
                405                 410                 415

Val Ser Arg Glu Gln Leu Glu Asp Leu Lys Arg Leu Ala Lys Ser Ser
            420                 425                 430

Ser Gln Glu Gly Leu Ser Ser Gln Phe Glu Pro Ile Asn Leu Arg Ser
            435                 440                 445

Gln Asn Pro Lys Tyr Ser Asn Lys Phe Gly Lys Val Phe Glu Ile Thr
        450                 455                 460

Pro Glu Lys Lys Tyr Pro Gln Leu Gln Asp Leu Asp Leu Phe Val Ser
465                 470                 475                 480

Ser Val Asp Ile Lys Glu Gly Ala Leu Met Leu Pro His Tyr Asn Ser
                485                 490                 495

Arg Ala Ile Val Val Leu Leu Val Asn Glu Gly Arg Gly Asn Leu Glu
            500                 505                 510

Leu Val Gly Leu Lys Asn Glu Gln Gln Glu Gln Arg Glu Lys Glu Asp
            515                 520                 525

Glu Gln Gln Glu Arg Asn Asn Gln Val Gln Arg Tyr Glu Ala Arg Leu
530                 535                 540

Ser Pro Gly Asp Val Val Ile Ile Pro Ala Gly His Pro Val Ala Val
545                 550                 555                 560

Arg Ala Ser Ser Asp Leu Asn Leu Leu Ala Phe Gly Ile Asn Ala Glu
                565                 570                 575

Asn Asn Gln Arg Asn Phe Leu Ala Gly Ser Asp Asp Asn
            580                 585

<210> SEQ ID NO 73
<211> LENGTH: 605
<212> TYPE: PRT
<213> ORGANISM: Oryza rufipogon

<400> SEQUENCE: 73

Met Ser Ala Leu Thr Thr Ser Gln Leu Ala Thr Ser Ala Thr Gly Phe
1               5                   10                  15

Gly Ile Ala Asp Arg Ser Ala Pro Ser Ser Leu Leu Arg His Gly Phe
            20                  25                  30

Gln Gly Leu Lys Pro Arg Ser Pro Ala Gly Gly Asp Ala Thr Ser Leu
        35                  40                  45

Ser Val Thr Thr Ser Ala Arg Ala Thr Pro Lys Gln Gln Arg Ser Val
    50                  55                  60

Gln Arg Gly Ser Arg Arg Phe Pro Ser Val Val Tyr Ala Thr Gly
65                  70                  75                  80

Ala Gly Met Asn Val Val Phe Val Gly Ala Glu Met Ala Pro Trp Ser
                85                  90                  95

Lys Thr Gly Gly Leu Gly Asp Val Leu Gly Gly Leu Pro Pro Ala Met
            100                 105                 110

Ala Ala Asn Gly His Arg Val Met Val Ile Ser Pro Arg Tyr Asp Gln

```
            115                 120                 125
Tyr Lys Asp Ala Trp Asp Thr Ser Val Val Ala Glu Ile Lys Val Ala
    130                 135                 140

Asp Arg Tyr Glu Arg Val Arg Phe Phe His Cys Tyr Lys Arg Gly Val
145                 150                 155                 160

Asp Arg Val Phe Val Asp His Pro Ser Phe Leu Glu Lys Val Trp Gly
                165                 170                 175

Lys Thr Gly Glu Lys Ile Tyr Gly Pro Asp Thr Gly Val Asp Tyr Lys
                180                 185                 190

Asp Asn Gln Met Arg Phe Ser Leu Leu Cys Gln Ala Pro Arg Ile Leu
                195                 200                 205

Asn Leu Asn Asn Asn Pro Tyr Phe Lys Gly Thr Tyr Gly Glu Asp Val
    210                 215                 220

Val Phe Val Cys Asn Asp Trp His Thr Gly Pro Leu Ala Ser Tyr Leu
225                 230                 235                 240

Lys Asn Asn Tyr Gln Pro Asn Gly Ile Tyr Arg Asn Ala Lys Val Ala
                245                 250                 255

Phe Cys Ile His Asn Ile Ser Tyr Gln Gly Arg Phe Ala Phe Glu Asp
                260                 265                 270

Tyr Pro Glu Leu Asn Leu Ser Glu Arg Phe Arg Ser Ser Phe Asp Phe
                275                 280                 285

Ile Asp Gly Tyr Asp Thr Pro Val Glu Gly Arg Lys Ile Asn Trp Met
                290                 295                 300

Lys Ala Gly Ile Leu Glu Ala Asp Arg Val Leu Thr Val Ser Pro Tyr
305                 310                 315                 320

Tyr Ala Glu Glu Leu Ile Ser Gly Ile Ala Arg Gly Cys Glu Leu Asp
                325                 330                 335

Asn Ile Met Arg Leu Thr Gly Ile Thr Gly Ile Val Asn Gly Met Asp
                340                 345                 350

Val Ser Glu Trp Asp Pro Ser Lys Asp Lys Tyr Ile Thr Ala Lys Tyr
                355                 360                 365

Asp Ala Thr Thr Ala Ile Glu Ala Lys Ala Leu Asn Lys Glu Ala Leu
                370                 375                 380

Gln Ala Glu Ala Gly Leu Pro Val Asp Arg Lys Ile Pro Leu Ile Ala
385                 390                 395                 400

Phe Ile Gly Arg Leu Glu Glu Gln Lys Gly Pro Asp Val Met Ala Ala
                405                 410                 415

Ala Ile Pro Glu Leu Met Gln Glu Asp Val Gln Ile Val Leu Leu Gly
                420                 425                 430

Thr Gly Lys Lys Lys Phe Glu Lys Leu Leu Lys Ser Met Glu Glu Lys
                435                 440                 445

Tyr Pro Gly Lys Val Arg Ala Val Val Lys Phe Asn Ala Pro Leu Ala
    450                 455                 460

His Leu Ile Met Ala Gly Ala Asp Val Leu Ala Val Pro Ser Arg Phe
465                 470                 475                 480

Glu Pro Cys Gly Leu Ile Gln Leu Gln Gly Met Arg Tyr Gly Thr Pro
                485                 490                 495

Cys Ala Cys Ala Ser Thr Gly Gly Leu Val Asp Thr Val Ile Glu Gly
                500                 505                 510

Lys Thr Gly Phe His Met Gly Arg Leu Ser Val Asp Cys Lys Val Val
                515                 520                 525

Glu Pro Ser Asp Val Lys Lys Val Ala Ala Thr Leu Lys Arg Ala Ile
    530                 535                 540
```

```
Lys Val Val Gly Thr Pro Ala Tyr Glu Glu Met Val Arg Asn Cys Met
545                 550                 555                 560

Asn Gln Asp Leu Ser Trp Lys Gly Pro Ala Lys Asn Trp Glu Asn Val
                565                 570                 575

Leu Leu Gly Leu Gly Val Ala Gly Ser Ala Pro Gly Ile Glu Gly Asp
            580                 585                 590

Glu Ile Ala Pro Leu Ala Lys Glu Asn Val Ala Ala Pro
        595                 600                 605

<210> SEQ ID NO 74
<211> LENGTH: 609
<212> TYPE: PRT
<213> ORGANISM: Oryza officinalis

<400> SEQUENCE: 74

Met Ser Ala Leu Thr Thr Ser Gln Leu Ala Thr Ser Ala Thr Gly Phe
1               5                   10                  15

Gly Ile Ala Asp Arg Ser Ala Pro Ser Ser Leu Leu Arg His Gly Phe
            20                  25                  30

Gln Gly Leu Lys Pro Arg Ser Pro Ala Gly Gly Asp Ala Ser Ser Leu
        35                  40                  45

Ser Val Thr Thr Ser Ala Arg Ala Thr Pro Lys Gln Gln Arg Ser Val
50                  55                  60

Gln Arg Gly Ser Arg Arg Phe Pro Ser Val Val Val Tyr Ala Thr Gly
65                  70                  75                  80

Ala Gly Met Asn Val Val Phe Val Gly Ala Glu Met Ala Pro Trp Ser
                85                  90                  95

Lys Thr Gly Gly Leu Gly Asp Val Leu Gly Gly Leu Pro Pro Ala Met
            100                 105                 110

Ala Ala Asn Gly His Arg Val Met Val Ile Ser Pro Arg His Asp Gln
        115                 120                 125

Tyr Lys Asp Ala Trp Asp Thr Ser Val Val Ala Glu Ile Lys Val Ala
    130                 135                 140

Asp Arg Tyr Glu Arg Val Arg Phe Phe His Cys Tyr Lys Arg Gly Val
145                 150                 155                 160

Asp Arg Val Phe Ile Asp His Pro Ser Phe Leu Glu Lys Val Trp Gly
                165                 170                 175

Lys Thr Gly Glu Lys Ile Tyr Gly Pro Asp Thr Gly Val Asp Tyr Lys
            180                 185                 190

Asp Asn Gln Met Arg Phe Ser Leu Leu Cys Gln Ala Ala Leu Glu Ala
        195                 200                 205

Pro Arg Ile Leu Asn Leu Asn Asn Asn Pro Tyr Phe Lys Gly Thr Tyr
    210                 215                 220

Gly Glu Asp Val Val Phe Val Cys Asn Asp Trp His Thr Gly Pro Leu
225                 230                 235                 240

Pro Ser Tyr Leu Lys Asn Asn Tyr Gln Pro Asn Gly Ile Tyr Arg Asn
                245                 250                 255

Ala Lys Val Ala Phe Cys Ile His Asn Ile Ser Tyr Gln Gly Arg Phe
            260                 265                 270

Ala Phe Glu Asp Tyr Pro Glu Leu Asn Leu Ser Glu Arg Phe Arg Ser
        275                 280                 285

Ser Phe Asp Phe Ile Asp Gly Tyr Asp Thr Pro Val Glu Gly Arg Lys
    290                 295                 300

Ile Asn Trp Met Lys Ala Gly Ile Leu Glu Ser Asp Arg Val Leu Thr
```

```
            305                 310                 315                 320
Val Ser Pro Tyr Tyr Ala Glu Glu Leu Ile Ser Gly Ile Ala Arg Gly
                325                 330                 335

Cys Glu Leu Asp Asn Ile Met Arg Leu Thr Gly Ile Thr Gly Ile Val
                340                 345                 350

Asn Gly Met Asp Val Ser Glu Trp Asp Pro Ser Lys Asp Lys Tyr Ile
                355                 360                 365

Ala Ala Lys Tyr Asp Ala Thr Thr Ala Ile Glu Ala Lys Ala Leu Asn
            370                 375                 380

Lys Glu Ala Leu Gln Ala Glu Ala Gly Leu Pro Val Asp Arg Lys Ile
385                 390                 395                 400

Pro Leu Ile Ala Phe Ile Gly Arg Leu Glu Glu Gln Lys Gly Pro Asp
                    405                 410                 415

Val Met Ala Ala Ala Ile Pro Glu Leu Met Gln Glu Asn Val Gln Ile
                420                 425                 430

Val Leu Leu Gly Thr Gly Lys Lys Lys Phe Glu Lys Leu Leu Lys Ser
                435                 440                 445

Met Glu Glu Lys Tyr Pro Gly Lys Val Arg Ala Val Val Lys Phe Asn
450                 455                 460

Ala Pro Leu Ala His Leu Ile Met Ala Gly Ala Asp Val Leu Ala Val
465                 470                 475                 480

Pro Ser Arg Phe Glu Pro Cys Gly Leu Ile Gln Leu Gln Gly Met Arg
                485                 490                 495

Tyr Gly Thr Pro Cys Ala Cys Ala Ser Thr Gly Gly Leu Val Asp Thr
                500                 505                 510

Val Ile Glu Gly Lys Thr Gly Phe His Met Gly Arg Leu Ser Val Asp
                515                 520                 525

Cys Lys Val Val Glu Pro Ser Asp Val Gln Lys Val Ala Thr Thr Leu
                530                 535                 540

Lys Arg Ala Ile Lys Ile Val Gly Thr Pro Ala Tyr Asn Glu Met Val
545                 550                 555                 560

Arg Asn Cys Met Asn Gln Asp Leu Ser Trp Lys Gly Pro Ala Lys Asn
                565                 570                 575

Trp Glu Asn Val Leu Leu Gly Leu Gly Val Ala Gly Ser Ala Pro Gly
                580                 585                 590

Val Glu Gly Glu Glu Ile Ala Pro Leu Ala Lys Glu Asn Val Ala Ala
                595                 600                 605

Pro

<210> SEQ ID NO 75
<211> LENGTH: 603
<212> TYPE: PRT
<213> ORGANISM: Hordeum vulgare

<400> SEQUENCE: 75

Met Ala Ala Leu Ala Thr Ser Gln Leu Ala Thr Ser Gly Thr Val Leu
1               5                   10                  15

Gly Val Thr Asp Arg Phe Arg Arg Pro Gly Phe Gln Gly Leu Arg Pro
                20                  25                  30

Arg Asn Pro Ala Asp Ala Ala Leu Gly Met Arg Thr Ile Gly Ala Ser
                35                  40                  45

Ala Ala Pro Lys Gln Ser Arg Lys Ala His Gly Ser Arg Arg Cys
            50                  55                  60

Leu Ser Val Val Val Arg Ala Thr Gly Ser Gly Met Asn Leu Val Phe
```

-continued

```
                65                  70                  75                  80
Val Gly Ala Glu Met Ala Pro Trp Ser Lys Thr Gly Leu Gly Asp
                    85                  90                  95
Val Leu Gly Gly Leu Pro Pro Ala Met Ala Ala Asn Gly His Arg Val
                100                 105                 110
Met Val Ser Pro Arg Tyr Asp Gln Tyr Lys Asp Ala Trp Asp Thr
            115                 120                 125
Ser Val Ile Ser Glu Ile Lys Val Ala Asp Glu Tyr Glu Arg Val Arg
            130                 135                 140
Phe Phe His Cys Tyr Lys Arg Gly Val Asp Arg Val Phe Ile Asp His
145                 150                 155                 160
Pro Trp Phe Leu Glu Lys Val Arg Gly Lys Thr Lys Glu Lys Ile Tyr
                    165                 170                 175
Gly Pro Asp Ala Gly Thr Asp Tyr Glu Asp Asn Gln Gln Arg Phe Ser
                180                 185                 190
Leu Leu Cys Gln Ala Ala Leu Glu Ala Pro Arg Ile Leu Asn Leu Asn
                195                 200                 205
Asn Asn Pro Tyr Phe Ser Gly Pro Tyr Gly Glu Asp Val Val Phe Val
        210                 215                 220
Cys Asn Asp Trp His Thr Gly Leu Leu Ala Cys Tyr Leu Lys Ser Asn
225                 230                 235                 240
Tyr Gln Ser Asn Gly Ile Tyr Arg Thr Ala Lys Val Ala Phe Cys Ile
                245                 250                 255
His Asn Ile Ser Tyr Gln Gly Arg Phe Ser Phe Asp Asp Phe Ala Gln
            260                 265                 270
Leu Asn Leu Pro Asp Arg Phe Lys Ser Ser Phe Asp Phe Ile Asp Gly
            275                 280                 285
Tyr Asp Lys Pro Val Glu Gly Arg Lys Ile Asn Trp Met Lys Ala Gly
        290                 295                 300
Ile Leu Gln Ala Asp Lys Val Leu Thr Val Ser Pro Tyr Tyr Ala Glu
305                 310                 315                 320
Glu Leu Ile Ser Asp Glu Ala Arg Gly Cys Glu Leu Asp Asn Ile Met
                325                 330                 335
Arg Leu Thr Gly Ile Thr Gly Ile Val Asn Gly Met Asp Val Ser Glu
                340                 345                 350
Trp Asp Pro Thr Lys Asp Lys Phe Leu Ala Val Asn Tyr Asp Ile Thr
            355                 360                 365
Thr Ala Leu Glu Ala Lys Ala Leu Asn Lys Glu Ala Leu Gln Ala Glu
        370                 375                 380
Val Gly Leu Pro Val Asp Arg Lys Val Pro Leu Val Ala Phe Ile Gly
385                 390                 395                 400
Arg Leu Glu Glu Gln Lys Gly Pro Asp Val Met Ile Ala Ala Ile Pro
                405                 410                 415
Glu Ile Leu Lys Glu Glu Asp Val Gln Ile Ile Leu Leu Gly Thr Gly
                420                 425                 430
Lys Lys Lys Phe Glu Lys Leu Leu Lys Ser Met Glu Glu Lys Phe Pro
            435                 440                 445
Gly Lys Val Arg Ala Val Val Arg Phe Asn Ala Pro Leu Ala His Gln
        450                 455                 460
Met Met Ala Gly Ala Asp Leu Leu Ala Val Thr Ser Arg Phe Glu Pro
465                 470                 475                 480
Cys Gly Leu Ile Gln Leu Gln Gly Met Arg Tyr Gly Thr Pro Cys Val
                485                 490                 495
```

```
Cys Ala Ser Thr Gly Gly Leu Val Asp Thr Ile Val Glu Gly Lys Thr
            500                 505                 510

Gly Phe His Met Gly Arg Leu Ser Val Asp Cys Asn Val Val Glu Pro
            515                 520                 525

Ala Asp Val Lys Lys Val Ala Thr Thr Leu Lys Arg Ala Val Lys Val
530                 535                 540

Val Gly Thr Pro Ala Tyr Gln Glu Met Val Lys Asn Cys Met Ile Gln
545                 550                 555                 560

Asp Leu Ser Trp Lys Gly Pro Ala Lys Asn Trp Glu Asp Val Leu Leu
                565                 570                 575

Glu Leu Gly Val Glu Gly Ser Glu Pro Gly Ile Val Gly Glu Glu Ile
            580                 585                 590

Ala Pro Leu Ala Met Glu Asn Val Ala Ala Pro
            595                 600

<210> SEQ ID NO 76
<211> LENGTH: 495
<212> TYPE: PRT
<213> ORGANISM: Oryza brachyantha

<400> SEQUENCE: 76

Met Ala Thr Thr Val Phe Ser Arg Phe Ser Thr Tyr Phe Cys Val Leu
1               5                   10                  15

Leu Leu Cys His Gly Ser Met Ala Gln Leu Phe Asn Pro Ser Thr Asn
            20                  25                  30

Pro Trp His Asn Pro Arg Gln Gly Ser Ser Arg Glu Cys Arg Phe Asp
        35                  40                  45

Arg Leu Gln Pro Phe Glu Pro Leu Arg Lys Val Arg Ser Glu Ala Gly
    50                  55                  60

Val Thr Glu Tyr Phe Asp Glu Lys Asn Glu Leu Phe Gln Cys Thr Gly
65                  70                  75                  80

Thr Phe Val Ile Arg Arg Val Ile Gln Pro Gln Gly Leu Leu Val Pro
                85                  90                  95

Arg Tyr Thr Asn Ala Pro Gly Leu Val Tyr Ile Ile Gln Gly Arg Gly
            100                 105                 110

Ser Ile Gly Leu Thr Phe Pro Gly Cys Pro Ala Thr Tyr Gln Gln Gln
        115                 120                 125

Phe Gln Gln Phe Leu Pro Gln Glu Gln Ser Gln Ser Gln Lys Phe Arg
    130                 135                 140

Asp Glu His Gln Lys Ile His Gln Phe Arg Gln Gly Asp Ile Val Ala
145                 150                 155                 160

Leu Pro Ala Gly Val Ala His Trp Phe Tyr Asn Asp Gly Asp Ala Pro
                165                 170                 175

Val Val Ala Val Tyr Val Tyr Asp Val Lys Asn Ser Ala Asn Gln Leu
            180                 185                 190

Glu Pro Arg Gln Arg Glu Phe Leu Leu Gly Gly Asn Asn Met Arg Ala
        195                 200                 205

Gln Gln Val Tyr Gly Ser Ser Ala Glu Gln His Ser Arg Gln Asn Ile
    210                 215                 220

Phe Ser Gly Phe Gly Val Glu Ile Leu Ser Glu Ala Leu Gly Ile Ser
225                 230                 235                 240

Thr Val Thr Thr Lys Arg Leu Gln Ser Gln Asn Asp Gln Arg Gly Glu
                245                 250                 255

Ile Ile His Val Lys Asn Gly Leu Gln Phe Leu Lys Pro Thr Leu Thr
```

```
              260                 265                 270
Gln Gln Gln Glu Gln Ala Gln Ala Gln Tyr Gln Glu Val Gln Tyr Ser
            275                 280                 285

Glu Gln Gln Gln Thr Ser Ser Arg Trp Asn Gly Leu Asp Glu Asn Phe
            290                 295                 300

Cys Thr Ile Lys Ala Arg Met Asn Ile Glu Asn Thr Ser Arg Ala Asp
305                 310                 315                 320

Thr Tyr Asn Pro Arg Ala Gly Arg Thr Thr Ser Leu Asn Ser Gln Lys
                325                 330                 335

Phe Pro Ile Leu Asn Leu Val Gln Met Ser Ala Thr Arg Val Asn Leu
            340                 345                 350

Tyr Gln Asn Ala Ile Leu Ser Thr Phe Trp Asn Val Asn Ala His Ser
            355                 360                 365

Leu Val Tyr Thr Ile Gln Gly Arg Ala Arg Val Gln Val Val Ser Asn
            370                 375                 380

Phe Gly Lys Thr Val Phe Asp Gly Glu Leu Arg Pro Gly Gln Leu Leu
385                 390                 395                 400

Ile Ile Pro Gln His Tyr Val Val Leu Lys Lys Ala Gln Arg Glu Gly
                405                 410                 415

Phe Arg Tyr Ile Ala Ile Lys Thr Asn Ala Asn Ala Phe Val Ser Gln
                420                 425                 430

Leu Val Gly Lys Asn Ser Val Phe Arg Ser Leu Pro Val Asp Val Ile
            435                 440                 445

Ala Asn Val Tyr Arg Ile Ser Arg Glu Gln Ala Arg Ser Leu Lys Asn
            450                 455                 460

Asn Arg Gly Glu Glu His Gly Ala Phe Ala Pro Arg Ser Gln Gln Gln
465                 470                 475                 480

Ser Tyr Pro Gly Phe Ser Asn Gln Ser Glu Ser Glu Thr Ser Glu
                485                 490                 495

<210> SEQ ID NO 77
<211> LENGTH: 494
<212> TYPE: PRT
<213> ORGANISM: Oryza brachyantha

<400> SEQUENCE: 77

Met Ala Thr Thr Thr Phe Ser Arg Phe Ser Ile Tyr Phe Cys Val Leu
1               5                   10                  15

Leu Leu Cys His Gly Ser Met Ala Gln Leu Phe Ser Pro Thr Leu Asn
                20                  25                  30

Pro Trp His Ser Ser Arg Arg Gly Gly Ser Arg Asp Cys Arg Phe Asp
            35                  40                  45

Arg Leu Gln Ala Phe Glu Pro Leu Arg Arg Val Arg Ser Glu Ala Gly
50                  55                  60

Val Thr Glu Tyr Phe Asp Glu Arg Asn Glu Gln Phe Gln Cys Thr Gly
65                  70                  75                  80

Thr Phe Val Ile Arg Arg Val Ile Glu Pro Gln Gly Leu Leu Val Pro
                85                  90                  95

Arg Tyr Thr Asn Thr Pro Gly Val Val Tyr Ile Met Gln Gly Arg Gly
                100                 105                 110

Ser Met Gly Leu Thr Phe Pro Gly Cys Pro Ala Thr Tyr Gln Gln Gln
            115                 120                 125

Phe Gln Gln Phe Leu Pro Glu Gly Gln Ser Gln Ser Gln Lys Phe Arg
            130                 135                 140
```

```
Asp Glu His Gln Lys Ile His Gln Phe Arg Gln Gly Asp Ile Val Ala
145                 150                 155                 160

Leu Pro Ala Gly Val Ala His Trp Phe Tyr Asn Glu Gly Asp Thr Pro
            165                 170                 175

Val Val Ala Leu Tyr Val Phe Asp Ile Asn Asn Ser Ala Asn Gln Leu
            180                 185                 190

Glu Pro Arg Gln Lys Asp Phe Leu Leu Ala Gly Asn Asn Arg Glu
            195                 200                 205

Gln Gln Val Tyr Gly Arg Ser Ile Glu Lys His Ser Gly Gln Asn Ile
        210                 215                 220

Phe Ser Gly Phe Asn His Glu Leu Leu Ser Glu Ala Leu Gly Ile Ser
225                 230                 235                 240

Thr Leu Ala Ala Lys Arg Leu Gln Gly Gln Asn Asp His Arg Gly Glu
            245                 250                 255

Ile Ile Arg Val Arg Asn Gly Leu Gln Leu Leu Lys Pro Thr Phe Thr
            260                 265                 270

Gln Gln Gln Glu Gln Ala Gln Ser Gln Tyr Gln Val Gln Tyr Ser Glu
            275                 280                 285

Lys Gln Gln Glu Ser Thr Arg Cys Asn Gly Leu Asp Glu Asn Phe Cys
290                 295                 300

Thr Ile Asn Ala Arg Leu Asn Ile Glu Asn Pro Ser Arg Ala Asp Thr
305                 310                 315                 320

Tyr Asn Pro Arg Ala Gly Arg Ile Thr His Leu Asn Asn Gln Lys Phe
            325                 330                 335

Pro Ile Leu Asn Leu Val Gln Met Ser Ala Thr Arg Val Asn Leu Tyr
            340                 345                 350

Gln Asn Ala Ile Leu Ser Pro Tyr Trp Asn Val Asn Ala His Ser Leu
            355                 360                 365

Val Tyr Met Val Gln Gly His Ala Arg Val Gln Val Val Ser Asn Leu
            370                 375                 380

Gly Lys Thr Val Phe Asn Ser Val Leu Arg Pro Gly Gln Leu Leu Ile
385                 390                 395                 400

Ile Pro Gln His Tyr Val Val Leu Lys Lys Ala Glu Arg Glu Gly Cys
            405                 410                 415

Gln Tyr Ile Ala Phe Lys Thr Asn Ala Asn Ser Ile Val Ser Gln Leu
            420                 425                 430

Ala Gly Lys Asn Ser Ile Leu Arg Ala Met Pro Val Asp Val Val Ala
            435                 440                 445

Asn Ala Tyr Arg Ile Ser Arg Glu Gln Ala Arg Asp Leu Lys Asn Asn
            450                 455                 460

Arg Gly Glu Glu Leu Gly Ala Phe Thr Pro Lys Phe Glu Gln Gln Ser
465                 470                 475                 480

Tyr Pro Gly Leu Ser Asn Glu Ser Glu Ser Glu Ala Ser Glu
            485                 490
```

<210> SEQ ID NO 78
<211> LENGTH: 500
<212> TYPE: PRT
<213> ORGANISM: Zizania latifolia

<400> SEQUENCE: 78

```
Met Asn Met Ala Thr Ile Asn Gly Pro Thr Ile Phe Phe Thr Val Cys
1               5                   10                  15

Leu Phe Leu Leu Cys His Gly Ser Leu Ala Gln Leu Leu Gly Gln Ser
            20                  25                  30
```

```
Thr Ser Gln Trp Gln Ser Ser His Arg Gly Ser Ser Arg Gln Cys Arg
        35                  40                  45

Phe Asp Arg Leu Gln Ala Phe Glu Pro Val Arg Ser Val Arg Ser Gln
        50                  55                  60

Ala Gly Thr Thr Glu Phe Phe Asp Ala Ser Asn Glu Leu Phe Gln Cys
65                      70                  75                  80

Ala Gly Val Ser Ile Val Arg Arg Ile Glu Pro Arg Gly Leu Leu
                85                  90                  95

Leu Pro Gln Tyr Thr Asn Gly Ala Thr Ile Met Tyr Ile Ile Gln Gly
                100                 105                 110

Arg Gly Ile Thr Gly Gln Thr Phe Pro Gly Cys Pro Glu Ser Tyr Gln
                115                 120                 125

Gln Gln Phe Gln Gln Ser Met Gln Ala Gln Leu Thr Gly Ser Gln Ser
        130                 135                 140

Gln Ser Gln Lys Phe Lys Asp Glu His Gln Lys Ile Asn Arg Phe Arg
145                 150                 155                 160

Gln Gly Asp Val Ile Ala Leu Pro Ala Gly Val Ala His Trp Cys Tyr
                165                 170                 175

Asn Asp Gly Glu Val Pro Val Val Ala Ile Tyr Val Ile Asp Ile Asn
                180                 185                 190

Asn Ala Ala Asn Gln Leu Asp Pro Arg Gln Arg Asp Phe Leu Leu Ala
                195                 200                 205

Gly Asn Met Arg Ser Pro Gln Ala Tyr Arg Arg Glu Val Glu Asn Gln
                210                 215                 220

Ser Gln Asn Ile Phe Ser Gly Phe Ser Ala Glu Leu Leu Ser Glu Ala
225                 230                 235                 240

Leu Gly Ile Ser Thr Gly Val Ala Arg Gln Leu Gln Cys Gln Asn Asp
                245                 250                 255

Gln Arg Gly Glu Ile Val Arg Val Glu His Gly Leu Ser Leu Leu Gln
                260                 265                 270

Pro Tyr Ala Ser Leu Gln Glu Gln Glu Gln Lys Gln Glu Gln Pro Arg
        275                 280                 285

Glu Arg Tyr Gln Val Thr Gln His Gln Gln Ser Gln Tyr Gly Gly Gly
        290                 295                 300

Cys Ser Asn Gly Leu Asp Glu Thr Phe Cys Ala Met Arg Ile Trp Gln
305                 310                 315                 320

Asn Ile Asp Asn Pro Asn Leu Ala Asp Thr Tyr Asn Pro Arg Ala Gly
                325                 330                 335

Arg Val Thr Asn Leu Asn Ser Gln Lys Phe Pro Ile Leu Asn Leu Ile
                340                 345                 350

Gln Met Ser Ala Val Lys Val Asn Leu Tyr Gln Asn Ala Leu Leu Ser
                355                 360                 365

Pro Phe Trp Asn Ile Asn Ser His Ser Val Val Tyr Val Thr Gln Gly
        370                 375                 380

Cys Ala Arg Val Gln Val Val Asn Asn Asn Gly Lys Thr Val Phe Asn
385                 390                 395                 400

Gly Glu Leu Arg Arg Gly Gln Leu Leu Ile Ile Pro Gln His Tyr Val
                405                 410                 415

Val Val Lys Lys Ala Gln Arg Glu Gly Cys Ala Tyr Ile Ala Phe Lys
                420                 425                 430

Thr Asn Pro Asn Ser Met Val Ser His Ile Val Gly Lys Ser Ser Ile
                435                 440                 445
```

```
Phe Arg Ala Leu Pro Thr Asp Val Leu Ala Asn Ala Tyr Arg Ile Ser
            450                 455                 460

Arg Glu Asp Ala Gln Arg Leu Lys His Asn Arg Gly Asp Glu Leu Gly
465                 470                 475                 480

Ala Phe Thr Pro Leu Gln Tyr Lys Ser Tyr Gln Asp Val Ser Ser Val
                485                 490                 495

Ala Ala Ser Ser
            500

<210> SEQ ID NO 79
<211> LENGTH: 495
<212> TYPE: PRT
<213> ORGANISM: Oryza sativa

<400> SEQUENCE: 79

Met Thr Ile Ser Val Phe Ser Arg Phe Ser Ile Tyr Phe Cys Val Leu
1               5                   10                  15

Leu Leu Cys Asn Gly Ser Met Ala Gln Leu Phe Asp Pro Ala Thr Asn
            20                  25                  30

Gln Trp Gln Thr His Arg Gln Gly Ser Phe Arg Glu Cys Arg Phe Glu
        35                  40                  45

Arg Leu Gln Ala Phe Glu Pro Leu Gln Asn Val Arg Ser Glu Ala Gly
50                  55                  60

Val Thr Glu Tyr Phe Asp Glu Thr Asn Glu Leu Phe Gln Cys Thr Gly
65                  70                  75                  80

Thr Phe Val Ile Arg Arg Val Ile Gln Pro Gln Gly Leu Leu Ile Pro
                85                  90                  95

Arg Tyr Ala Asn Thr Pro Gly Met Val Tyr Ile Ile Gln Gly Arg Gly
            100                 105                 110

Ser Met Gly Leu Thr Phe Pro Gly Cys Pro Ala Thr Tyr Gln Gln Gln
        115                 120                 125

Ser Gln Gln Phe Leu Phe Gln Gly Glu Ser Gln Ser Gln Lys Phe Ile
130                 135                 140

Asp Glu His Gln Lys Ile His Gln Phe Arg Gln Gly Asp Ile Val Val
145                 150                 155                 160

Leu Pro Thr Gly Val Ala His Trp Phe Tyr Asn Asp Gly Asp Thr Pro
                165                 170                 175

Val Val Ala Leu Tyr Val Tyr Asp Ile Asn Asn Ser Ala Asn Gln Leu
            180                 185                 190

Glu Pro Arg His Arg Glu Phe Leu Leu Ala Gly Lys Asn Asn Arg Val
        195                 200                 205

Gln Gln Val Tyr Gly Arg Ser Ile Gln Gln His Ser Gly Gln Asn Ile
210                 215                 220

Phe Asn Gly Phe Ser Val Glu Pro Leu Ser Glu Ala Leu Asn Ile Asn
225                 230                 235                 240

Thr Val Thr Thr Lys Arg Leu Gln Ser Gln Asn Asp Gln Arg Gly Glu
                245                 250                 255

Ile Ile His Val Lys Asn Gly Leu Gln Leu Leu Lys Pro Thr Leu Thr
            260                 265                 270

Gln Arg Gln Glu Gln Glu Gln Ala Gln Tyr Gln Glu Val Gln Tyr Ser
        275                 280                 285

Glu Lys Pro Gln Thr Ser Ser Arg Trp Asn Gly Leu Glu Glu Asn Leu
290                 295                 300

Cys Thr Ile Lys Thr Arg Leu Asn Ile Glu Asn Pro Ser Arg Ala Asp
305                 310                 315                 320
```

-continued

```
Ser Tyr Asp Pro Arg Ala Gly Arg Ile Thr Ser Leu Asp Ser Gln Lys
                325                 330                 335

Phe Pro Ile Leu Asn Ile Ile Gln Met Ser Ala Thr Arg Val Asn Leu
            340                 345                 350

Tyr Gln Asn Ala Ile Leu Thr Pro Phe Trp Asn Val Asn Ala His Ser
        355                 360                 365

Leu Met Tyr Val Ile Arg Gly Arg Ala Arg Val Gln Val Val Ser Asn
370                 375                 380

Phe Gly Lys Thr Val Phe Asp Gly Val Leu Arg Pro Glu Gln Leu Leu
385                 390                 395                 400

Ile Ile Pro Gln Asn Tyr Val Val Leu Lys Lys Ala Gln His Glu Gly
                405                 410                 415

Cys Gln Tyr Ile Ala Ile Asn Thr Asn Ala Asn Ala Phe Val Ser His
            420                 425                 430

Leu Ala Gly Val Asp Ser Val Phe His Ala Leu Pro Val Asp Val Ile
        435                 440                 445

Ala Asn Ala Tyr Cys Ile Ser Arg Glu Glu Ala Arg Arg Leu Lys Asn
450                 455                 460

Asn Arg Gly Asp Glu Tyr Gly Pro Phe Pro Arg Leu Gln Gln Gln
465                 470                 475                 480

Ile Tyr Pro Glu Phe Ser Asn Glu Ser Lys Gly Glu Thr Ser Glu
                485                 490                 495

<210> SEQ ID NO 80
<211> LENGTH: 480
<212> TYPE: PRT
<213> ORGANISM: Oryza sativa

<400> SEQUENCE: 80

Leu Leu Cys His Gly Ser Met Ala Gln Ile Phe Ser Leu Gly Ile Asn
1               5                   10                  15

Pro Trp Gln Asn Pro Arg Gln Gly Gly Ser Arg Glu Cys Arg Phe Asp
            20                  25                  30

Arg Leu Gln Ala Phe Glu Pro Leu Arg Lys Val Arg His Glu Ala Gly
        35                  40                  45

Val Thr Glu Tyr Phe Asp Glu Lys Asn Glu Gln Phe Gln Cys Thr Gly
    50                  55                  60

Thr Leu Val Ile Arg Arg Ile Ile Glu Pro Gln Gly Leu Leu Leu Pro
65                  70                  75                  80

Arg Tyr Ser Asn Thr Pro Gly Leu Val Tyr Ile Ile Gln Gly Thr Gly
                85                  90                  95

Val Leu Gly Leu Thr Phe Pro Gly Cys Pro Ala Thr Tyr Gln Lys Gln
            100                 105                 110

Phe Arg His Phe Gly Leu Glu Gly Gly Ser Gln Arg Gln Gly Lys Lys
        115                 120                 125

Leu Arg Asp Glu Asn Gln Lys Ile His Gln Phe Arg Gln Gly Asp Val
    130                 135                 140

Val Ala Leu Pro Ser Gly Ile Pro His Trp Phe Tyr Asn Glu Gly Asp
145                 150                 155                 160

Thr Pro Val Val Ala Leu Phe Val Phe Asp Val Asn Asn Asn Ala Asn
                165                 170                 175

Gln Leu Glu Pro Arg Gln Lys Glu Phe Leu Leu Ala Gly Asn Asn Ile
            180                 185                 190

Glu Gln Gln Val Ser Asn Pro Ser Ile Asn Lys His Ser Gly Gln Asn
```

```
            195                 200                 205
Ile Phe Asn Gly Phe Asn Thr Lys Leu Leu Ser Glu Ala Leu Gly Val
    210                 215                 220

Asn Ile Glu Val Thr Arg Arg Leu Gln Ser Gln Asn Asp Arg Gly
225                 230                 235                 240

Asp Ile Ile Arg Val Lys Asn Gly Leu Arg Leu Ile Lys Pro Thr Ile
                245                 250                 255

Thr Gln Gln Gln Glu Gln Thr Gln Asp Gln Tyr Gln Gln Ile Gln Tyr
            260                 265                 270

His Arg Glu Gln Arg Ser Thr Ser Lys Tyr Asn Gly Leu Asp Glu Asn
        275                 280                 285

Phe Cys Ala Ile Arg Ala Arg Leu Asn Ile Glu Asn Pro Asn His Ala
    290                 295                 300

Asp Thr Tyr Asn Pro Arg Ala Gly Arg Ile Thr Asn Leu Asn Ser Gln
305                 310                 315                 320

Lys Phe Ser Ile Leu Asn Leu Val Gln Met Ser Ala Thr Arg Val Asn
                325                 330                 335

Leu Tyr Gln Asn Ala Ile Leu Ser Pro Phe Trp Asn Ile Asn Ala His
            340                 345                 350

Ser Leu Val Tyr Thr Ile Gln Gly Arg Ala Arg Val Gln Val Val Ser
        355                 360                 365

Asn His Gly Lys Ala Val Phe Asn Gly Val Leu Arg Pro Gly Gln Leu
    370                 375                 380

Leu Ile Ile Pro Gln Asn Tyr Val Val Met Lys Lys Ala Glu Leu Glu
385                 390                 395                 400

Gly Phe Gln Phe Ile Ala Phe Lys Thr Asn Pro Asn Ala Met Val Asn
                405                 410                 415

His Ile Ala Gly Lys Asn Ser Val Leu Arg Ala Met Pro Val Asp Val
            420                 425                 430

Ile Ala Asn Ala Tyr Arg Ile Ser Arg Gln Glu Ala Arg Ser Leu Lys
        435                 440                 445

Asn Asn Arg Gly Glu Glu Ile Gly Ala Phe Thr Pro Arg Tyr Gln Gln
    450                 455                 460

Gln Lys Ile His Gln Glu Tyr Ser Asn Pro Asn Glu Ser Glu Thr Gln
465                 470                 475                 480
```

<210> SEQ ID NO 81
<211> LENGTH: 518
<212> TYPE: PRT
<213> ORGANISM: Avena sativa

<400> SEQUENCE: 81

```
Met Ala Thr Thr Arg Phe Pro Ser Leu Leu Phe Tyr Ser Cys Ile Phe
1               5                   10                  15

Leu Leu Cys Asn Gly Ser Met Ala Gln Leu Phe Gly Gln Ser Phe Thr
            20                  25                  30

Pro Trp Gln Ser Ser Arg Gln Gly Gly Leu Arg Gly Cys Arg Phe Asp
        35                  40                  45

Arg Leu Gln Ala Phe Glu Pro Leu Arg Gln Val Arg Ser Gln Ala Gly
    50                  55                  60

Ile Thr Glu Tyr Phe Asp Glu Gln Asn Glu Gln Phe Arg Cys Ala Gly
65                  70                  75                  80

Val Ser Val Ile Arg Arg Val Ile Glu Pro Gln Gly Leu Leu Leu Pro
                85                  90                  95
```

```
Gln Tyr His Asn Ala Pro Gly Leu Val Tyr Ile Leu Gln Gly Arg Gly
                100                 105                 110

Phe Thr Gly Leu Thr Phe Pro Gly Cys Pro Ala Thr Phe Gln Gln Gln
            115                 120                 125

Phe Gln Pro Phe Asp Gln Ala Arg Phe Ala Gln Gly Gln Ser Lys Ser
        130                 135                 140

Gln Asn Leu Lys Asp Glu His Gln Arg Val His His Ile Lys Gln Gly
145                 150                 155                 160

Asp Val Val Ala Leu Pro Ala Gly Ile Val His Trp Cys Tyr Asn Asp
                165                 170                 175

Gly Asp Ala Pro Ile Val Ala Val Tyr Val Phe Asp Val Asn Asn Asn
            180                 185                 190

Ala Asn Gln Leu Glu Pro Arg Gln Lys Glu Phe Leu Leu Ala Gly Asn
        195                 200                 205

Asn Lys Arg Glu Gln Gln Phe Gly Gln Asn Ile Phe Ser Gly Phe Ser
210                 215                 220

Val Gln Leu Leu Ser Glu Ala Leu Gly Ile Ser Gln Gln Ala Ala Gln
225                 230                 235                 240

Lys Ile Gln Ser Gln Asn Asp Gln Arg Gly Glu Ile Ile Arg Val Ser
                245                 250                 255

Gln Gly Leu Gln Phe Leu Lys Pro Phe Val Ser Gln Gln Gly Pro Val
            260                 265                 270

Glu His Gln Ala Tyr Gln Pro Ile Gln Ser Gln Gln Glu Gln Ser Thr
        275                 280                 285

Gln Tyr Gln Val Gly Gln Ser Pro Gln Tyr Gln Glu Gly Gln Ser Thr
        290                 295                 300

Gln Tyr Gln Ser Gly Gln Ser Trp Asp Gln Ser Phe Asn Gly Leu Glu
305                 310                 315                 320

Glu Asn Phe Cys Ser Leu Glu Ala Arg Gln Asn Ile Glu Asn Pro Lys
                325                 330                 335

Arg Ala Asp Thr Tyr Asn Pro Arg Ala Gly Arg Ile Thr His Leu Asn
            340                 345                 350

Ser Lys Asn Phe Pro Thr Leu Asn Leu Val Gln Met Ser Ala Thr Arg
        355                 360                 365

Val Asn Leu Tyr Gln Asn Ala Ile Leu Ser Pro Tyr Trp Asn Ile Asn
370                 375                 380

Ala His Ser Val Met His Met Ile Gln Gly Arg Ala Arg Val Gln Val
385                 390                 395                 400

Val Asn Asn His Gly Gln Thr Val Phe Asn Asp Ile Leu Arg Arg Gly
                405                 410                 415

Gln Leu Leu Ile Ile Pro Gln His Tyr Val Val Leu Lys Lys Ala Glu
            420                 425                 430

Arg Glu Gly Cys Gln Tyr Ile Ser Phe Lys Thr Thr Pro Asn Ser Met
        435                 440                 445

Val Ser Tyr Ile Ala Gly Lys Thr Ser Ile Leu Arg Ala Leu Pro Val
        450                 455                 460

Asp Val Leu Ala Asn Ala Tyr Arg Ile Ser Arg Gln Glu Ser Gln Asn
465                 470                 475                 480

Leu Lys Asn Asn Arg Gly Glu Glu Phe Gly Ala Phe Thr Pro Lys Phe
                485                 490                 495

Ala Gln Thr Gly Ser Gln Ser Tyr Gln Asp Glu Gly Glu Ser Ser Ser
            500                 505                 510

Thr Glu Lys Ala Ser Glu
```

<210> SEQ ID NO 82
<211> LENGTH: 454
<212> TYPE: PRT
<213> ORGANISM: Oryza sativa

<400> SEQUENCE: 82

```
Cys Arg Phe Asp Arg Leu Gln Ala Phe Glu Pro Ile Arg Ser Val Arg
1               5                   10                  15

Ser Gln Ala Gly Thr Thr Glu Phe Phe Asp Val Ser Asn Glu Gln Phe
            20                  25                  30

Gln Cys Thr Gly Val Ser Ala Val Arg Arg Val Ile Glu Pro Arg Gly
        35                  40                  45

Leu Leu Leu Pro His Tyr Thr Asn Gly Ala Ser Leu Val Tyr Ile Ile
    50                  55                  60

Gln Gly Arg Gly Ile Thr Gly Pro Thr Phe Pro Gly Cys Pro Glu Ser
65                  70                  75                  80

Tyr Gln Gln Gln Phe Gln Gln Ser Gly Gln Ala Gln Leu Thr Glu Ser
                85                  90                  95

Gln Ser Gln Ser His Lys Phe Lys Asp Glu His Gln Lys Ile His Arg
            100                 105                 110

Phe Arg Gln Gly Asp Val Ile Ala Leu Pro Ala Gly Val Ala His Trp
        115                 120                 125

Cys Tyr Asn Asp Gly Glu Val Pro Val Val Ala Ile Tyr Val Thr Asp
    130                 135                 140

Leu Asn Asn Gly Ala Asn Gln Leu Asp Pro Arg Gln Arg Asp Phe Leu
145                 150                 155                 160

Leu Ala Gly Asn Lys Arg Asn Pro Gln Ala Tyr Arg Arg Glu Val Glu
                165                 170                 175

Glu Arg Ser Gln Asn Ile Phe Ser Gly Phe Ser Thr Glu Leu Leu Ser
            180                 185                 190

Glu Ala Leu Gly Val Ser Ser Gln Val Ala Arg Gln Leu Gln Cys Gln
        195                 200                 205

Asn Asp Gln Arg Gly Glu Ile Val Arg Val Glu His Gly Leu Ser Leu
    210                 215                 220

Leu Gln Pro Tyr Ala Ser Leu Gln Glu Gln Glu Gln Gly Gln Val Gln
225                 230                 235                 240

Ser Arg Glu Arg Tyr Gln Glu Gly Gln Tyr Gln Ser Gln Tyr Gly
                245                 250                 255

Ser Gly Cys Ser Asn Gly Leu Asp Glu Thr Phe Cys Thr Met Lys Val
            260                 265                 270

Arg Gln Asn Ile Asp Asn Pro Asn Arg Ala Asp Thr Tyr Asn Pro Arg
        275                 280                 285

Ala Gly Arg Val Thr Asn Leu Asn Thr Gln Asn Phe Pro Ile Leu Asn
    290                 295                 300

Leu Val Gln Met Ser Ala Val Lys Val Asn Leu Tyr Gln Asn Ala Leu
305                 310                 315                 320

Leu Ser Pro Phe Trp Asn Ile Asn Ala His Ser Val Val Tyr Ile Thr
                325                 330                 335

Gln Gly Arg Ala Arg Val Gln Val Val Asn Asn Asn Gly Lys Thr Val
            340                 345                 350

Phe Asn Gly Glu Leu Arg Arg Gly Gln Leu Leu Ile Ile Pro Gln His
        355                 360                 365
```

```
Tyr Ala Val Val Lys Lys Ala Gln Arg Glu Gly Cys Ala Tyr Ile Ala
    370                 375                 380

Phe Lys Thr Asn Pro Asn Ser Met Val Ser His Ile Ala Gly Lys Ser
385                 390                 395                 400

Ser Ile Phe Arg Ala Leu Pro Asn Asp Val Leu Ala Asn Ala Tyr Arg
                405                 410                 415

Ile Ser Arg Glu Glu Ala Gln Arg Leu Lys His Asn Arg Gly Asp Glu
            420                 425                 430

Phe Gly Ala Phe Thr Pro Ile Gln Tyr Lys Ser Tyr Gln Asp Val Tyr
        435                 440                 445

Asn Ala Ala Glu Ser Ser
    450

<210> SEQ ID NO 83
<211> LENGTH: 500
<212> TYPE: PRT
<213> ORGANISM: Zizania latifolia

<400> SEQUENCE: 83

Met Asn Met Ala Thr Ile Asn Gly Pro Thr Ile Phe Phe Thr Val Cys
1               5                   10                  15

Leu Phe Leu Leu Cys His Gly Ser Leu Ala Gln Leu Leu Gly Gln Ser
                20                  25                  30

Thr Ser Gln Trp Gln Ser Ser His Arg Gly Ser Ser Arg Gln Cys Arg
            35                  40                  45

Phe Asp Arg Leu Gln Ala Phe Glu Pro Val Arg Ser Val Arg Ser Gln
        50                  55                  60

Ala Gly Thr Thr Glu Phe Phe Asp Ala Ser Asn Glu Leu Phe Gln Cys
65                  70                  75                  80

Ala Gly Val Ser Ile Val Arg Arg Ile Ile Glu Pro Arg Gly Leu Leu
                85                  90                  95

Leu Pro Gln Tyr Thr Asn Gly Ala Thr Ile Met Tyr Ile Ile Gln Gly
                100                 105                 110

Arg Gly Ile Thr Gly Gln Thr Phe Pro Gly Cys Pro Glu Ser Tyr Gln
            115                 120                 125

Gln Gln Phe Gln Gln Ser Met Gln Ala Gln Leu Thr Gly Ser Gln Ser
        130                 135                 140

Gln Ser Gln Lys Phe Lys Asp Glu His Gln Lys Ile Asn Arg Phe Arg
145                 150                 155                 160

Gln Gly Asp Val Ile Ala Leu Pro Ala Gly Val Ala His Trp Cys Tyr
                165                 170                 175

Asn Asp Gly Glu Val Pro Val Val Ala Ile Tyr Val Ile Asp Ile Asn
                180                 185                 190

Asn Ala Ala Asn Gln Leu Asp Pro Arg Gln Arg Asp Phe Leu Leu Ala
            195                 200                 205

Gly Asn Met Arg Ser Pro Gln Ala Tyr Arg Arg Glu Val Glu Asn Gln
        210                 215                 220

Ser Gln Asn Ile Phe Ser Gly Phe Ser Ala Glu Leu Leu Ser Glu Ala
225                 230                 235                 240

Leu Gly Ile Ser Thr Gly Val Ala Arg Gln Leu Gln Cys Gln Asn Asp
                245                 250                 255

Gln Arg Gly Glu Ile Val Arg Val Glu His Gly Leu Ser Leu Leu Gln
            260                 265                 270

Pro Tyr Ala Ser Leu Gln Glu Gln Glu Gln Lys Gln Glu Gln Pro Arg
        275                 280                 285
```

```
Glu Arg Tyr Gln Val Thr Gln His Gln Gln Ser Gln Tyr Gly Gly Gly
    290                 295                 300

Cys Ser Asn Gly Leu Asp Glu Thr Phe Cys Ala Met Arg Ile Trp Gln
305                 310                 315                 320

Asn Ile Asp Asn Pro Asn Leu Ala Asp Thr Tyr Asn Pro Arg Ala Gly
                325                 330                 335

Arg Val Thr Asn Leu Asn Ser Gln Lys Phe Pro Ile Leu Asn Leu Ile
            340                 345                 350

Gln Met Ser Ala Val Lys Val Asn Leu Tyr Gln Asn Ala Leu Leu Ser
        355                 360                 365

Pro Phe Trp Asn Ile Asn Ser His Ser Val Val Tyr Val Thr Gln Gly
    370                 375                 380

Cys Ala Arg Val Gln Val Val Asn Asn Asn Gly Lys Thr Val Phe Asn
385                 390                 395                 400

Gly Glu Leu Arg Arg Gly Gln Leu Leu Ile Ile Pro Gln His Tyr Val
                405                 410                 415

Val Val Lys Lys Ala Gln Arg Glu Gly Cys Ala Tyr Ile Ala Phe Lys
            420                 425                 430

Thr Asn Pro Asn Ser Met Val Ser His Ile Val Gly Lys Ser Ser Ile
        435                 440                 445

Phe Arg Ala Leu Pro Thr Asp Val Leu Ala Asn Ala Tyr Arg Ile Ser
    450                 455                 460

Arg Glu Asp Ala Gln Arg Leu Lys His Asn Arg Gly Asp Glu Leu Gly
465                 470                 475                 480

Ala Phe Thr Pro Leu Gln Tyr Lys Ser Tyr Gln Asp Val Ser Ser Val
                485                 490                 495

Ala Ala Ser Ser
            500

<210> SEQ ID NO 84
<211> LENGTH: 527
<212> TYPE: PRT
<213> ORGANISM: Avena sativa

<400> SEQUENCE: 84

Met Ala Thr Thr Ser Phe Pro Ser Met Leu Phe Tyr Phe Cys Ile Phe
1               5                   10                  15

Leu Leu Phe His Gly Ser Met Ala Gln Leu Phe Gly Gln Ser Ser Thr
                20                  25                  30

Pro Trp Gln Ser Ser Arg Gln Gly Gly Leu Arg Gly Cys Arg Phe Asp
            35                  40                  45

Arg Leu Gln Ala Phe Glu Pro Leu Arg Gln Val Arg Ser Gln Ala Gly
        50                  55                  60

Ile Thr Glu Tyr Phe Asp Glu Gln Asn Glu Gln Phe Arg Cys Thr Gly
65                  70                  75                  80

Val Ser Val Ile Arg Arg Val Ile Glu Pro Gln Gly Leu Val Leu Pro
                85                  90                  95

Gln Tyr His Asn Ala Pro Ala Leu Val Tyr Ile Leu Gln Gly Arg Gly
            100                 105                 110

Phe Thr Gly Leu Thr Phe Pro Gly Cys Pro Ala Thr Phe Gln Gln Gln
        115                 120                 125

Phe Gln Pro Phe Asp Gln Ser Gln Phe Ala Gln Gly Gln Arg Gln Ser
    130                 135                 140

Gln Thr Ile Lys Asp Glu His Gln Arg Val Gln Arg Phe Lys Gln Gly
```

```
               145                 150                 155                 160
       Asp Val Val Ala Leu Pro Ala Gly Ile Val His Trp Cys Tyr Asn Asp
                           165                 170                 175
       Gly Asp Ala Pro Ile Val Ala Ile Tyr Val Phe Asp Val Asn Asn Asn
                           180                 185                 190
       Ala Asn Gln Leu Glu Pro Arg Gln Lys Glu Phe Leu Leu Ala Gly Asn
                           195                 200                 205
       Asn Lys Arg Glu Gln Gln Ser Gly Asn Asn Ile Phe Ser Gly Leu Ser
                           210                 215                 220
       Val Gln Leu Leu Ser Glu Ala Leu Gly Ile Ser Gln Gln Ala Ala Gln
       225                 230                 235                 240
       Arg Ile Gln Ser Gln Asn Asp Gln Arg Gly Glu Ile Ile Arg Val Ser
                           245                 250                 255
       Gln Gly Leu Gln Phe Leu Lys Pro Ile Val Ser Gln Gln Val Pro Gly
                           260                 265                 270
       Glu Gln Gln Val Tyr Gln Pro Ile Gln Thr Gln Glu Gly Gln Ala Thr
                           275                 280                 285
       Gln Tyr Gln Val Gly Gln Ser Thr Gln Tyr Gln Val Gly Lys Ser Thr
                           290                 295                 300
       Pro Tyr Gln Gly Gly Gln Ser Ser Gln Tyr Gln Ala Gly Gln Ser Trp
       305                 310                 315                 320
       Asp Gln Ser Phe Asn Gly Leu Glu Glu Asn Phe Cys Ser Leu Glu Ala
                           325                 330                 335
       Arg Lys Asn Ile Glu Asn Pro Gln His Ala Asp Thr Tyr Asn Pro Arg
                           340                 345                 350
       Ala Gly Arg Ile Thr Arg Leu Asn Ser Lys Asn Phe Pro Ile Leu Asn
                           355                 360                 365
       Ile Val Gln Met Ser Ala Thr Arg Val Asn Leu Tyr Gln Asn Ala Ile
                           370                 375                 380
       Leu Ser Pro Phe Trp Asn Ile Asn Ala His Ser Val Ile Tyr Met Ile
       385                 390                 395                 400
       Gln Gly His Ala Arg Val Gln Val Val Asn Asn Asn Gly Gln Thr Val
                           405                 410                 415
       Phe Asn Asp Ile Leu Arg Arg Gly Gln Leu Leu Ile Val Pro Gln His
                           420                 425                 430
       Phe Val Val Leu Lys Lys Ala Glu Arg Glu Gly Cys Gln Tyr Ile Ser
                           435                 440                 445
       Phe Lys Thr Asn Pro Asn Ser Met Val Ser His Ile Ala Gly Lys Ser
                           450                 455                 460
       Ser Ile Leu Arg Ala Leu Pro Ile Asp Val Leu Ala Asn Ala Tyr Arg
       465                 470                 475                 480
       Ile Ser Arg Gln Glu Ala Arg Asn Leu Lys Asn Asn Arg Gly Glu Glu
                           485                 490                 495
       Phe Gly Ala Phe Thr Pro Lys Leu Thr Gln Lys Gly Phe Gln Ser Tyr
                           500                 505                 510
       Gln Asp Ile Glu Glu Gly Ser Ser Ser Pro Val Arg Ala Ser Glu
                           515                 520                 525

<210> SEQ ID NO 85
<211> LENGTH: 14
<212> TYPE: PRT
<213> ORGANISM: Artificial Sequence
<220> FEATURE:
<223> OTHER INFORMATION: Synthetic peptide
```

```
<400> SEQUENCE: 85

Ile Leu Asp Leu Ala Ile Pro Val Asn Arg Pro Gly Gln Leu
1               5                   10

<210> SEQ ID NO 86
<211> LENGTH: 14
<212> TYPE: PRT
<213> ORGANISM: Artificial Sequence
<220> FEATURE:
<223> OTHER INFORMATION: Synthetic peptide

<400> SEQUENCE: 86

Val Leu Glu Leu Ala Ile Pro Val Asn Arg Pro Gly Gln Leu
1               5                   10

<210> SEQ ID NO 87
<211> LENGTH: 14
<212> TYPE: PRT
<213> ORGANISM: Artificial Sequence
<220> FEATURE:
<223> OTHER INFORMATION: Synthetic peptide

<400> SEQUENCE: 87

Val Leu Asp Leu Ala Val Pro Val Asn Arg Pro Gly Gln Leu
1               5                   10

<210> SEQ ID NO 88
<211> LENGTH: 14
<212> TYPE: PRT
<213> ORGANISM: Artificial Sequence
<220> FEATURE:
<223> OTHER INFORMATION: Synthetic peptide

<400> SEQUENCE: 88

Val Leu Asp Leu Ala Ile Pro Ile Asn Arg Pro Gly Gln Leu
1               5                   10

<210> SEQ ID NO 89
<211> LENGTH: 14
<212> TYPE: PRT
<213> ORGANISM: Artificial Sequence
<220> FEATURE:
<223> OTHER INFORMATION: Synthetic peptide

<400> SEQUENCE: 89

Val Leu Asp Leu Ala Ile Pro Val Asn Lys Pro Gly Gln Leu
1               5                   10

<210> SEQ ID NO 90
<211> LENGTH: 14
<212> TYPE: PRT
<213> ORGANISM: Artificial Sequence
<220> FEATURE:
<223> OTHER INFORMATION: Synthetic peptide

<400> SEQUENCE: 90

Val Leu Asp Leu Ala Ile Pro Val Glu Lys Pro Gly Gln Leu
1               5                   10

<210> SEQ ID NO 91
<211> LENGTH: 14
<212> TYPE: PRT
<213> ORGANISM: Artificial Sequence
<220> FEATURE:
<223> OTHER INFORMATION: Synthetic peptide

<400> SEQUENCE: 91
```

```
Val Leu Asp Leu Ala Ile Pro Val Asn Lys Pro Gly Glu Leu
1               5                   10
```

<210> SEQ ID NO 92
<211> LENGTH: 14
<212> TYPE: PRT
<213> ORGANISM: Artificial Sequence
<220> FEATURE:
<223> OTHER INFORMATION: Synthetic peptide

<400> SEQUENCE: 92

```
Ile Leu Glu Leu Ala Ile Pro Val Asn Arg Pro Gly Gln Leu
1               5                   10
```

<210> SEQ ID NO 93
<211> LENGTH: 14
<212> TYPE: PRT
<213> ORGANISM: Artificial Sequence
<220> FEATURE:
<223> OTHER INFORMATION: Synthetic peptide

<400> SEQUENCE: 93

```
Ile Leu Asp Leu Ala Val Pro Val Asn Arg Pro Gly Gln Leu
1               5                   10
```

<210> SEQ ID NO 94
<211> LENGTH: 14
<212> TYPE: PRT
<213> ORGANISM: Artificial Sequence
<220> FEATURE:
<223> OTHER INFORMATION: Synthetic peptide

<400> SEQUENCE: 94

```
Val Leu Glu Leu Ala Val Pro Val Asn Arg Pro Gly Gln Leu
1               5                   10
```

<210> SEQ ID NO 95
<211> LENGTH: 14
<212> TYPE: PRT
<213> ORGANISM: Artificial Sequence
<220> FEATURE:
<223> OTHER INFORMATION: Synthetic peptide

<400> SEQUENCE: 95

```
Val Leu Glu Leu Ala Ile Pro Val Asn Lys Pro Gly Gln Leu
1               5                   10
```

<210> SEQ ID NO 96
<211> LENGTH: 14
<212> TYPE: PRT
<213> ORGANISM: Artificial Sequence
<220> FEATURE:
<223> OTHER INFORMATION: Synthetic peptide

<400> SEQUENCE: 96

```
Ile Leu Asp Leu Ala Ile Pro Val Asn Lys Pro Gly Gln Leu
1               5                   10
```

<210> SEQ ID NO 97
<211> LENGTH: 14
<212> TYPE: PRT
<213> ORGANISM: Artificial Sequence
<220> FEATURE:
<223> OTHER INFORMATION: Synthetic peptide

<400> SEQUENCE: 97

```
Val Leu Asp Leu Ala Val Pro Val Asn Lys Pro Gly Gln Leu
1               5                   10
```

<210> SEQ ID NO 98
<211> LENGTH: 14
<212> TYPE: PRT
<213> ORGANISM: Artificial Sequence
<220> FEATURE:
<223> OTHER INFORMATION: Synthetic peptide

<400> SEQUENCE: 98

```
Val Leu Asp Leu Ala Ile Pro Val Glu Lys Pro Gly Glu Leu
1               5                   10
```

<210> SEQ ID NO 99
<211> LENGTH: 14
<212> TYPE: PRT
<213> ORGANISM: Artificial Sequence
<220> FEATURE:
<223> OTHER INFORMATION: Synthetic peptide

<400> SEQUENCE: 99

```
Ile Leu Asp Leu Ala Ile Pro Val Asn Lys Pro Gly Glu Leu
1               5                   10
```

<210> SEQ ID NO 100
<211> LENGTH: 14
<212> TYPE: PRT
<213> ORGANISM: Artificial Sequence
<220> FEATURE:
<223> OTHER INFORMATION: Synthetic peptide

<400> SEQUENCE: 100

```
Val Leu Glu Leu Ala Ile Pro Val Glu Lys Pro Gly Gln Leu
1               5                   10
```

<210> SEQ ID NO 101
<211> LENGTH: 14
<212> TYPE: PRT
<213> ORGANISM: Artificial Sequence
<220> FEATURE:
<223> OTHER INFORMATION: Synthetic peptide

<400> SEQUENCE: 101

```
Ile Leu Glu Leu Ala Val Pro Val Asn Arg Pro Gly Gln Leu
1               5                   10
```

<210> SEQ ID NO 102
<211> LENGTH: 14
<212> TYPE: PRT
<213> ORGANISM: Artificial Sequence
<220> FEATURE:
<223> OTHER INFORMATION: Synthetic peptide

<400> SEQUENCE: 102

```
Ile Leu Glu Leu Ala Ile Pro Val Asn Lys Pro Gly Gln Leu
1               5                   10
```

<210> SEQ ID NO 103
<211> LENGTH: 14
<212> TYPE: PRT
<213> ORGANISM: Artificial Sequence
<220> FEATURE:
<223> OTHER INFORMATION: Synthetic peptide

<400> SEQUENCE: 103

```
Val Leu Glu Leu Ala Val Pro Val Asn Lys Pro Gly Gln Leu
```

<210> SEQ ID NO 104
<211> LENGTH: 14
<212> TYPE: PRT
<213> ORGANISM: Artificial Sequence
<220> FEATURE:
<223> OTHER INFORMATION: Synthetic peptide

<400> SEQUENCE: 104

Ile Leu Glu Leu Ala Ile Pro Val Asn Arg Pro Gly Glu Leu
1               5                   10

<210> SEQ ID NO 105
<211> LENGTH: 14
<212> TYPE: PRT
<213> ORGANISM: Artificial Sequence
<220> FEATURE:
<223> OTHER INFORMATION: Synthetic peptide

<400> SEQUENCE: 105

Ile Leu Asp Leu Ala Ile Pro Val Asn Lys Pro Gly Glu Leu
1               5                   10

<210> SEQ ID NO 106
<211> LENGTH: 14
<212> TYPE: PRT
<213> ORGANISM: Artificial Sequence
<220> FEATURE:
<223> OTHER INFORMATION: Synthetic peptide

<400> SEQUENCE: 106

Val Leu Asp Leu Ala Val Pro Val Glu Lys Pro Gly Gln Leu
1               5                   10

<210> SEQ ID NO 107
<211> LENGTH: 14
<212> TYPE: PRT
<213> ORGANISM: Artificial Sequence
<220> FEATURE:
<223> OTHER INFORMATION: Synthetic peptide

<400> SEQUENCE: 107

Val Leu Asp Leu Ala Val Pro Val Glu Arg Pro Gly Glu Leu
1               5                   10

<210> SEQ ID NO 108
<211> LENGTH: 14
<212> TYPE: PRT
<213> ORGANISM: Artificial Sequence
<220> FEATURE:
<223> OTHER INFORMATION: Synthetic peptide

<400> SEQUENCE: 108

Val Leu Glu Leu Ala Ile Pro Val Glu Arg Pro Gly Glu Leu
1               5                   10

<210> SEQ ID NO 109
<211> LENGTH: 14
<212> TYPE: PRT
<213> ORGANISM: Artificial Sequence
<220> FEATURE:
<223> OTHER INFORMATION: Synthetic peptide

<400> SEQUENCE: 109

Lys Leu Asp Leu Ala Ile Ile Val Asn Arg Pro Gly Gln Leu
1               5                   10

```
<210> SEQ ID NO 110
<211> LENGTH: 14
<212> TYPE: PRT
<213> ORGANISM: Artificial Sequence
<220> FEATURE:
<223> OTHER INFORMATION: Synthetic peptide

<400> SEQUENCE: 110

Val Leu Asp Leu Ala Ile Pro Val Asn Arg Pro Gly Gln Lys
1               5                   10

<210> SEQ ID NO 111
<211> LENGTH: 14
<212> TYPE: PRT
<213> ORGANISM: Artificial Sequence
<220> FEATURE:
<223> OTHER INFORMATION: Synthetic peptide

<400> SEQUENCE: 111

Val Leu Asp Leu Ala Ile Pro Val Asn Arg Pro Gly Gln Leu
1               5                   10

<210> SEQ ID NO 112
<211> LENGTH: 14
<212> TYPE: PRT
<213> ORGANISM: Artificial Sequence
<220> FEATURE:
<223> OTHER INFORMATION: Synthetic peptide

<400> SEQUENCE: 112

Val Leu Asp Leu Ala Ile Pro Val Asn Arg Pro Gly Gln Leu
1               5                   10

<210> SEQ ID NO 113
<211> LENGTH: 14
<212> TYPE: PRT
<213> ORGANISM: Artificial Sequence
<220> FEATURE:
<223> OTHER INFORMATION: Synthetic peptide

<400> SEQUENCE: 113

Val Leu Asp Leu Ala Ile Pro Val Asn Arg Pro Cys Gln Leu
1               5                   10

<210> SEQ ID NO 114
<211> LENGTH: 14
<212> TYPE: PRT
<213> ORGANISM: Artificial Sequence
<220> FEATURE:
<223> OTHER INFORMATION: Synthetic peptide

<400> SEQUENCE: 114

Val Leu Asp Leu Trp Ile Pro Val Asn Arg Pro Gly Gln Leu
1               5                   10

<210> SEQ ID NO 115
<211> LENGTH: 14
<212> TYPE: PRT
<213> ORGANISM: Artificial Sequence
<220> FEATURE:
<223> OTHER INFORMATION: Synthetic peptide

<400> SEQUENCE: 115

Val Leu Asp Leu Ala Ile Pro Val Asn Arg Pro Gly Gln Leu
1               5                   10
```

<210> SEQ ID NO 116
<211> LENGTH: 14
<212> TYPE: PRT
<213> ORGANISM: Artificial Sequence
<220> FEATURE:
<223> OTHER INFORMATION: Synthetic peptide

<400> SEQUENCE: 116

Val Leu Tyr Leu Ala Ile Pro Val Asn Arg Pro Gly Gln Leu
1               5                   10

<210> SEQ ID NO 117
<211> LENGTH: 14
<212> TYPE: PRT
<213> ORGANISM: Artificial Sequence
<220> FEATURE:
<223> OTHER INFORMATION: Synthetic peptide

<400> SEQUENCE: 117

Val Leu Asp Leu Tyr Ile Pro Val Gly Arg Pro Gly Gln Leu
1               5                   10

<210> SEQ ID NO 118
<211> LENGTH: 14
<212> TYPE: PRT
<213> ORGANISM: Artificial Sequence
<220> FEATURE:
<223> OTHER INFORMATION: Synthetic peptide

<400> SEQUENCE: 118

Val Lys Asp Leu Ala Ile Pro Trp Asn Arg Pro Gly Gln Leu
1               5                   10

<210> SEQ ID NO 119
<211> LENGTH: 14
<212> TYPE: PRT
<213> ORGANISM: Artificial Sequence
<220> FEATURE:
<223> OTHER INFORMATION: Synthetic peptide

<400> SEQUENCE: 119

Val Leu Asp Leu Ala Ile Pro Val Asn Arg Pro Cys Cys Leu
1               5                   10

<210> SEQ ID NO 120
<211> LENGTH: 14
<212> TYPE: PRT
<213> ORGANISM: Artificial Sequence
<220> FEATURE:
<223> OTHER INFORMATION: Synthetic peptide

<400> SEQUENCE: 120

Val Leu Asp Leu Ala Gly Gly Val Asn Arg Pro Gly Gln Leu
1               5                   10

<210> SEQ ID NO 121
<211> LENGTH: 14
<212> TYPE: PRT
<213> ORGANISM: Artificial Sequence
<220> FEATURE:
<223> OTHER INFORMATION: Synthetic peptide

<400> SEQUENCE: 121

Val Leu Asp Leu Ala Ile Pro Lys Asn Glu Pro Gly Gln Leu
1               5                   10

```
<210> SEQ ID NO 122
<211> LENGTH: 14
<212> TYPE: PRT
<213> ORGANISM: Artificial Sequence
<220> FEATURE:
<223> OTHER INFORMATION: Synthetic peptide

<400> SEQUENCE: 122

Pro Leu Asp Leu Ala Ile Pro Val Asn Asp Pro Gly Gln Leu
1               5                   10

<210> SEQ ID NO 123
<211> LENGTH: 14
<212> TYPE: PRT
<213> ORGANISM: Artificial Sequence
<220> FEATURE:
<223> OTHER INFORMATION: Synthetic peptide

<400> SEQUENCE: 123

Val Leu Asp Leu Ala Ile Pro Val Asn Arg Pro Ile Gln Leu
1               5                   10

<210> SEQ ID NO 124
<211> LENGTH: 14
<212> TYPE: PRT
<213> ORGANISM: Artificial Sequence
<220> FEATURE:
<223> OTHER INFORMATION: Synthetic peptide

<400> SEQUENCE: 124

Val Leu Asp His Ala Ile Pro Val Asn Arg Pro Gly Gln Leu
1               5                   10

<210> SEQ ID NO 125
<211> LENGTH: 14
<212> TYPE: PRT
<213> ORGANISM: Artificial Sequence
<220> FEATURE:
<223> OTHER INFORMATION: Synthetic peptide

<400> SEQUENCE: 125

Val Leu Asp Leu Ala Ile Pro Val Asn Arg Pro Gly Gly Gly
1               5                   10

<210> SEQ ID NO 126
<211> LENGTH: 14
<212> TYPE: PRT
<213> ORGANISM: Artificial Sequence
<220> FEATURE:
<223> OTHER INFORMATION: Synthetic peptide

<400> SEQUENCE: 126

Val Leu Asp Leu His Ile Pro Gly Asn Glu Pro Gly Gln Leu
1               5                   10

<210> SEQ ID NO 127
<211> LENGTH: 14
<212> TYPE: PRT
<213> ORGANISM: Artificial Sequence
<220> FEATURE:
<223> OTHER INFORMATION: Synthetic peptide

<400> SEQUENCE: 127

Val Tyr Lys Leu Ala Ile Pro Val Asn Glu Pro Gly Gln Leu
1               5                   10

<210> SEQ ID NO 128
```

```
<211> LENGTH: 14
<212> TYPE: PRT
<213> ORGANISM: Artificial Sequence
<220> FEATURE:
<223> OTHER INFORMATION: Synthetic peptide

<400> SEQUENCE: 128

Val Leu Asp Leu Ala Ile Pro Val Asn Arg Pro Tyr Pro Gly
1               5                   10

<210> SEQ ID NO 129
<211> LENGTH: 14
<212> TYPE: PRT
<213> ORGANISM: Artificial Sequence
<220> FEATURE:
<223> OTHER INFORMATION: Synthetic peptide

<400> SEQUENCE: 129

Val Leu Asp Tyr Ala Ile Pro Lys Asn Asp Pro Gly Gln Leu
1               5                   10

<210> SEQ ID NO 130
<211> LENGTH: 14
<212> TYPE: PRT
<213> ORGANISM: Artificial Sequence
<220> FEATURE:
<223> OTHER INFORMATION: Synthetic peptide

<400> SEQUENCE: 130

Val Leu Asp Leu Ala Ile Pro Val Asn Arg Pro Gly Gln Leu
1               5                   10

<210> SEQ ID NO 131
<211> LENGTH: 14
<212> TYPE: PRT
<213> ORGANISM: Artificial Sequence
<220> FEATURE:
<223> OTHER INFORMATION: Synthetic peptide

<400> SEQUENCE: 131

Arg Arg Arg Leu Ala Ile Pro Val Asn Arg Pro Gly Gln Leu
1               5                   10

<210> SEQ ID NO 132
<211> LENGTH: 14
<212> TYPE: PRT
<213> ORGANISM: Artificial Sequence
<220> FEATURE:
<223> OTHER INFORMATION: Synthetic peptide

<400> SEQUENCE: 132

Val Leu Asp Leu Ala Ile Gly Val Asn Arg Gly Pro Gln Leu
1               5                   10

<210> SEQ ID NO 133
<211> LENGTH: 15
<212> TYPE: PRT
<213> ORGANISM: Artificial Sequence
<220> FEATURE:
<223> OTHER INFORMATION: Synthetic peptide

<400> SEQUENCE: 133

Val Leu Asp Leu Ala Ile Pro Val Asn Arg Pro Gly Phe Gln Leu
1               5                   10                  15

<210> SEQ ID NO 134
<211> LENGTH: 15
```

```
<212> TYPE: PRT
<213> ORGANISM: Artificial Sequence
<220> FEATURE:
<223> OTHER INFORMATION: Synthetic peptide

<400> SEQUENCE: 134

Val Leu Asp Leu Ala Asp Ile Pro Val Asn Arg Pro Gly Gln Leu
1               5                   10                  15

<210> SEQ ID NO 135
<211> LENGTH: 15
<212> TYPE: PRT
<213> ORGANISM: Artificial Sequence
<220> FEATURE:
<223> OTHER INFORMATION: Synthetic peptide

<400> SEQUENCE: 135

Val Leu Asp Leu Ala Ile Pro Val Gly Asn Arg Pro Gly Gln Leu
1               5                   10                  15

<210> SEQ ID NO 136
<211> LENGTH: 16
<212> TYPE: PRT
<213> ORGANISM: Artificial Sequence
<220> FEATURE:
<223> OTHER INFORMATION: Synthetic peptide

<400> SEQUENCE: 136

Val Leu Gln Gln Asp Leu Ala Ile Pro Val Asn Arg Pro Gly Gln Leu
1               5                   10                  15

<210> SEQ ID NO 137
<211> LENGTH: 16
<212> TYPE: PRT
<213> ORGANISM: Artificial Sequence
<220> FEATURE:
<223> OTHER INFORMATION: Synthetic peptide

<400> SEQUENCE: 137

Val Leu Asp Leu Ala Ile Pro Val Asn Arg Gly Pro Gly Gln Lys Leu
1               5                   10                  15

<210> SEQ ID NO 138
<211> LENGTH: 17
<212> TYPE: PRT
<213> ORGANISM: Artificial Sequence
<220> FEATURE:
<223> OTHER INFORMATION: Synthetic peptide

<400> SEQUENCE: 138

Val Leu Asp Gly Leu Pro Leu Ala Ile Pro Val Asn Arg Pro Gly Gln
1               5                   10                  15

Leu

<210> SEQ ID NO 139
<211> LENGTH: 16
<212> TYPE: PRT
<213> ORGANISM: Artificial Sequence
<220> FEATURE:
<223> OTHER INFORMATION: Synthetic peptide

<400> SEQUENCE: 139

Val Leu Asp Leu Ala Ile Pro Val Asn Arg Pro Gly Gln Leu Leu Leu
1               5                   10                  15

<210> SEQ ID NO 140
```

```
<211> LENGTH: 17
<212> TYPE: PRT
<213> ORGANISM: Artificial Sequence
<220> FEATURE:
<223> OTHER INFORMATION: Synthetic peptide

<400> SEQUENCE: 140

Val Leu Asp Leu Phe Leu Gly Ala Ile Pro Val Asn Arg Pro Gly Gln
1               5                   10                  15

Leu

<210> SEQ ID NO 141
<211> LENGTH: 13
<212> TYPE: PRT
<213> ORGANISM: Artificial Sequence
<220> FEATURE:
<223> OTHER INFORMATION: Synthetic peptide

<400> SEQUENCE: 141

Val Leu Asp Leu Ala Ile Pro Val Asn Arg Gly Gln Leu
1               5                   10

<210> SEQ ID NO 142
<211> LENGTH: 13
<212> TYPE: PRT
<213> ORGANISM: Artificial Sequence
<220> FEATURE:
<223> OTHER INFORMATION: Synthetic peptide

<400> SEQUENCE: 142

Val Leu Asp Leu Ala Pro Val Asn Arg Pro Gly Gln Leu
1               5                   10

<210> SEQ ID NO 143
<211> LENGTH: 13
<212> TYPE: PRT
<213> ORGANISM: Artificial Sequence
<220> FEATURE:
<223> OTHER INFORMATION: Synthetic peptide

<400> SEQUENCE: 143

Leu Asp Leu Ala Ile Pro Val Asn Arg Pro Gly Gln Leu
1               5                   10

<210> SEQ ID NO 144
<211> LENGTH: 13
<212> TYPE: PRT
<213> ORGANISM: Artificial Sequence
<220> FEATURE:
<223> OTHER INFORMATION: Synthetic peptide

<400> SEQUENCE: 144

Val Leu Asp Leu Ala Ile Pro Val Asn Arg Pro Gly Gln
1               5                   10

<210> SEQ ID NO 145
<211> LENGTH: 12
<212> TYPE: PRT
<213> ORGANISM: Artificial Sequence
<220> FEATURE:
<223> OTHER INFORMATION: Synthetic peptide

<400> SEQUENCE: 145

Asp Leu Ala Ile Pro Val Asn Arg Pro Gly Gln Leu
1               5                   10
```

```
<210> SEQ ID NO 146
<211> LENGTH: 12
<212> TYPE: PRT
<213> ORGANISM: Artificial Sequence
<220> FEATURE:
<223> OTHER INFORMATION: Synthetic peptide

<400> SEQUENCE: 146

Val Leu Asp Leu Ala Ile Pro Val Asn Arg Pro Gly
1               5                   10

<210> SEQ ID NO 147
<211> LENGTH: 12
<212> TYPE: PRT
<213> ORGANISM: Artificial Sequence
<220> FEATURE:
<223> OTHER INFORMATION: Synthetic peptide

<400> SEQUENCE: 147

Val Leu Asp Leu Ala Ile Asn Arg Pro Gly Gln Leu
1               5                   10

<210> SEQ ID NO 148
<211> LENGTH: 11
<212> TYPE: PRT
<213> ORGANISM: Artificial Sequence
<220> FEATURE:
<223> OTHER INFORMATION: Synthetic peptide

<400> SEQUENCE: 148

Val Leu Asp Ala Ile Val Asn Pro Gly Gln Leu
1               5                   10

<210> SEQ ID NO 149
<211> LENGTH: 13
<212> TYPE: PRT
<213> ORGANISM: Artificial Sequence
<220> FEATURE:
<223> OTHER INFORMATION: Synthetic peptide

<400> SEQUENCE: 149

Val Leu Asp Leu Ala Ile Pro Val Asn Arg Pro Gly Gln
1               5                   10

<210> SEQ ID NO 150
<211> LENGTH: 12
<212> TYPE: PRT
<213> ORGANISM: Artificial Sequence
<220> FEATURE:
<223> OTHER INFORMATION: Synthetic peptide

<400> SEQUENCE: 150

Val Leu Asp Leu Ala Ile Pro Val Asn Arg Pro Gly
1               5                   10

<210> SEQ ID NO 151
<211> LENGTH: 11
<212> TYPE: PRT
<213> ORGANISM: Artificial Sequence
<220> FEATURE:
<223> OTHER INFORMATION: Synthetic peptide

<400> SEQUENCE: 151

Val Leu Asp Leu Ala Ile Pro Val Asn Arg Pro
1               5                   10

<210> SEQ ID NO 152
```

```
<211> LENGTH: 13
<212> TYPE: PRT
<213> ORGANISM: Artificial Sequence
<220> FEATURE:
<223> OTHER INFORMATION: Synthetic peptide

<400> SEQUENCE: 152

Leu Asp Leu Ala Ile Pro Val Asn Arg Pro Gly Gln Leu
1               5                   10

<210> SEQ ID NO 153
<211> LENGTH: 12
<212> TYPE: PRT
<213> ORGANISM: Artificial Sequence
<220> FEATURE:
<223> OTHER INFORMATION: Synthetic peptide

<400> SEQUENCE: 153

Asp Leu Ala Ile Pro Val Asn Arg Pro Gly Gln Leu
1               5                   10

<210> SEQ ID NO 154
<211> LENGTH: 11
<212> TYPE: PRT
<213> ORGANISM: Artificial Sequence
<220> FEATURE:
<223> OTHER INFORMATION: Synthetic peptide

<400> SEQUENCE: 154

Leu Ala Ile Pro Val Asn Arg Pro Gly Gln Leu
1               5                   10

<210> SEQ ID NO 155
<211> LENGTH: 12
<212> TYPE: PRT
<213> ORGANISM: Artificial Sequence
<220> FEATURE:
<223> OTHER INFORMATION: Synthetic peptide

<400> SEQUENCE: 155

Leu Asp Leu Ala Ile Pro Val Asn Arg Pro Gly Gln
1               5                   10

<210> SEQ ID NO 156
<211> LENGTH: 10
<212> TYPE: PRT
<213> ORGANISM: Artificial Sequence
<220> FEATURE:
<223> OTHER INFORMATION: Synthetic peptide

<400> SEQUENCE: 156

Asp Leu Ala Ile Pro Val Asn Arg Pro Gly
1               5                   10

<210> SEQ ID NO 157
<211> LENGTH: 8
<212> TYPE: PRT
<213> ORGANISM: Artificial Sequence
<220> FEATURE:
<223> OTHER INFORMATION: Synthetic peptide

<400> SEQUENCE: 157

Leu Ala Ile Pro Val Asn Arg Pro
1               5

<210> SEQ ID NO 158
<211> LENGTH: 9
```

-continued

```
<212> TYPE: PRT
<213> ORGANISM: Artificial Sequence
<220> FEATURE:
<223> OTHER INFORMATION: Synthetic peptide

<400> SEQUENCE: 158

Val Leu Asp Leu Ala Ile Pro Val Asn
1               5

<210> SEQ ID NO 159
<211> LENGTH: 10
<212> TYPE: PRT
<213> ORGANISM: Artificial Sequence
<220> FEATURE:
<223> OTHER INFORMATION: Synthetic peptide

<400> SEQUENCE: 159

Ala Ile Pro Val Asn Arg Pro Gly Gln Leu
1               5                   10

<210> SEQ ID NO 160
<211> LENGTH: 7
<212> TYPE: PRT
<213> ORGANISM: Artificial Sequence
<220> FEATURE:
<223> OTHER INFORMATION: Synthetic peptide

<400> SEQUENCE: 160

Val Asn Arg Pro Gly Gln Leu
1               5

<210> SEQ ID NO 161
<211> LENGTH: 8
<212> TYPE: PRT
<213> ORGANISM: Artificial Sequence
<220> FEATURE:
<223> OTHER INFORMATION: Synthetic peptide

<400> SEQUENCE: 161

Val Leu Asp Leu Ala Ile Pro Val
1               5

<210> SEQ ID NO 162
<211> LENGTH: 6
<212> TYPE: PRT
<213> ORGANISM: Artificial Sequence
<220> FEATURE:
<223> OTHER INFORMATION: Synthetic peptide

<400> SEQUENCE: 162

Leu Arg Gly Phe Ser Lys
1               5

<210> SEQ ID NO 163
<211> LENGTH: 9
<212> TYPE: PRT
<213> ORGANISM: Artificial Sequence
<220> FEATURE:
<223> OTHER INFORMATION: Synthetic peptide

<400> SEQUENCE: 163

Gly Ala Leu Met Leu Pro His Tyr Asn
1               5

<210> SEQ ID NO 164
<211> LENGTH: 11
<212> TYPE: PRT
```

-continued

```
<213> ORGANISM: Artificial Sequence
<220> FEATURE:
<223> OTHER INFORMATION: Synthetic peptide

<400> SEQUENCE: 164

Gly Ala Leu Met Leu Pro His Tyr Asn Ser Arg
1               5                   10

<210> SEQ ID NO 165
<211> LENGTH: 9
<212> TYPE: PRT
<213> ORGANISM: Artificial Sequence
<220> FEATURE:
<223> OTHER INFORMATION: Synthetic peptide

<400> SEQUENCE: 165

Val Phe Asp Gly Val Leu Arg Pro Gly
1               5

<210> SEQ ID NO 166
<211> LENGTH: 6
<212> TYPE: PRT
<213> ORGANISM: Artificial Sequence
<220> FEATURE:
<223> OTHER INFORMATION: Synthetic peptide

<400> SEQUENCE: 166

Leu Gln Ser Gln Asn Asp
1               5

<210> SEQ ID NO 167
<211> LENGTH: 11
<212> TYPE: PRT
<213> ORGANISM: Artificial Sequence
<220> FEATURE:
<223> OTHER INFORMATION: Synthetic peptide

<400> SEQUENCE: 167

Leu Gln Ser Gln Asn Asp Gln Arg Gly Glu Ile
1               5                   10

<210> SEQ ID NO 168
<211> LENGTH: 14
<212> TYPE: PRT
<213> ORGANISM: Artificial Sequence
<220> FEATURE:
<223> OTHER INFORMATION: Synthetic peptide

<400> SEQUENCE: 168

Gln Ser Gln Asn Asp Gln Arg Gly Glu Ile Ile His Val Lys
1               5                   10

<210> SEQ ID NO 169
<211> LENGTH: 8
<212> TYPE: PRT
<213> ORGANISM: Artificial Sequence
<220> FEATURE:
<223> OTHER INFORMATION: Synthetic peptide

<400> SEQUENCE: 169

Arg Gly Glu Ile Ile His Val Lys
1               5

<210> SEQ ID NO 170
<211> LENGTH: 8
<212> TYPE: PRT
<213> ORGANISM: Artificial Sequence
```

```
<220> FEATURE:
<223> OTHER INFORMATION: Synthetic peptide

<400> SEQUENCE: 170

Arg Leu Gln Ser Gln Asn Asp Gln
1               5

<210> SEQ ID NO 171
<211> LENGTH: 10
<212> TYPE: PRT
<213> ORGANISM: Artificial Sequence
<220> FEATURE:
<223> OTHER INFORMATION: Synthetic peptide

<400> SEQUENCE: 171

Arg Leu Gln Ser Gln Asn Asp Gln Arg Gly
1               5                   10

<210> SEQ ID NO 172
<211> LENGTH: 14
<212> TYPE: PRT
<213> ORGANISM: Artificial Sequence
<220> FEATURE:
<223> OTHER INFORMATION: Synthetic peptide

<400> SEQUENCE: 172

Arg Leu Gln Ser Gln Asn Asp Gln Arg Gly Glu Ile Ile His
1               5                   10

<210> SEQ ID NO 173
<211> LENGTH: 4
<212> TYPE: PRT
<213> ORGANISM: Artificial Sequence
<220> FEATURE:
<223> OTHER INFORMATION: PEPTIDE

<400> SEQUENCE: 173

Met Pro Met Pro
1

<210> SEQ ID NO 174
<211> LENGTH: 4
<212> TYPE: PRT
<213> ORGANISM: Artificial Sequence
<220> FEATURE:
<223> OTHER INFORMATION: Synthetic peptide

<400> SEQUENCE: 174

Pro Met Pro Leu
1

<210> SEQ ID NO 175
<211> LENGTH: 6
<212> TYPE: PRT
<213> ORGANISM: Artificial Sequence
<220> FEATURE:
<223> OTHER INFORMATION: Synthetic peptide

<400> SEQUENCE: 175

Leu Glu Pro Asp Asn Arg
1               5

<210> SEQ ID NO 176
<211> LENGTH: 13
<212> TYPE: PRT
<213> ORGANISM: Artificial Sequence
<220> FEATURE:
```

```
<223> OTHER INFORMATION: Synthetic peptide

<400> SEQUENCE: 176

Gly Ile Ala Arg Leu Ala Gly Thr Ser Ser Val Ile Asn
1               5                   10

<210> SEQ ID NO 177
<211> LENGTH: 6
<212> TYPE: PRT
<213> ORGANISM: Artificial Sequence
<220> FEATURE:
<223> OTHER INFORMATION: Synthetic peptide

<400> SEQUENCE: 177

Arg Ser Gln Asn Ile Phe
1               5

<210> SEQ ID NO 178
<211> LENGTH: 4
<212> TYPE: PRT
<213> ORGANISM: Artificial Sequence
<220> FEATURE:
<223> OTHER INFORMATION: Synthetic peptide

<400> SEQUENCE: 178

Pro Asn Ser Met
1

<210> SEQ ID NO 179
<211> LENGTH: 4
<212> TYPE: PRT
<213> ORGANISM: Artificial Sequence
<220> FEATURE:
<223> OTHER INFORMATION: Synthetic peptide

<400> SEQUENCE: 179

Gly His Pro Met
1

<210> SEQ ID NO 180
<211> LENGTH: 4
<212> TYPE: PRT
<213> ORGANISM: Artificial Sequence
<220> FEATURE:
<223> OTHER INFORMATION: Synthetic peptide

<400> SEQUENCE: 180

His Pro Met Ser
1

<210> SEQ ID NO 181
<211> LENGTH: 7
<212> TYPE: PRT
<213> ORGANISM: Artificial Sequence
<220> FEATURE:
<223> OTHER INFORMATION: Synthetic peptide

<400> SEQUENCE: 181

Phe Leu Pro Gln His Thr Asp
1               5

<210> SEQ ID NO 182
<211> LENGTH: 7
<212> TYPE: PRT
<213> ORGANISM: Artificial Sequence
<220> FEATURE:
<223> OTHER INFORMATION: Synthetic peptide
```

```
<400> SEQUENCE: 182

Glu Trp Gln Ile Asn Glu Lys
1               5

<210> SEQ ID NO 183
<211> LENGTH: 13
<212> TYPE: PRT
<213> ORGANISM: Artificial Sequence
<220> FEATURE:
<223> OTHER INFORMATION: Synthetic peptide

<400> SEQUENCE: 183

Gly Pro Gln Gln Tyr Ala Glu Trp Gln Ile Asn Glu Lys
1               5                   10

<210> SEQ ID NO 184
<211> LENGTH: 8
<212> TYPE: PRT
<213> ORGANISM: Artificial Sequence
<220> FEATURE:
<223> OTHER INFORMATION: Synthetic peptide

<400> SEQUENCE: 184

Pro Gln Gln Tyr Ala Glu Trp Gln
1               5

<210> SEQ ID NO 185
<211> LENGTH: 7
<212> TYPE: PRT
<213> ORGANISM: Artificial Sequence
<220> FEATURE:
<223> OTHER INFORMATION: Synthetic peptide

<400> SEQUENCE: 185

Arg Gly Pro Gln Gln Tyr Ala
1               5

<210> SEQ ID NO 186
<211> LENGTH: 4
<212> TYPE: PRT
<213> ORGANISM: Artificial Sequence
<220> FEATURE:
<223> OTHER INFORMATION: Synthetic peptide

<400> SEQUENCE: 186

His Asn Pro Arg
1

<210> SEQ ID NO 187

<400> SEQUENCE: 187

000

<210> SEQ ID NO 188

<400> SEQUENCE: 188

000

<210> SEQ ID NO 189
<211> LENGTH: 4
<212> TYPE: PRT
<213> ORGANISM: Artificial Sequence
<220> FEATURE:
<223> OTHER INFORMATION: Synthetic peptide
```

<400> SEQUENCE: 189

His Pro Ser Phe
1

<210> SEQ ID NO 190
<211> LENGTH: 22
<212> TYPE: PRT
<213> ORGANISM: Artificial Sequence
<220> FEATURE:
<223> OTHER INFORMATION: Synthetic peptide

<400> SEQUENCE: 190

Pro Gly Gln Leu Gln Ser Phe Leu Leu Ser Gly Asn Gln Asn Gln Gln
1               5                   10                  15

Asn Tyr Leu Ser Gly Phe
            20

<210> SEQ ID NO 191
<211> LENGTH: 22
<212> TYPE: PRT
<213> ORGANISM: Artificial Sequence
<220> FEATURE:
<223> OTHER INFORMATION: Synthetic peptide

<400> SEQUENCE: 191

Gln Leu Gln Ser Phe Leu Leu Ser Gly Asn Gln Asn Gln Gln Asn Tyr
1               5                   10                  15

Leu Ser Gly Phe Ser Lys
            20

<210> SEQ ID NO 192
<211> LENGTH: 12
<212> TYPE: PRT
<213> ORGANISM: Artificial Sequence
<220> FEATURE:
<223> OTHER INFORMATION: Synthetic peptide

<400> SEQUENCE: 192

Gln Ser Phe Leu Leu Ser Gly Asn Gln Asn Gln Gln
1               5                   10

<210> SEQ ID NO 193
<211> LENGTH: 12
<212> TYPE: PRT
<213> ORGANISM: Artificial Sequence
<220> FEATURE:
<223> OTHER INFORMATION: Synthetic peptide

<400> SEQUENCE: 193

Pro Gly Gln Leu Gln Ser Phe Leu Leu Ser Gly Asn
1               5                   10

<210> SEQ ID NO 194
<211> LENGTH: 9
<212> TYPE: PRT
<213> ORGANISM: Artificial Sequence
<220> FEATURE:
<223> OTHER INFORMATION: Synthetic peptide

<400> SEQUENCE: 194

Gln Ser Phe Leu Leu Ser Gly Asn Gln
1               5

<210> SEQ ID NO 195

```
<211> LENGTH: 12
<212> TYPE: PRT
<213> ORGANISM: Artificial Sequence
<220> FEATURE:
<223> OTHER INFORMATION: Synthetic peptide

<400> SEQUENCE: 195

Gln Asn Gln Gln Asn Tyr Leu Ser Gly Phe Ser Lys
1               5                   10

<210> SEQ ID NO 196
<211> LENGTH: 6
<212> TYPE: PRT
<213> ORGANISM: Artificial Sequence
<220> FEATURE:
<223> OTHER INFORMATION: Synthetic peptide

<400> SEQUENCE: 196

Tyr Leu Arg Gly Phe Ser
1               5

<210> SEQ ID NO 197
<211> LENGTH: 11
<212> TYPE: PRT
<213> ORGANISM: Artificial Sequence
<220> FEATURE:
<223> OTHER INFORMATION: Synthetic peptide

<400> SEQUENCE: 197

Pro Val Glu Met Pro Thr Leu Leu Tyr Pro Ser
1               5                   10

<210> SEQ ID NO 198
<211> LENGTH: 12
<212> TYPE: PRT
<213> ORGANISM: Artificial Sequence
<220> FEATURE:
<223> OTHER INFORMATION: Synthetic peptide

<400> SEQUENCE: 198

Arg Gly Pro Gln Gln Tyr Ala Glu Trp Gln Ile Asn
1               5                   10

<210> SEQ ID NO 199
<211> LENGTH: 12
<212> TYPE: PRT
<213> ORGANISM: Artificial Sequence
<220> FEATURE:
<223> OTHER INFORMATION: Synthetic peptide

<400> SEQUENCE: 199

Thr Val Phe Asp Gly Val Leu Arg Pro Gly Gln Leu
1               5                   10

<210> SEQ ID NO 200
<211> LENGTH: 24
<212> TYPE: PRT
<213> ORGANISM: Artificial Sequence
<220> FEATURE:
<223> OTHER INFORMATION: Synthetic peptide

<400> SEQUENCE: 200

Gly Tyr Val Gly Leu Thr Phe Pro Gly Cys Pro Ala Thr His Gln Gln
1               5                   10                  15

Gln Phe Gln Leu Phe Glu Gln Arg
            20
```

<210> SEQ ID NO 201
<211> LENGTH: 18
<212> TYPE: PRT
<213> ORGANISM: Artificial Sequence
<220> FEATURE:
<223> OTHER INFORMATION: Synthetic peptide

<400> SEQUENCE: 201

Lys Asn Pro Gln Leu Gln Asp Leu Asp Ile Phe Val Asn Tyr Val Glu
1               5                   10                  15

Ile Lys

<210> SEQ ID NO 202
<211> LENGTH: 9
<212> TYPE: PRT
<213> ORGANISM: Artificial Sequence
<220> FEATURE:
<223> OTHER INFORMATION: Synthetic peptide

<400> SEQUENCE: 202

Leu Asp Ala Leu Glu Pro Asp Asn Arg
1               5

<210> SEQ ID NO 203
<211> LENGTH: 21
<212> TYPE: PRT
<213> ORGANISM: Artificial Sequence
<220> FEATURE:
<223> OTHER INFORMATION: PEPTIDE

<400> SEQUENCE: 203

Leu Val Asp Leu Val Ile Pro Val Asn Gly Pro Gly Lys Phe Glu Ala
1               5                   10                  15

Phe Asp Leu Ala Lys
            20

<210> SEQ ID NO 204
<211> LENGTH: 24
<212> TYPE: PRT
<213> ORGANISM: Artificial Sequence
<220> FEATURE:
<223> OTHER INFORMATION: Synthetic peptide

<400> SEQUENCE: 204

Pro Gly Gln Leu Gln Ser Phe Leu Leu Ser Gly Asn Gln Asn Gln Gln
1               5                   10                  15

Asn Tyr Leu Ser Gly Phe Ser Lys
            20

<210> SEQ ID NO 205
<211> LENGTH: 14
<212> TYPE: PRT
<213> ORGANISM: Artificial Sequence
<220> FEATURE:
<223> OTHER INFORMATION: Synthetic peptide

<400> SEQUENCE: 205

Arg Gly Pro Gln Gln Tyr Ala Glu Trp Gln Ile Asn Glu Lys
1               5                   10

<210> SEQ ID NO 206
<211> LENGTH: 16
<212> TYPE: PRT
<213> ORGANISM: Artificial Sequence
<220> FEATURE:

<223> OTHER INFORMATION: Synthetic peptide

<400> SEQUENCE: 206

Arg Leu Gln Ser Gln Asn Asp Gln Arg Gly Glu Ile Ile His Val Lys
1               5                   10                  15

<210> SEQ ID NO 207
<211> LENGTH: 24
<212> TYPE: PRT
<213> ORGANISM: Artificial Sequence
<220> FEATURE:
<223> OTHER INFORMATION: Synthetic peptide

<400> SEQUENCE: 207

Ser Lys Pro His Thr Ile Phe Leu Pro Gln His Thr Asp Ala Asp Tyr
1               5                   10                  15

Ile Leu Val Val Leu Ser Gly Lys
            20

<210> SEQ ID NO 208
<211> LENGTH: 14
<212> TYPE: PRT
<213> ORGANISM: Artificial Sequence
<220> FEATURE:
<223> OTHER INFORMATION: Synthetic peptide

<400> SEQUENCE: 208

Arg Gly Pro Gln Gln Tyr Ala Glu Trp Gln Ile Asn Glu Lys
1               5                   10

<210> SEQ ID NO 209
<211> LENGTH: 16
<212> TYPE: PRT
<213> ORGANISM: Artificial Sequence
<220> FEATURE:
<223> OTHER INFORMATION: Synthetic peptide

<400> SEQUENCE: 209

His Gly Pro Val Glu Met Pro Tyr Thr Leu Leu Tyr Pro Ser Ser Lys
1               5                   10                  15

<210> SEQ ID NO 210
<211> LENGTH: 10
<212> TYPE: PRT
<213> ORGANISM: Artificial Sequence
<220> FEATURE:
<223> OTHER INFORMATION: Synthetic peptide

<400> SEQUENCE: 210

Leu Gly Leu Ser Pro Gln Asp Ala Leu Lys
1               5                   10

<210> SEQ ID NO 211
<211> LENGTH: 15
<212> TYPE: PRT
<213> ORGANISM: Artificial Sequence
<220> FEATURE:
<223> OTHER INFORMATION: Synthetic peptide

<400> SEQUENCE: 211

Phe Gly Lys Thr Val Phe Asp Gly Val Leu Arg Pro Gly Gln Leu
1               5                   10                  15

<210> SEQ ID NO 212
<211> LENGTH: 13
<212> TYPE: PRT

```
<213> ORGANISM: Artificial Sequence
<220> FEATURE:
<223> OTHER INFORMATION: Synthetic peptide

<400> SEQUENCE: 212

Thr Val Phe Asn Gly Val Leu Arg Pro Gly Gln Leu Leu
1               5                   10

<210> SEQ ID NO 213
<211> LENGTH: 24
<212> TYPE: PRT
<213> ORGANISM: Artificial Sequence
<220> FEATURE:
<223> OTHER INFORMATION: Synthetic peptide

<400> SEQUENCE: 213

Met Ala Ser Ile Asn Arg Pro Ile Val Phe Phe Thr Val Cys Leu Phe
1               5                   10                  15

Leu Leu Cys Asn Gly Ser Leu Ala
            20

<210> SEQ ID NO 214
<211> LENGTH: 11
<212> TYPE: PRT
<213> ORGANISM: Artificial Sequence
<220> FEATURE:
<223> OTHER INFORMATION: Synthetic peptide

<400> SEQUENCE: 214

Phe Leu Leu Ala Gly Asn Lys Arg Asn Pro Gln
1               5                   10

<210> SEQ ID NO 215
<211> LENGTH: 9
<212> TYPE: PRT
<213> ORGANISM: Artificial Sequence
<220> FEATURE:
<223> OTHER INFORMATION: Synthetic peptide

<400> SEQUENCE: 215

Phe Leu Leu Ala Gly Asn Lys Arg Asn
1               5

<210> SEQ ID NO 216
<211> LENGTH: 34
<212> TYPE: PRT
<213> ORGANISM: Artificial Sequence
<220> FEATURE:
<223> OTHER INFORMATION: Synthetic peptide

<400> SEQUENCE: 216

Val Leu Asp Leu Ala Ile Pro Val Asn Arg Pro Gly Gln Leu Gln Ser
1               5                   10                  15

Phe Leu Leu Ser Gly Asn Gln Asn Gln Gln Asn Tyr Leu Ser Gly Phe
            20                  25                  30

Ser Lys

<210> SEQ ID NO 217
<211> LENGTH: 17
<212> TYPE: PRT
<213> ORGANISM: Artificial Sequence
<220> FEATURE:
<223> OTHER INFORMATION: Synthetic peptide

<400> SEQUENCE: 217
```

Gln Ser Phe Leu Leu Ser Gly Asn Gln Asn Gln Gln Asn Tyr Leu Ser
1               5                   10                  15

Gly

<210> SEQ ID NO 218
<211> LENGTH: 5
<212> TYPE: PRT
<213> ORGANISM: Artificial Sequence
<220> FEATURE:
<223> OTHER INFORMATION: Synthetic peptide

<400> SEQUENCE: 218

Arg Leu Ser Ser Val
1               5

<210> SEQ ID NO 219
<211> LENGTH: 12
<212> TYPE: PRT
<213> ORGANISM: Artificial Sequence
<220> FEATURE:
<223> OTHER INFORMATION: Synthetic peptide

<400> SEQUENCE: 219

Gln Lys Glu Phe Leu Leu Ala Gly Asn Asn Asn Arg
1               5                   10

<210> SEQ ID NO 220
<211> LENGTH: 19
<212> TYPE: PRT
<213> ORGANISM: Artificial Sequence
<220> FEATURE:
<223> OTHER INFORMATION: Synthetic peptide

<400> SEQUENCE: 220

Leu Leu Arg Pro Ala Phe Ala Gln Gln Gln Glu Gln Ala Gln Gln Gln
1               5                   10                  15

Glu Gln Ala

<210> SEQ ID NO 221
<211> LENGTH: 12
<212> TYPE: PRT
<213> ORGANISM: Artificial Sequence
<220> FEATURE:
<223> OTHER INFORMATION: Synthetic peptide

<400> SEQUENCE: 221

Val Lys Asn Gly Leu Lys Leu Leu Arg Pro Ala Phe
1               5                   10

<210> SEQ ID NO 222
<211> LENGTH: 10
<212> TYPE: PRT
<213> ORGANISM: Artificial Sequence
<220> FEATURE:
<223> OTHER INFORMATION: Synthetic peptide

<400> SEQUENCE: 222

Phe Leu Leu Ala Gly Asn Asn Asn Arg Glu
1               5                   10

<210> SEQ ID NO 223
<211> LENGTH: 14
<212> TYPE: PRT
<213> ORGANISM: Artificial Sequence
<220> FEATURE:
<223> OTHER INFORMATION: Synthetic peptide

<400> SEQUENCE: 223

Gly Leu Lys Leu Leu Arg Pro Ala Phe Ala Gln Gln Gln Glu
1               5                   10

<210> SEQ ID NO 224
<211> LENGTH: 13
<212> TYPE: PRT
<213> ORGANISM: Artificial Sequence
<220> FEATURE:
<223> OTHER INFORMATION: Synthetic peptide

<400> SEQUENCE: 224

Leu Lys Leu Leu Arg Pro Ala Phe Ala Gln Gln Gln Glu
1               5                   10

<210> SEQ ID NO 225
<211> LENGTH: 11
<212> TYPE: PRT
<213> ORGANISM: Artificial Sequence
<220> FEATURE:
<223> OTHER INFORMATION: Synthetic peptide

<400> SEQUENCE: 225

Leu Leu Arg Pro Ala Phe Ala Gln Gln Gln Glu
1               5                   10

<210> SEQ ID NO 226
<211> LENGTH: 7
<212> TYPE: PRT
<213> ORGANISM: Artificial Sequence
<220> FEATURE:
<223> OTHER INFORMATION: Synthetic peptide

<400> SEQUENCE: 226

Leu Arg Gly Phe Ser Lys Asn
1               5

<210> SEQ ID NO 227
<211> LENGTH: 186
<212> TYPE: PRT
<213> ORGANISM: Oryza sativa

<400> SEQUENCE: 227

Met Ala Ser Lys Val Val Phe Phe Ala Ala Leu Met Ala Met
1               5                   10                  15

Val Ala Ile Ser Gly Ala Gln Leu Ser Glu Ser Glu Met Arg Phe Arg
            20                  25                  30

Asp Arg Gln Cys Gln Arg Glu Val Gln Asp Ser Pro Leu Asp Ala Cys
        35                  40                  45

Arg Gln Val Leu Asp Arg Gln Leu Thr Gly Arg Glu Arg Phe Gln Pro
    50                  55                  60

Met Phe Arg Arg Pro Gly Ala Leu Gly Leu Arg Met Gln Cys Gln
65                  70                  75                  80

Gln Leu Gln Asp Val Ser Arg Glu Cys Arg Cys Ala Ala Ile Arg Arg
                85                  90                  95

Met Val Arg Ser Tyr Glu Glu Ser Met Pro Met Pro Leu Glu Gln Gly
            100                 105                 110

Trp Ser Ser Ser Ser Ser Glu Tyr Tyr Gly Gly Glu Gly Ser Ser Ser
        115                 120                 125

Glu Gln Gly Tyr Tyr Gly Glu Gly Ser Ser Glu Glu Gly Tyr Tyr Gly
    130                 135                 140

```
Glu Gln Gln Gln Gln Pro Gly Met Thr Arg Val Arg Leu Thr Arg Ala
145                 150                 155                 160

Arg Gln Tyr Ala Ala Gln Leu Pro Ser Met Cys Arg Val Glu Pro Gln
            165                 170                 175

Gln Cys Ser Ile Phe Ala Ala Gly Gln Tyr
        180                 185

<210> SEQ ID NO 228
<211> LENGTH: 520
<212> TYPE: PRT
<213> ORGANISM: Pisum sativum

<400> SEQUENCE: 228

Met Ala Thr Lys Leu Leu Ala Leu Ser Leu Ser Phe Cys Phe Leu Leu
1               5                   10                  15

Leu Gly Gly Cys Phe Ala Leu Arg Glu Gln Pro Gly Gln Asn Glu Cys
            20                  25                  30

Gln Leu Glu Arg Leu Asn Ala Leu Glu Pro Asp Asn Arg Ile Glu Ser
        35                  40                  45

Glu Gly Gly Leu Ile Glu Thr Trp Asn Pro Asn Lys Gln Phe Arg
50                  55                  60

Cys Ala Gly Val Ala Leu Ser Arg Ala Thr Leu Gln His Asn Ala Leu
65                  70                  75                  80

Arg Arg Pro Tyr Tyr Ser Asn Ala Pro Gln Glu Ile Phe Ile Gln Gln
                85                  90                  95

Gly Asn Gly Tyr Phe Gly Met Val Phe Pro Gly Cys Pro Glu Thr Phe
            100                 105                 110

Glu Glu Pro Gln Glu Ser Glu Gln Gly Glu Gly Arg Arg Tyr Arg Asp
        115                 120                 125

Arg His Gln Lys Val Asn Arg Phe Arg Glu Gly Asp Ile Ile Ala Val
    130                 135                 140

Pro Thr Gly Ile Val Phe Trp Met Tyr Asn Asp Gln Asp Thr Pro Val
145                 150                 155                 160

Ile Ala Val Ser Leu Thr Asp Ile Arg Ser Ser Asn Asn Gln Leu Asp
                165                 170                 175

Gln Met Pro Arg Arg Phe Tyr Leu Ala Gly Asn His Glu Gln Glu Phe
            180                 185                 190

Leu Arg Tyr Gln His Gln Gln Gly Lys Gln Gln Glu Asn Glu
        195                 200                 205

Gly Asn Asn Ile Phe Ser Gly Phe Lys Arg Asp Phe Leu Glu Asp Ala
    210                 215                 220

Phe Asn Val Asn Arg His Ile Val Asp Arg Leu Gln Gly Arg Asn Glu
225                 230                 235                 240

Asp Glu Glu Lys Gly Ala Ile Val Lys Val Lys Gly Leu Ser Ile
                245                 250                 255

Ile Ser Pro Pro Glu Lys Gln Ala Arg His Gln Arg Gly Ser Arg Gln
            260                 265                 270

Glu Glu Asp Glu Asp Glu Asp Glu Glu Arg Gln Pro Arg His Gln Arg
        275                 280                 285

Gly Ser Arg Gln Glu Glu Glu Glu Asp Glu Asp Glu Arg Gln Pro
    290                 295                 300

Arg His Gln Arg Arg Gly Glu Glu Glu Glu Asp Lys Lys Glu
305                 310                 315                 320

Arg Arg Gly Ser Gln Lys Gly Lys Ser Arg Arg Gln Gly Asp Asn Gly
```

```
                    325                 330                 335
Leu Glu Glu Thr Val Cys Thr Ala Lys Leu Arg Leu Asn Ile Gly Pro
                340                 345                 350

Ser Ser Ser Pro Asp Ile Tyr Asn Pro Glu Ala Gly Arg Ile Lys Thr
            355                 360                 365

Val Thr Ser Leu Asp Leu Pro Val Leu Arg Trp Leu Lys Leu Ser Ala
        370                 375                 380

Glu His Gly Ser Leu His Lys Asn Ala Met Phe Val Pro His Tyr Asn
385                 390                 395                 400

Leu Asn Ala Asn Ser Ile Ile Tyr Ala Leu Lys Gly Arg Ala Arg Leu
                405                 410                 415

Gln Val Val Asn Cys Asn Gly Asn Thr Val Phe Asp Gly Glu Leu Glu
            420                 425                 430

Ala Gly Arg Ala Leu Thr Val Pro Gln Asn Tyr Ala Val Ala Ala Lys
        435                 440                 445

Ser Leu Ser Asp Arg Phe Ser Tyr Val Ala Phe Lys Thr Asn Asp Arg
    450                 455                 460

Ala Gly Ile Ala Arg Leu Ala Gly Thr Ser Ser Val Ile Asn Asn Leu
465                 470                 475                 480

Pro Leu Asp Val Val Ala Ala Thr Phe Asn Leu Gln Arg Asn Glu Ala
                485                 490                 495

Arg Gln Leu Lys Ser Asn Asn Pro Phe Lys Phe Leu Val Pro Ala Arg
            500                 505                 510

Gln Ser Glu Asn Arg Ala Ser Ala
        515                 520

<210> SEQ ID NO 229
<211> LENGTH: 160
<212> TYPE: PRT
<213> ORGANISM: Oryza sativa

<400> SEQUENCE: 229

Met Ala Ser Asn Lys Val Val Phe Ser Val Leu Leu Ala Val Val
1               5                   10                  15

Ser Val Leu Ala Ala Thr Ala Thr Met Ala Glu Tyr His His Gln Asp
                20                  25                  30

Gln Val Val Tyr Thr Pro Gly Pro Leu Cys Gln Pro Gly Met Gly Tyr
            35                  40                  45

Pro Met Tyr Pro Leu Pro Arg Cys Arg Ala Leu Val Lys Arg Gln Cys
    50                  55                  60

Val Gly Arg Gly Thr Ala Ala Ala Glu Gln Val Arg Arg Asp Cys
65                  70                  75                  80

Cys Arg Gln Leu Ala Val Asp Asp Ser Trp Cys Arg Cys Glu Ala
                85                  90                  95

Ile Ser His Met Leu Gly Gly Ile Tyr Arg Glu Leu Gly Ala Pro Asp
            100                 105                 110

Val Gly His Pro Met Ser Glu Val Phe Arg Gly Cys Arg Arg Gly Asp
        115                 120                 125

Leu Glu Arg Ala Ala Ala Ser Leu Pro Ala Phe Cys Asn Val Asp Ile
    130                 135                 140

Pro Asn Gly Gly Gly Val Cys Tyr Trp Leu Ala Arg Ser Gly Tyr
145                 150                 155                 160

<210> SEQ ID NO 230
<211> LENGTH: 510
```

<212> TYPE: PRT
<213> ORGANISM: Oryza sativa

<400> SEQUENCE: 230

```
Met Ala Ser Met Ser Thr Ile Leu Pro Leu Cys Leu Gly Leu Leu Leu
1               5                   10                  15

Phe Phe Gln Val Ser Met Ala Gln Phe Ser Phe Gly Gly Ser Pro Leu
            20                  25                  30

Gln Ser Pro Arg Gly Phe Arg Gly Asp Gln Asp Ser Arg His Gln Cys
        35                  40                  45

Arg Phe Glu His Leu Thr Ala Leu Glu Ala Thr His Gln Gln Arg Ser
    50                  55                  60

Glu Ala Gly Phe Thr Glu Tyr Tyr Asn Ile Glu Ala Arg Asn Glu Phe
65                  70                  75                  80

Arg Cys Ala Gly Val Ser Val Arg Arg Leu Val Val Glu Ser Lys Gly
                85                  90                  95

Leu Val Leu Pro Met Tyr Ala Asn Ala His Lys Leu Val Tyr Ile Val
            100                 105                 110

Gln Gly Arg Gly Val Phe Gly Met Ala Leu Pro Gly Cys Pro Glu Thr
        115                 120                 125

Phe Gln Ser Val Arg Ser Pro Phe Glu Gln Glu Val Ala Thr Ala Gly
130                 135                 140

Glu Ala Gln Ser Ser Ile Gln Lys Met Arg Asp Glu His Gln Gln Leu
145                 150                 155                 160

His Gln Phe His Gln Gly Asp Val Ile Ala Val Pro Ala Gly Val Ala
                165                 170                 175

His Trp Leu Tyr Asn Asn Gly Asp Ser Pro Val Val Ala Phe Thr Val
            180                 185                 190

Ile Asp Thr Ser Asn Asn Ala Asn Gln Leu Asp Pro Lys Arg Arg Glu
        195                 200                 205

Phe Phe Leu Ala Gly Lys Pro Arg Ser Ser Trp Gln Gln Gln Ser Tyr
    210                 215                 220

Ser Tyr Gln Thr Glu Gln Leu Ser Arg Asn Gln Asn Ile Phe Ala Gly
225                 230                 235                 240

Phe Ser Pro Asp Leu Leu Ser Glu Ala Leu Ser Val Ser Lys Gln Thr
                245                 250                 255

Val Leu Arg Leu Gln Gly Leu Ser Asp Pro Arg Gly Ala Ile Ile Arg
            260                 265                 270

Val Glu Asn Gly Leu Gln Ala Leu Gln Pro Ser Leu Gln Val Glu Pro
        275                 280                 285

Val Lys Glu Glu Gln Thr Gln Ala Tyr Leu Pro Thr Lys Gln Leu Gln
    290                 295                 300

Pro Thr Trp Leu Arg Ser Gly Gly Ala Cys Gly Gln Gln Asn Val Leu
305                 310                 315                 320

Asp Glu Ile Met Cys Ala Phe Lys Leu Arg Lys Asn Ile Asp Asn Pro
                325                 330                 335

Gln Ser Ser Asp Ile Phe Asn Pro His Gly Gly Arg Ile Thr Arg Ala
            340                 345                 350

Asn Ser Gln Asn Phe Pro Ile Leu Asn Ile Ile Gln Met Ser Ala Thr
        355                 360                 365

Arg Ile Val Leu Gln Asn Asn Ala Leu Leu Thr Pro His Trp Thr Val
    370                 375                 380

Asn Ala His Thr Val Met Tyr Val Thr Ala Gly Gln Gly His Ile Gln
385                 390                 395                 400
```

Val Val Asp His Arg Gly Arg Ser Val Phe Asp Gly Glu Leu His Gln
            405                 410                 415

Gln Gln Ile Leu Leu Ile Pro Gln Asn Phe Ala Val Val Lys Ala
            420                 425                 430

Arg Arg Glu Gly Phe Ala Trp Val Ser Phe Lys Thr Asn His Asn Ala
            435                 440                 445

Val Asp Ser Gln Ile Ala Gly Lys Ala Ser Ile Leu Arg Ala Leu Pro
450                 455                 460

Val Asp Val Val Ala Asn Ala Tyr Arg Leu Ser Arg Glu Asp Ser Arg
465                 470                 475                 480

His Val Lys Phe Asn Arg Gly Asp Glu Met Ala Val Phe Ala Pro Arg
            485                 490                 495

Arg Gly Pro Gln Gln Tyr Ala Glu Trp Gln Ile Asn Glu Lys
            500                 505                 510

<210> SEQ ID NO 231
<211> LENGTH: 484
<212> TYPE: PRT
<213> ORGANISM: Oryza sativa

<400> SEQUENCE: 231

Met Ala Thr Thr Thr Ser Leu Leu Ser Ser Cys Leu Cys Ala Leu Leu
1               5                   10                  15

Leu Ala Pro Leu Phe Ser Gln Gly Val Asp Ala Trp Glu Ser Arg Gln
            20                  25                  30

Gly Ala Ser Arg Gln Cys Arg Phe Asp Arg Leu Gln Ala Phe Glu Pro
        35                  40                  45

Leu Arg Lys Val Arg Ser Glu Ala Gly Asp Thr Glu Tyr Phe Asp Glu
    50                  55                  60

Arg Asn Glu Gln Phe Arg Cys Ala Gly Val Phe Val Ile Arg Arg Val
65                  70                  75                  80

Ile Glu Pro Gln Gly Leu Val Val Pro Arg Tyr Ser Asn Thr Pro Ala
                85                  90                  95

Leu Ala Tyr Ile Ile Gln Gly Lys Gly Tyr Val Gly Leu Thr Phe Pro
            100                 105                 110

Gly Cys Pro Ala Thr His Gln Gln Phe Gln Leu Phe Glu Gln Arg
            115                 120                 125

Gln Ser Asp Gln Ala His Lys Phe Arg Asp Glu His Gln Lys Ile His
        130                 135                 140

Glu Phe Arg Gln Gly Asp Val Val Ala Leu Pro Ala Ser Val Ala His
145                 150                 155                 160

Trp Phe Tyr Asn Gly Gly Asp Thr Pro Ala Val Val Val Tyr Val Tyr
                165                 170                 175

Asp Ile Lys Ser Phe Ala Asn Gln Leu Glu Pro Arg Gln Lys Glu Phe
            180                 185                 190

Leu Leu Ala Gly Asn Asn Gln Arg Gly Gln Gln Ile Phe Glu His Ser
        195                 200                 205

Ile Phe Gln His Ser Gly Gln Asn Ile Phe Ser Gly Phe Asn Thr Glu
    210                 215                 220

Val Leu Ser Glu Ala Leu Gly Ile Asn Thr Glu Ala Ser Lys Arg Leu
225                 230                 235                 240

Gln Ser Gln Asn Asp Gln Arg Gly Asp Ile Ile Arg Val Lys His Gly
                245                 250                 255

Leu Gln Leu Leu Lys Pro Thr Leu Thr Gln Arg Gln Glu Glu His Arg

```
            260                 265                 270
Gln Tyr Gln Gln Val Gln Tyr Arg Glu Gly Gln Tyr Asn Gly Leu Asp
        275                 280                 285
Glu Asn Phe Cys Thr Ile Lys Ala Arg Val Asn Ile Glu Asn Pro Ser
        290                 295                 300
Arg Ala Asp Tyr Tyr Asn Pro Arg Ala Gly Arg Ile Thr Leu Leu Asn
305                 310                 315                 320
Asn Gln Lys Phe Pro Ile Leu Asn Leu Ile Gly Met Gly Ala Ala Arg
                325                 330                 335
Val Asn Leu Tyr Gln Asn Ala Leu Leu Ser Pro Phe Trp Asn Ile Asn
                340                 345                 350
Ala His Ser Val Val Tyr Ile Ile Gln Gly Ser Val Arg Val Gln Val
                355                 360                 365
Ala Asn Asn Gln Gly Arg Ser Val Phe Asn Gly Val Leu His Gln Gly
                370                 375                 380
Gln Leu Leu Ile Ile Pro Gln Asn His Ala Val Ile Lys Lys Ala Glu
385                 390                 395                 400
His Asn Gly Cys Gln Tyr Val Ala Ile Lys Thr Ile Ser Asp Pro Thr
                405                 410                 415
Val Ser Trp Val Ala Gly Lys Asn Ser Ile Leu Arg Ala Leu Pro Val
                420                 425                 430
Asp Val Ile Ala Asn Ala Tyr Arg Ile Ser Arg Asp Glu Ala Arg Arg
                435                 440                 445
Leu Lys Asn Asn Arg Ala Asp Glu Ile Gly Pro Phe Thr Pro Arg Phe
450                 455                 460
Pro Gln Lys Ser Gln Arg Gly Tyr Gln Phe Leu Thr Glu Gly Leu Ser
465                 470                 475                 480
Leu Ile Gly Met

<210> SEQ ID NO 232
<211> LENGTH: 275
<212> TYPE: PRT
<213> ORGANISM: Pisum sativum

<400> SEQUENCE: 232

Asp Asn Ala Glu Ile Glu Lys Ile Leu Leu Glu Glu His Glu Lys Glu
1               5                   10                  15
Thr His His Arg Arg Gly Leu Arg Asp Lys Arg Gln Gln Ser Gln Glu
                20                  25                  30
Lys Asn Val Ile Val Lys Val Ser Lys Lys Gln Ile Glu Glu Leu Ser
                35                  40                  45
Lys Asn Ala Lys Ser Ser Ser Lys Lys Ser Val Ser Ser Arg Ser Glu
                50                  55                  60
Pro Phe Asn Leu Lys Ser Ser Asp Pro Ile Tyr Ser Asn Gln Tyr Gly
65                  70                  75                  80
Lys Phe Phe Glu Ile Thr Pro Lys Lys Asn Pro Gln Leu Gln Asp Leu
                85                  90                  95
Asp Ile Phe Val Asn Tyr Val Glu Ile Lys Glu Gly Ser Leu Trp Leu
                100                 105                 110
Pro His Tyr Asn Ser Arg Ala Ile Val Ile Val Thr Val Asn Glu Gly
                115                 120                 125
Lys Gly Asp Phe Glu Leu Val Gly Gln Arg Asn Glu Asn Gln Gln Gly
                130                 135                 140
Leu Arg Glu Glu Asp Asp Glu Glu Glu Glu Gln Arg Glu Glu Glu Thr
```

```
                145                 150                 155                 160
Lys Asn Gln Val Gln Ser Tyr Lys Ala Lys Leu Thr Pro Gly Asp Val
                    165                 170                 175

Phe Val Ile Pro Ala Gly His Pro Val Ala Val Arg Ala Ser Ser Asn
            180                 185                 190

Leu Asn Leu Leu Gly Phe Gly Ile Asn Ala Glu Asn Gln Arg Asn
        195                 200                 205

Phe Leu Ala Gly Glu Glu Asp Asn Val Ile Ser Gln Ile Gln Lys Gln
        210                 215                 220

Val Lys Asp Leu Thr Phe Pro Gly Ser Ala Gln Glu Val Asp Arg Leu
225                 230                 235                 240

Leu Glu Asn Gln Lys Gln Ser Tyr Phe Ala Asn Ala Gln Pro Gln Gln
                245                 250                 255

Arg Glu Thr Arg Ser Gln Glu Ile Lys Glu His Leu Tyr Ser Ile Leu
                260                 265                 270

Gly Ala Phe
        275

<210> SEQ ID NO 233
<211> LENGTH: 517
<212> TYPE: PRT
<213> ORGANISM: Pisum sativum

<400> SEQUENCE: 233

Met Ala Lys Leu Leu Ala Leu Ser Leu Ser Phe Cys Phe Leu Leu Leu
1               5                   10                  15

Gly Gly Cys Phe Ala Leu Arg Glu Gln Pro Gln Gln Asn Glu Cys Gln
            20                  25                  30

Leu Glu Arg Leu Asp Ala Leu Glu Pro Asp Asn Arg Ile Glu Ser Glu
        35                  40                  45

Gly Gly Leu Ile Glu Thr Trp Asn Pro Asn Asn Lys Gln Phe Arg Cys
    50                  55                  60

Ala Gly Val Ala Leu Ser Arg Ala Thr Leu Gln Arg Asn Ala Leu Arg
65                  70                  75                  80

Arg Pro Tyr Tyr Ser Asn Ala Pro Gln Glu Ile Phe Ile Gln Gln Gly
                85                  90                  95

Asn Gly Tyr Phe Gly Met Val Phe Pro Gly Cys Pro Glu Thr Phe Glu
            100                 105                 110

Glu Pro Gln Glu Ser Glu Gln Gly Glu Gly Arg Arg Tyr Arg Asp Arg
        115                 120                 125

His Gln Lys Val Asn Arg Phe Arg Glu Gly Asp Ile Ile Ala Val Pro
    130                 135                 140

Thr Gly Ile Val Phe Trp Met Tyr Asn Asp Gln Asp Thr Pro Val Ile
145                 150                 155                 160

Ala Val Ser Leu Thr Asp Ile Arg Ser Ser Asn Asn Gln Leu Asp Gln
                165                 170                 175

Met Pro Arg Arg Phe Tyr Leu Ala Gly Asn His Glu Gln Glu Phe Leu
            180                 185                 190

Gln Tyr Gln His Gln Gln Gly Gly Lys Gln Glu Gln Glu Asn Glu Gly
        195                 200                 205

Asn Asn Ile Phe Ser Gly Phe Lys Arg Asp Tyr Leu Glu Asp Ala Phe
    210                 215                 220

Asn Val Asn Arg His Ile Val Asp Arg Leu Gln Gly Arg Asn Glu Asp
225                 230                 235                 240
```

-continued

```
Glu Glu Lys Gly Ala Ile Val Lys Val Lys Gly Gly Leu Ser Ile Ile
            245                 250                 255

Ser Pro Pro Glu Lys Gln Ala Arg His Gln Arg Gly Ser Arg Gln Glu
        260                 265                 270

Glu Asp Glu Asp Glu Glu Lys Gln Pro Arg His Gln Arg Gly Ser Arg
    275                 280                 285

Gln Glu Glu Glu Glu Asp Glu Asp Glu Glu Arg Gln Pro Arg His Gln
290                 295                 300

Arg Arg Arg Gly Glu Glu Glu Glu Asp Lys Lys Glu Arg Gly Gly
305                 310                 315                 320

Ser Gln Lys Gly Lys Ser Arg Arg Gln Gly Asp Asn Gly Leu Glu Glu
                325                 330                 335

Thr Val Cys Thr Ala Lys Leu Arg Leu Asn Ile Gly Pro Ser Ser Ser
            340                 345                 350

Pro Asp Ile Tyr Asn Pro Glu Ala Gly Arg Ile Lys Thr Val Thr Ser
        355                 360                 365

Leu Asp Leu Pro Val Leu Arg Trp Leu Lys Leu Ser Ala Glu His Gly
    370                 375                 380

Ser Leu His Lys Asn Ala Met Phe Val Pro His Tyr Asn Leu Asn Ala
385                 390                 395                 400

Asn Ser Ile Ile Tyr Ala Leu Lys Gly Arg Ala Arg Leu Gln Val Val
                405                 410                 415

Asn Cys Asn Gly Asn Thr Val Phe Asp Gly Leu Glu Ala Gly Arg
            420                 425                 430

Ala Leu Thr Val Pro Gln Asn Tyr Ala Val Ala Lys Ser Leu Ser
        435                 440                 445

Asp Arg Phe Ser Tyr Val Ala Phe Lys Thr Asn Asp Arg Ala Gly Ile
    450                 455                 460

Ala Arg Leu Ala Gly Thr Ser Ser Val Ile Asn Asn Leu Pro Leu Asp
465                 470                 475                 480

Val Val Ala Ala Thr Phe Asn Leu Gln Arg Asn Glu Ala Arg Gln Leu
                485                 490                 495

Lys Ser Asn Asn Pro Phe Lys Phe Leu Val Pro Ala Arg Glu Ser Glu
            500                 505                 510

Asn Arg Ala Ser Ala
        515

<210> SEQ ID NO 234
<211> LENGTH: 861
<212> TYPE: PRT
<213> ORGANISM: Pisum sativum

<400> SEQUENCE: 234

Met Phe Ser Gly Val Thr Gly Ile Leu Asn Arg Gly His Lys Ile Lys
1               5                   10                  15

Gly Thr Val Val Leu Met Arg Lys Asn Val Leu Asp Ile Asn Ser Leu
            20                  25                  30

Thr Thr Val Gly Gly Val Ile Gly Gln Gly Phe Asp Ile Leu Gly Ser
        35                  40                  45

Thr Val Asp Asn Leu Thr Ala Phe Leu Gly Arg Ser Val Ser Leu Gln
    50                  55                  60

Leu Ile Ser Ala Thr Lys Pro Asp Ala Thr Gly Lys Gly Lys Leu Gly
65                  70                  75                  80

Lys Ala Thr Phe Leu Glu Gly Ile Ile Ser Ser Leu Pro Thr Leu Gly
                85                  90                  95
```

```
Ala Gly Gln Ser Ala Phe Lys Ile His Phe Glu Trp Asp Asp Met
            100                 105                 110

Gly Ile Pro Gly Ala Phe Tyr Ile Lys Asn Phe Met Gln Thr Glu Phe
            115                 120                 125

Phe Leu Val Ser Leu Thr Leu Asp Asp Ile Pro Asn His Gly Ser Ile
    130                 135                 140

Tyr Phe Val Cys Asn Ser Trp Ile Tyr Asn Ala Lys His His Lys Ile
145                 150                 155                 160

Asp Arg Ile Phe Phe Ala Asn Gln Thr Tyr Leu Pro Ser Glu Thr Pro
                165                 170                 175

Ala Pro Leu Val His Tyr Arg Glu Glu Leu Asn Asn Leu Arg Gly
            180                 185                 190

Asp Gly Thr Gly Glu Arg Lys Glu Trp Glu Arg Ile Tyr Asp Tyr Asp
            195                 200                 205

Val Tyr Asn Asp Leu Gly Asn Pro Asp Ser Gly Glu Asn His Ala Arg
    210                 215                 220

Pro Val Leu Gly Gly Ser Glu Thr Tyr Pro Tyr Pro Arg Arg Gly Arg
225                 230                 235                 240

Thr Gly Arg Lys Pro Thr Arg Lys Asp Pro Asn Ser Glu Ser Arg Ser
                245                 250                 255

Asp Tyr Val Tyr Leu Pro Arg Asp Glu Ala Phe Gly His Leu Lys Ser
            260                 265                 270

Ser Asp Phe Leu Thr Tyr Gly Leu Lys Ala Val Ser Gln Asn Val Val
            275                 280                 285

Pro Ala Leu Glu Ser Val Phe Phe Asp Leu Asn Phe Thr Pro Asn Glu
            290                 295                 300

Phe Asp Ser Phe Asp Glu Val His Gly Leu Tyr Glu Gly Gly Ile Lys
305                 310                 315                 320

Leu Pro Thr Asn Ile Leu Ser Gln Ile Ser Pro Leu Pro Val Leu Lys
                325                 330                 335

Glu Ile Phe Arg Thr Asp Gly Glu Asn Thr Leu Lys Tyr Pro Pro Pro
            340                 345                 350

Lys Val Ile Gln Val Ser Arg Ser Gly Trp Met Thr Asp Glu Glu Phe
            355                 360                 365

Ala Arg Glu Met Leu Ala Gly Val Asn Pro Asn Val Ile Cys Cys Leu
            370                 375                 380

Gln Glu Phe Pro Pro Arg Ser Lys Leu Asp Ser Gln Ile Tyr Gly Asp
385                 390                 395                 400

His Thr Ser Lys Ile Ser Lys Glu His Leu Glu Pro Asn Leu Glu Gly
                405                 410                 415

Leu Thr Val Glu Glu Ala Ile Gln Asn Lys Lys Leu Phe Leu Leu Asp
            420                 425                 430

His His Asp Ser Ile Met Pro Tyr Leu Arg Arg Ile Asn Ser Thr Ser
            435                 440                 445

Thr Lys Ala Tyr Ala Thr Arg Thr Ile Leu Phe Leu Asn Asn Asn Gln
            450                 455                 460

Asn Leu Lys Pro Leu Ala Ile Glu Leu Ser Leu Pro His Pro Gln Gly
465                 470                 475                 480

Asp Glu His Gly Ala Val Ser Tyr Val Tyr Gln Pro Ala Leu Glu Gly
                485                 490                 495

Val Glu Ser Ser Ile Trp Leu Leu Ala Lys Ala Tyr Val Ile Val Asn
            500                 505                 510
```

```
Asp Ser Cys Tyr His Gln Leu Val Ser His Trp Leu Asn Thr His Ala
            515                 520                 525

Val Val Glu Pro Phe Val Ile Ala Thr Asn Arg His Leu Ser Cys Leu
530                 535                 540

His Pro Ile Tyr Lys Leu Leu Tyr Pro His Tyr Arg Asp Thr Met Asn
545                 550                 555                 560

Ile Asn Ser Leu Ala Arg Leu Ser Leu Val Asn Asp Gly Gly Ile Ile
                565                 570                 575

Glu Lys Thr Phe Leu Trp Gly Arg Tyr Ser Met Glu Met Ser Ser Lys
            580                 585                 590

Val Tyr Lys Asn Trp Val Phe Thr Glu Gln Ala Leu Pro Ala Asp Leu
    595                 600                 605

Ile Lys Arg Gly Met Ala Ile Glu Asp Pro Ser Ser Pro Cys Gly Val
610                 615                 620

Lys Leu Val Val Glu Asp Tyr Pro Tyr Ala Val Asp Gly Leu Glu Ile
625                 630                 635                 640

Trp Ala Ile Ile Lys Thr Trp Val Gln Asp Tyr Val Ser Leu Tyr Tyr
                645                 650                 655

Thr Ser Asp Glu Lys Leu Arg Gln Asp Ser Glu Leu Gln Ala Trp Trp
            660                 665                 670

Lys Glu Leu Val Glu Val Gly His Gly Asp Lys Lys Asn Glu Pro Trp
    675                 680                 685

Trp Pro Lys Met Gln Thr Arg Glu Asp Leu Ile Glu Val Cys Ser Ile
690                 695                 700

Val Ile Trp Thr Ala Ser Ala Leu His Ala Ala Val Asn Phe Gly Gln
705                 710                 715                 720

Tyr Ser Tyr Gly Gly Leu Ile Leu Asn Arg Pro Thr Leu Ser Arg Arg
                725                 730                 735

Phe Met Pro Glu Lys Gly Ser Ala Glu Phe Glu Glu Leu Val Lys Ser
            740                 745                 750

Pro Gln Lys Ala Tyr Leu Lys Thr Ile Thr Pro Lys Phe Gln Thr Leu
    755                 760                 765

Ile Asp Leu Ser Val Ile Glu Ile Leu Ser Arg His Ala Ser Asp Glu
770                 775                 780

Leu Tyr Leu Gly Glu Arg Asp Asn Pro Asn Trp Thr Ser Asp Lys Arg
785                 790                 795                 800

Ala Leu Glu Ala Phe Lys Lys Phe Gly Asn Lys Leu Ala Glu Ile Glu
                805                 810                 815

Lys Lys Leu Thr Gln Arg Asn Asn Asp Glu Lys Leu Arg Asn Arg His
            820                 825                 830

Gly Pro Val Glu Met Pro Tyr Thr Leu Leu Tyr Pro Ser Ser Lys Glu
    835                 840                 845

Gly Leu Thr Phe Arg Gly Ile Pro Asn Ser Ile Ser Ile
850                 855                 860

<210> SEQ ID NO 235
<211> LENGTH: 7
<212> TYPE: PRT
<213> ORGANISM: Artificial Sequence
<220> FEATURE:
<223> OTHER INFORMATION: Synthetic peptide

<400> SEQUENCE: 235

Leu Ala Ile Pro Val Asn Arg
1               5
```

```
<210> SEQ ID NO 236
<211> LENGTH: 10
<212> TYPE: PRT
<213> ORGANISM: Artificial Sequence
<220> FEATURE:
<223> OTHER INFORMATION: Synthetic peptide

<400> SEQUENCE: 236

Ser Phe Leu Leu Ser Gly Asn Gln Asn Gln
1               5                   10

<210> SEQ ID NO 237
<211> LENGTH: 9
<212> TYPE: PRT
<213> ORGANISM: Artificial Sequence
<220> FEATURE:
<223> OTHER INFORMATION: Synthetic peptide

<400> SEQUENCE: 237

Gly Ser Leu Leu Leu Pro His Tyr Asn
1               5
```

PEPTIDES FOR USE IN PROMOTING TRANSPORT OF GLUCOSE

CROSS-REFERENCE TO RELATED APPLICATIONS

This application is a continuation under 35 U.S.C. § 120 of co-pending U.S. application Ser. No. 15/744,403 filed on Jan. 12, 2018, which is a 371 National Phase Entry of International Patent Application No. PCT/EP2016/067098 filed on Jul. 18, 2016 which claims benefit under 35 U.S.C. § 119(b) of European Patent Application No. 15177018.7 filed Jul. 16, 2015, the contents of each which are incorporated herein by reference in their entireties.

SEQUENCE LISTING

The sequence listing of the present application has been submitted electronically via EFS-Web as an ASCII formatted sequence listing with a file name "SEQTXT-1-048262-091350.txt", creation date of Oct. 4, 2018 and a size of 183,747 bytes. The sequence listing submitted via EFS-Web is part of the specification and is herein incorporated by reference in its entirety.

BACKGROUND TO THE INVENTION

Nearly 38% of the human body is made of skeletal muscle. The basic function of this type of muscle is to generate strength and allow movement and mobility. It is also a key player in global protein metabolism and the principal reservoir for amino acids (Wolfe R. R. 2006). Muscle also plays a crucial role in blood glucose level regulation. Indeed, 80% of glucose consumed is absorbed by the skeletal muscle and then transformed into glycogen (a form of energy storage). All this makes the maintenance of healthy skeletal muscle paramount for overall health and wellbeing.

There are many reasons why muscle health is crucial. Firstly, muscle loss causes immobility and, with an ageing population on the rise, this is becoming a huge problem. Secondly, active individuals want to maintain their muscle mass, remain athletic, competitive and healthy. Finally, low muscle-glucose absorption can cause high blood glucose levels which can lead to severe conditions such as pre-diabetes and, ultimately, diabetes.

Currently, there are different approaches for improving muscle health or muscle-glucose-absorption. The former is usually managed using protein shakes rich in single branched-chain amino acids, however, these are poorly understood and their efficacy is debatable. For muscle glucose absorption, synthetic insulin is used. However, insulin carries an array of functionalities that impact other parts of the body causing side effects and insulin resistance.

Finding an alternative that helps muscle recovery and maintenance as well as allows glucose to enter the muscle without targeting the insulin receptor is thus becoming essential for the billions of people suffering from muscle loss and diabetes.

It is an object of the invention to overcome at least one of the above-referenced problems and provide a natural, food grade, glucose metabolism enhancer.

STATEMENTS OF INVENTION

The pea genome codes for over 70,000 different proteins. The Applicant has identified two of these proteins, each of which contains one or more peptides capable of facilitating glucose transport in mammalian skeletal muscle (hereafter "glucose transport promoting peptide" or "glucose transport promoting fragment"). Likewise, out of the more than 60,000 proteins encoded by the rice genome, the Applicant has identified four proteins, each of which contains one or more peptides capable of facilitating glucose transport in mammalian skeletal muscle. Glucose transport promoting fragments of the six identified proteins, and compositions containing a plurality of the glucose transport promoting peptides have been shown to cause a significant increase in cell surface GLUT4 translocation in response to insulin stimulation in-vitro (FIGS. 1-6). The specific plant proteins from which the natural peptides are derived are described herein, for example in SEQ ID NOs: 1-6. The specific pea proteins from which the peptides are derived are provided in SEQ ID NOs: 1-2, and the specific rice proteins from which the peptides are derived are provided in SEQ ID NOs: 3-6. Homologs of these proteins are described in SEQ ID NOs: 67-84. The specific peptides initially identified in the pea proteins are shown in SEQ ID NOs: 7-46. The specific peptides initially identified in the rice proteins are shown in SEQ ID NOs: 47-66. The peptides of the invention are primarily useful for causing an increase in glucose uptake in mammalian skeletal muscle, and therefore have utility in improving muscle health generally, but also find utility in treatment or management of metabolic conditions characterised by dysregulated glucose or insulin levels in mammals, for example diabetes and more specifically regulating glucose homeostasis and attenuating insulin resistance.

In a first aspect, the invention provides a peptide, typically 3 to 50 amino acids in length, and comprising a fragment of a protein selected from SEQ ID NOs: 1 to 6 or 227 to 234, or a homolog thereof, or a variant of the peptide (hereafter "peptide of the invention"). In one embodiment, the peptide or variant thereof is bioactive. In one embodiment, the peptide or variant thereof has glucose transport promoting activity.

In one embodiment, the peptide comprises a sequence selected from SEQ ID NOs: 7-66 and 85-226. In one embodiment, the peptide comprises a sequence selected from SEQ ID NOs: 7, SEQ ID NO: 13 and SEQ ID NO: 51.

In one embodiment, the peptide consists essentially of a sequence selected from SEQ ID NOs: 7-66 and 85-226. In one embodiment, the peptide consists essentially of a sequence selected from SEQ ID NO: 7, SEQ ID NO: 13 and SEQ ID NO: 51.

In one embodiment, the peptide of the invention is glucose transport promoting. In other embodiments, the peptide or variant is anti-inflammatory. In other embodiments, the peptide or variant is antibacterial. In other embodiments, the peptide or variant has cellular growth or proliferation promoting activity.

In one embodiment, the fragment has between 8 and 23 amino acids. In one embodiment, the fragment has a charge of −5 and +3.

Preferably, the c-terminal amino acid is not C, I, K, M, P, T or W.

Preferably, the n-terminal amino acid is not C, D, H, M, P, T, V, W.

Preferably, the c-terminal domain of the fragment does not contain C, M or W.

Preferably, the n-terminal domain of the fragment does not contain C, M, T or W.

Preferably, the fragment or peptide does not contain C.

Preferably, the fragment or peptide does not contain M.

Preferably, the peptide of the invention comprises a fragment selected from SEQ ID NOs: 7-66, or a bioactive variant of the fragment.

Preferably, the peptide of the invention consists of a fragment selected from SEQ ID NOs: 7-66, or a bioactive variant of the fragment.

Preferably, the peptide consists of a sequence selected from SEQ ID NOs: 7-66.

Preferably, the peptide comprises or consists of a sequence selected from SEQ ID NOs: 7-20.

Preferably, the peptide comprises or consists of SEQ ID NO: 7.

The invention also provides a peptide of the invention in a modified form (modified peptide).

The invention also provides a conjugate comprising a peptide of the invention conjugated to a binding partner.

[SEQ ID NO: 1 (Pea Protein 1—P13918)]

Preferably, the peptide comprises a bioactive fragment of the protein of SEQ ID NO: 1 or a homolog thereof, or a bioactive variant of the fragment. Preferably, the bioactive peptide or fragment is glucose transport promoting.

In one embodiment, the bioactive fragment comprises the sequence LAIPVNR (SEQ ID NO: 235). Examples of bioactive fragments include the LAIPVNR motif include SEQ ID NO: 7, SEQ ID NO: 8, SEQ ID NO: 10, SEQ ID NO: 12 and SEQ ID NO: 14.

In one embodiment, the peptide of the invention (or bioactive fragment) comprises the sequence SFLLSGNQNQ (SEQ ID NO: 236). Examples of bioactive fragments including this motif include SEQ ID NO: 9, SEQ ID NO: 11, SEQ ID NO: 13, SEQ ID NO: 16, SEQ ID NO: 17, SEQ ID NO: 190, SEQ ID NO: 191, SEQ ID NO: 192 and SEQ ID NO: 204. Thus, in one embodiment, the invention comprises a sequence of In one embodiment, the bioactive fragment comprises the sequence GSLLLPHYN (SEQ ID NO: 237). Examples of bioactive fragments including this motif include SEQ ID NO: 18 and SEQ ID NO: 19.

Preferably, the peptide comprises a bioactive fragment selected from SEQ ID NOS: 7-20, or a bioactive variant of the fragment.

The invention also provides a composition comprising at least 1, preferably at least 2, preferably at least 3, preferably at least 4, preferably at least 5, preferably at least 6, preferably at least 7, preferably at least 8, preferably at least 9, or preferably at least 10 bioactive peptides of the invention. When the composition comprises a plurality of peptides of the invention, each comprises a different a bioactive fragment of SEQ ID NO: 1 (for example the fragments of SEQ ID NOs: 7-20), or a homolog thereof. Preferably, the composition comprises a first bioactive peptide comprising a first bioactive fragment selected from SEQ ID NOs: 7-20 (or a bioactive variant of the fragment), and a second bioactive peptide comprising a second a bioactive fragment selected from SEQ ID NOs: 7-20 (or a bioactive variant of the fragment). Preferably, the composition comprises substantially all of the fragments of SEQ ID NOs: 7-20, or peptides of the invention comprising all of the fragments of SEQ ID NOs: 7-20.

Homologs of Pea Protein 1 (SEQ ID NO: 1) include *Vicia fabia*, *Cicer arietinum* and *Lens culinaris* homologs (SEQ ID NOs: 67-69).

[SEQ ID NO: 2 (Pea Protein 2—Q9M3X6)]

Preferably, the peptide comprises a bioactive fragment of the protein of SEQ ID NO: 2, or a homolog thereof, or a bioactive variant of the fragment. Preferably, the peptide or fragment is glucose transport promoting.

Preferably, the peptide comprises a bioactive fragment selected from SEQ ID NOS: 21-46, or a bioactive variant of the fragment.

The invention also provides a composition comprising at least 1, preferably at least 2, preferably at least 3, preferably at least 4, preferably at least 5, preferably at least 6, preferably at least 7, preferably at least 8, preferably at least 9, or preferably at least 10 bioactive peptides of the invention. When the composition comprises a plurality of peptides of the invention, each peptide comprises a different a bioactive fragment of SEQ ID NO: 2 (for example the fragments of SEQ ID NOs: 21-46), or a homolog thereof. Preferably, the composition comprises a first bioactive peptide comprising a bioactive fragment selected from SEQ ID NOs: 21-46, and a second bioactive peptide comprising a bioactive fragment selected from SEQ ID NOs: 21-46. Preferably, the composition comprises substantially all of the fragments of SEQ ID NOs: 21-46, or peptides of the invention comprising all of the fragments of SEQ ID NOs: 21-46.

Homologs of Pea Protein 2 (SEQ ID NO: 2) include *Pisum abyssinicum*, *Lathyrus annuus*, and *Vicia villosa* (SEQ ID NOs: 70-72).

[SEQ ID NO: 3 (Rice Protein 1—QODEV5)]

Preferably, the peptide comprises a bioactive fragment of the protein of SEQ ID NO: 3, or a homolog thereof, or a bioactive variant of the fragment. Preferably, the peptide or fragment is glucose transport promoting.

Preferably, the peptide comprises a bioactive fragment selected from SEQ ID NO: 47, or a bioactive variant of the fragment.

The invention also provides a composition comprising at least 1, preferably at least 2, preferably at least 3, preferably at least 4, preferably at least 5, preferably at least 6, preferably at least 7, preferably at least 8, preferably at least 9, or preferably at least 10 bioactive peptides of the invention.

Homologs of Rice Protein 1 (SEQ ID NO: 3) include *Oryza* rufipogon, *Oryza officinalis*, *Hordeum vulgare* subsp. *vulgare* (SEQ ID NOs: 73-75).

[SEQ ID NO: 4 (Rice Protein 2—P14323)]

Preferably, the peptide comprises a bioactive fragment of the protein of SEQ ID NO: 4, or a homolog thereof, or a bioactive variant of the fragment. Preferably, the fragment or peptide is glucose transport promoting.

Preferably, the peptide comprises a bioactive fragment selected from SEQ ID NOS: 48-59, or a bioactive variant of the fragment.

The invention also provides a composition comprising at least one or more peptides of the invention that comprise different bioactive fragments of SEQ ID NO: 4 or a homolog thereof. Preferably, the composition comprises a first peptide comprising a bioactive fragment SEQ ID NOs: 48-59 and a second peptide comprising a bioactive fragment SEQ ID NOs: 48-59. Preferably, the composition comprises substantially all of the fragments of SEQ ID NOs: 48-59, or peptides of the invention comprising all of the fragments of SEQ ID NOs: 48-59.

Homologs of Rice Protein 2 (SEQ ID NO: 4) include *Oryza brachyantha*, and *Zizania latifolia* (SEQ ID NOs: 76-78).

[SEQ ID NO: 5 (Rice Protein 3—P14614)]

Preferably, the peptide comprises a bioactive fragment of the protein of SEQ ID NO: 5, or a homolog thereof, or a bioactive variant of the fragment. Preferably, the fragment or peptide is glucose transport promoting.

Preferably, the peptide comprises a bioactive fragment selected from SEQ ID NOS: 60-63, or a bioactive variant of the fragment.

The invention also provides a composition comprising at least 1, preferably at least 2, preferably at least 3, preferably at least 4, preferably at least 5, preferably at least 6, preferably at least 7, preferably at least 8, preferably at least 9, or preferably at least 10 bioactive peptides of the invention, each of which comprises a different bioactive fragment of SEQ ID NO: 5 or a homolog thereof. Preferably, the composition comprises a first bioactive peptide comprising a bioactive fragment selected from SEQ ID NOs: 60-63, and a second bioactive peptide comprising a bioactive fragment selected from SEQ ID NOs: 60-63.

Homologs of Rice Protein 3 (SEQ ID NO: 5) include *Oryza sativa Japonica* Group and Seed Storage Globulin (SEQ ID NOs: 79-81).

[SEQ ID NO: 6 (Rice Protein 4—P07728)]

Preferably, the peptide comprises a bioactive fragment of the protein of SEQ ID NO: 6 or a homolog thereof, or a bioactive variant of the fragment.

Preferably, the peptide comprises a bioactive fragment selected from SEQ ID NOS: 64-66, or a bioactive variant of the fragment.

The invention also provides a composition comprising at least 1, preferably at least 2, preferably at least 3, preferably at least 4, preferably at least 5, preferably at least 6, preferably at least 7, preferably at least 8, preferably at least 9, or preferably at least 10 bioactive peptides of the invention, each of which comprises a bioactive fragment of SEQ ID NO: 6 or a homolog thereof. Preferably, the composition comprises a first bioactive peptide comprising a bioactive fragment selected from SEQ ID NOs: 64-66, and a second bioactive peptide comprising a bioactive fragment selected from SEQ ID NOs: 64-66.

Homologs of Rice Protein 4 (SEQ ID NO: 6) include glutelin (*Oryza sativa Japonica* Group), Glutelin precursor (*Zizania latifolia*) and globulin (*Avena sativa*) (SEQ ID NOs: 82-84).

The invention also provides a composition comprising at least one and preferably a plurality of bioactive (i.e. glucose transport promoting) peptides of the invention, wherein each of the peptides of the invention comprises a bioactive (i.e. glucose transport promoting) fragment of a protein selected from SEQ ID NO: 1 to 6 or a homolog thereof, or a bioactive (i.e. glucose transport promoting) variant or fragment thereof.

Typically, the or each bioactive (i.e. glucose transport promoting) peptide of the invention is selected from, or comprises, a bioactive (i.e. glucose transport promoting) fragment selected from, SEQ ID NOs: 7-66 and SEQ ID NOs: 85-226, or a bioactive (i.e. glucose transport promoting) variant or fragment thereof.

The invention also provides a composition comprising at least one and preferably a plurality of peptides of the invention, wherein the or each of the peptides of the invention comprise a bioactive (i.e. glucose transport promoting) fragment of a protein selected from SEQ ID NOs: 1-2. Typically, the or each peptide of the invention is selected from, or comprises a bioactive (i.e. glucose transport promoting) fragment selected from, SEQ ID NOs: 7-46, or a bioactive (i.e. glucose transport promoting) variant of the fragment. In one embodiment, the composition includes SEQ ID NOS: 7 and SEQ ID NO: 13, and optionally a plurality of peptides selected from SEQ ID NOS: 8 to 12 and SEQ ID NOS: 14 to 46. The invention also provides a composition comprising substantially all of the fragments of SEQ ID NOs: 7-46, or peptides comprising the fragments, or bioactive (i.e. glucose transport promoting) variants of the fragments The invention also provides a composition comprising at least one and preferably a plurality of peptides of the invention, wherein the or each of the peptides of the invention comprise a bioactive (i.e. glucose transport promoting) fragment of a protein selected from SEQ ID NOs: 3-6. Typically, the or each peptide of the invention is selected from, or comprises a bioactive (i.e. glucose transport promoting) fragment selected from, SEQ ID NOs: 47-66, or a bioactive (i.e. glucose transport promoting) variant of the fragment. The invention also provides a composition comprising substantially all of the fragments of SEQ ID NOs: 47-66, or peptides comprising the fragments, or bioactive (i.e. glucose transport promoting) variants of the fragments.

Preferably, the composition comprises at least two distinct bioactive (i.e. glucose transport promoting) peptides of the invention.

Preferably, the composition comprises at least three distinct bioactive (i.e. glucose transport promoting) peptides of the invention.

Preferably, the composition comprises at least four distinct bioactive (i.e. glucose transport promoting) peptides of the invention.

Preferably, the composition comprises at least five distinct bioactive (i.e. glucose transport promoting) peptides of the invention.

Preferably, the composition comprises at least six distinct bioactive (i.e. glucose transport promoting) peptides of the invention.

Preferably, the composition comprises at least seven distinct bioactive (i.e. glucose transport promoting) peptides of the invention.

Preferably, the composition comprises at least eight distinct bioactive (i.e. glucose transport promoting) peptides of the invention.

Preferably, the composition comprises at least nine distinct bioactive (i.e. glucose transport promoting) peptides of the invention.

Preferably, the composition comprises at least ten distinct bioactive (i.e. glucose transport promoting) peptides of the invention.

In one embodiment, the invention comprises a composition comprising substantially all of fragments SEQ ID NOs: 7-66, or peptides containing the fragments, or bioactive (i.e. glucose transport promoting) variants of the fragments, or a mixture of the bioactive (i.e. glucose transport promoting) fragments and variants.

The invention also relates to a comestible product comprising a bioactive (i.e. glucose transport promoting) peptide or fragment of the invention. Preferably the comestible product is man-made.

The invention also relates to a comestible product comprising a composition of peptides or fragments of the invention. Preferably the comestible product is man-made.

Preferably, the comestible product is a food product for human or animal or cellular consumption.

In one embodiment the man-made comestible product is a nutritional supplement. In one embodiment, the comestible product is a sports nutrition product, for example a beverage, snack or supplement. In one embodiment the man-made comestible product is a beverage. In one embodiment the man-made comestible product is a bakery product. In one embodiment the man-made comestible product is a dairy product. In one embodiment the man-made comestible product is a snack product. In one embodiment the man-made comestible product is a baked extruded food product. In one embodiment the man-made comestible product is powdered milk. In one embodiment the man-made comestible product is an infant formula product. In one embodiment the man-made comestible product is a confectionary product. In one embodiment the man-made comestible product is a yoghurt. In one embodiment the man-made comestible product is a yoghurt drink. In one embodiment the man-made comestible product is an ice cream product. In one embodiment the man-made comestible product is a frozen food product. In one embodiment the man-made comestible product is a breakfast cereal. In one embodiment the man-made comestible product is a bread. In one embodiment the man-made comestible product is a flavoured milk drink. In one embodiment the man-made comestible product is a confectionary bar. In one embodiment the man-made comestible product is a tea or tea product. In one embodiment the man-made comestible product is a based extruded snack product. In one embodiment the man-made comestible product is a fried snack product. In one embodiment the man-made comestible product is a nutritional supplement. In one embodiment the man-made comestible product is a sports nutritional product. In one embodiment the man-made comestible product is a baby food product. In one embodiment the man-made comestible product is a speciality food product for immunocompromised individuals. In one embodiment the man-made comestible product is a food for geriatric patients.

The invention also relates to a peptide of the invention for use in improving muscle status in a mammal.

The invention also relates to a composition of the invention for use in improving muscle status in a mammal.

The invention also relates to a peptide of the invention for use in promoting recovery of muscle, typically following exercise.

The invention also relates to a composition of the invention for use in promoting recovery of muscle, typically following exercise.

The invention also relates to a peptide of the invention for use in maintaining or restoring muscle health (for example lean tissue mass) in a mammal.

The invention also relates to a composition of peptides of the invention for use in maintaining or restoring muscle health (for example lean tissue mass) in a mammal.

The invention also relates to a peptide of the invention for use in enhancing physical performance.

The invention also relates to a composition of the invention for use in enhancing physical performance.

The invention also relates to a peptide of the invention for use in preventing or treating a metabolic disorder characterised by dysregulated glucose or insulin levels in a mammal. In one embodiment, the disorder is diabetes.

The invention also relates to a composition of the invention for use in preventing or treating a metabolic disorder characterised by dysregulated glucose or insulin levels in a mammal. In one embodiment, the disorder is diabetes.

The invention also relates to a peptide of the invention for use in improving glycaemic management in a mammal.

The invention also relates to a composition of the invention for use in improving glycaemic management in a mammal.

The invention also relates to a peptide of the invention for use in one or more of: reducing plasma glucose levels in mammals; regulating glucose homeostasis; and attenuating insulin resistance.

The invention also relates to a composition of the invention for use in one or more of: reducing plasma glucose levels in mammals; regulating glucose homeostasis; and attenuating insulin resistance.

The invention also relates to a peptide of the invention for use in treatment or prevention of a disease or condition characterised by lethargy or low energy levels.

The invention also relates to a composition of peptides of the invention for use in treatment or prevention of a disease or condition characterised by lethargy or low energy levels.

The invention also relates to a pharmaceutical composition comprising a peptide of the invention in combination with a pharmaceutically acceptable carrier. In one embodiment, the peptide is a glucose transport promoting peptide.

The invention also relates to a pharmaceutical composition comprising a composition of peptides of the invention in combination with a pharmaceutically acceptable carrier.

The invention also relates to a comestible product, for example a food product comprising a peptide or composition of the invention, for example a dairy or non-dairy product, a solid food or a beverage, a food additive or supplement. The dairy product may be a milk, a cheese, or yoghurt. In one embodiment, the food product is a sports nutritional product. The food product may comprise any amount of the composition of the invention, for example from 0.1% to 30% (w/w).

The peptides of the invention are used in the topical cosmetic or pharmaceutical composition of this invention at cosmetically or pharmaceutically effective concentrations to achieve the desired effect; in a preferred form with regards to the total weight of the composition, between 0.00000001% (in weight) and 20% (in weight); preferably between 0.000001% (in weight) and 15% (in weight), more preferably between 0.0001% (in weight) and 10% (in weight) and even more preferably between 0.0001% (in weight) and 5% (in weight). Ideally, the peptides of the present invention are preferably used from about 0.00001% w/w to about 0.5% w/w [0.1 to 5000 ppm], and more preferably from 0.00005 w/w to about 0.05 w/w [0.5 to 500 ppm], and most preferably from about 0.0001 w/w to about 0.01 w/w of the composition [1 to 100 ppm]. Ideally, the peptides of the present invention are preferably used from about 0.0001% w/w to about 0.004% w/w of the composition.

For compositions of peptides of the invention, a typical daily dosage may be 0.2 g to 100 g. However, when administered as a food for special medicinal purpose, or medical food, the daily dosage may be 50-500 g per day.

The dosage of compositions of the invention for use in food products and food supplements (i.e. comestible compositions) will be broadly in the 0.2-100 g/day range. In one embodiment, the daily dosage is 1-10 g/day, ideally about 3-8 g/day. In one embodiment, the daily dosage is 10-20 g/day. In one embodiment, the daily dosage is 20-30 g/day. In one embodiment, the daily dosage is 30-40 g/day. In one embodiment, the daily dosage is 10-100 g/day. In one embodiment, the daily dosage is about 5 g/day, ideally about 3-8 g/day. In one embodiment, the dosage is 2-1000 mg/day/kg body weight. In one embodiment, the dosage is 10-500 mg/day/kg body weight. In one embodiment, the dosage is 10-100 mg/day/kg body weight. In one embodiment, the dosage is 30-70 mg/day/kg body weight. The dosage of peptides of the invention for food supplements may be 0.00001 mg-0.01 mg per day or dose.

The food product may be a Food for Specific Medicinal Purposes (FSMP) which is defined as foods that are specifically formulated, processed and intended for the dietary management of diseases, disorders or medical conditions of individuals who are being treated under medical supervision. These foods are intended for the exclusive or partial feeding of people whose nutritional requirements cannot be met by normal foods.

The invention also provides topical composition comprising a peptide of the invention. It will be appreciated that the topical composition may comprise a plurality of peptides, fragments and/or variants. In one embodiment, the topical composition comprises substantially all the peptides. In one embodiment, the topical composition comprises substantially all the variants. The topical composition of the invention may be presented in a formulation selected from the group comprising creams, multiple emulsions, anhydrous compositions, aqueous dispersions, oils, milks, balsams, foams, lotions, gels, cream gels, hydro-alcoholic solutions, hydro-glycolic solutions, cosmetic, personal care product, hydrogels, liniments, sera, soaps, dusting powder, paste, semi solid formulations, liniments, serums, shampoo, conditioner, ointments, any rinse off formulation, talc, mousses, powders, sprays, aerosols, solutions, suspensions, emulsions, syrups, elixirs, polysaccharide films, patches, gel patches, bandages, an adhesive system, water-in-oil emulsions, oil-in-water emulsions, and silicone emulsions.

In an embodiment of the current invention, the emulsion contains a lipid or oil. The emulsion may be, but is not limited to, oil-in-water, water-in-oil, water-in-oil-in-water and oil-in-water-in-silicone emulsions. The emulsion may contain a humectant. The emulsion may contain an anti-foaming agent, such as silicone. The emulsion may have any suitable viscosity. Emulsions may further contain an emulsifier and/or an anti-foaming agent. Methods of preparing an emulsion are known to a person skilled in the art.

The topical composition of the invention may be incorporated into a medical device for administration. Such a device can include but is not limited to a fabric, patch, bandage, gauze, sock, tight, underwear, dressing, glove, mask, adhesive patches, non-adhesive patches, occlusive patches and microelectric patches or suitable adhesive system. In such an embodiment, the device is in direct contact with the keratinous layer such as the skin, thus releasing the peptides of the invention. It will be understood that the topical composition may be incorporated in any suitable form as detailed herein. For example, the topical composition or peptides of the invention can be incorporated into the device or be present on the surface of the device or can be in a cream, gel or wax formulation or any suitable formulation defined herein and incorporated into the device or on the surface of the device. The device may be adapted for adhesion or attachment to the skin.

In one embodiment the device is adapted to release a constant quantity of the composition or the peptides of the invention. It will be understood that the amount of the composition contained in the sustained release system will depend, for example, on where the composition is to be administered, the kinetics and duration of the release of the composition of the invention, as well as the nature of the condition, disorder and/or disease to be treated and/or cared for. The device may be such that the composition is released by biodegradation of the device, or by friction between the device and the body, due to bodily moisture, the skin's pH or body temperature.

In an embodiment of the invention the topical composition may further comprise at least one cosmetically or pharmaceutically acceptable excipient. Excipient may be used interchangeably with functional ingredient or additive. It will be understood that although the topical compositions of the current invention can be administered alone, they will generally be administered in admixture with a cosmetic or pharmaceutical excipient. Cosmetically or pharmaceutically acceptable excipient are well known in the art and any known excipient, may be used provided that it is suitable for topical administration and is dermatologically acceptable without undue toxicity, incompatibility and/or allergic reaction.

Preferably any excipient included is present in trace amounts. The amount of excipient included will depend on numerous factors, including the type of excipient used, the nature of the excipient, the component(s) of the topical composition, the amount of active or peptide in the topical composition and/or the intended use of the topical composition. The nature and amount of any excipient should not unacceptably alter the benefits of the peptides of this invention.

In an embodiment of the invention the excipient may be a suitable diluent, carrier, binder, lubricant, suspending agent, coating agent, preservative, stabilisers, dyes, vehicle, solubilising agent, base, emollient, emulsifying agent, fragrance, humectant, and/or surfactants.

Examples of suitable diluents include, but are not limited to, any diluent disclosed in disclosed in US2014120131 or US2004132667. Examples include ethanol, glycerol and water.

Examples of suitable carriers include, but are not limited to, lactose, starch, glucose, methyl cellulose, magnesium stearate, mannitol, sorbitol and any suitable carrier disclosed in US2014120131 or US2004132667.

Examples of suitable binders include, but are not limited to, starch, gelatin, natural sugars such as glucose, anhydrous lactose, free-flow lactose, beta-lactose, corn sweeteners, natural and synthetic gums, such as acacia, tragacanth or sodium alginate, carboxymethyl cellulose and polyethylene glycol and any suitable binder disclosed in US2014120131 or US2004132667.

Examples of suitable lubricants include, but are not limited to, sodium oleate, sodium stearate, magnesium stearate, sodium benzoate, sodium acetate, and sodium chloride and any suitable lubricant disclosed in US2014120131 or US2004132667.

The carrier may be any suitable carried known in the art or disclosed in US2014120131 or US2004132667. In some embodiments, the carrier may include, but is not limited to, a liquid, such as water, oils or surfactants, including those of petroleum, animal, plant or synthetic origin, polymer, oil, such as peanut oil, mineral oil, castor oil, soybean oil, alcohol, polysorbates, sorbitan esters, ether sulfates, sulfates, betaines, glycosides, maltosides, fatty alcohols, nonoxynols, poloxamers, polyoxyethylenes, polyethylene glycols, dextrose, glycerol, or digitonin. It will be understood that the carrier will be dermatologically acceptable. Preferred carriers contain an emulsion such as oil-in-water, water-in-oil, water-in-oil-in-water and oil-in-water-in-silicone emulsions. Emulsions may further contain an emulsifier and/or an anti-foaming agent.

In an embodiment of the invention, the topical composition may further comprise one or more additional ingredients. The topical composition of the invention may be administered consecutively, simultaneously or sequentially with the one or more other additional agents. Such additional ingredients may be those of benefit to include in a topical composition, or of benefit depending on the intended use of the topical composition. The additional ingredient may be active or functional or both.

Examples of such additional ingredients include, but are not limited to, one or more of cleaning agents, conditioning agents, sunscreen, pigment, moisturiser, thickening agents, gelling agents, essential oil, astringents, pigments, anti-caking agent, anti-foaming agent, binders, additives, buffers, chelating agents, external analgesics, film formers or materials, bulking agents, polymers, opacifying agents, pH adjusters, propellants, reducing agents, sequestrants, skin bleaching and lightening agents, skin conditioning agents, aloe vera, healing agents, soothing agents, smoothing agents, pantothenic acid, treating agents, thickeners, vitamins. colourants, pharmaceuticals, antiseptic agents, anti-foaming agents, buffering agents, astringents, polymers, pH adjuster, deodorant or any other dermatologically acceptable carrier or surfactant.

It is to be understood that additional ingredients listed may provide more than one benefit. The classification given herein is for clarity and convenience only and not intended to limit the additional ingredient to that particular application or category listed.

Any additional ingredients should be suitable for application to the skin without undue toxicity, incompatibility and/or allergic reaction.

In some embodiments, the additional ingredient has glucose transport activity or aids glucose transport activity. In some embodiments, the additional ingredient has anti-inflammatory activity or aids anti-inflammatory activity. In some embodiments, the additional ingredient has anti-aging activity or aids anti-aging activity. In some embodiments, the additional ingredient is for keratinous layer health and/or development, skin health and/or development, and/or muscle health, recovery and/or development. The active agent may be a pharmacological enhancer. Such active agents are known and available on the market. In such cases, the topical composition of the invention may be administered consecutively, simultaneously or sequentially with the one or more other active agents.

In some embodiments, the additional ingredient may be farnesol ([2E, 6E], −3, 7, 11,-trimethyl-2, 6, 10, dodecatrien-1-ol), phytantriol (3, 7, 11, 15, tetramethylhexadecane-1, 2, 3, -triol), desquamation actives, enzymes, enzyme inhibitors, enzyme activators, botanical extracts and marine extracts, anti-acne actives, anti-wrinkle or anti atrophy actives, anti-oxidant/radical scavengers, chelators, flavonoids, anti-inflammatory agents, anti-cellulite agents, topical anaesthetics, tanning actives, skin lightening agents, skin healing agents, bisabolol, antimicrobial or antifungal active, sunscreen actives, particulate material, conditioning agents, structuring agents, thickening agent, The desquamation active may be any suitable agent that enhances the skin appearance or texture of the skin and is as disclosed in US2014120131 or US2004132667.

Examples of anti-acne actives are as disclosed in US2014120131 or US2004132667 and include, resorcinol, salicylic acid, erythromycin, zine, sulfur, benzoyl peroxides.

Examples of thickening agents are as disclosed in US2014120131 or US2004132667 and include carboxylic acid polymers, crosslinked polyacrylate polymers, polyacrylamide polymers, polysaccharides.

Examples of conditioning agents are as disclosed in US2014120131 or US2004132667 and include humectants, moisturiser or skin conditioner.

Examples of structuring agents are as disclosed in US2014120131 or US2004132667 and include any agent that provide rheological characteristics to the composition and contributes to the stability of the composition.

Any suitable antimicrobial or antifungal active may be used and examples are as disclosed in US2014120131 or US2004132667. Such actives are capable of destroying microbes, preventing growth or action of microbes.

Examples include but are not limited to β-lactam drugs, quinolone drugs, tetracycline, erythromycin, streptomycin sulfate, salicylic acid, benzoyl peroxide.

Examples of a particulate material include metallic oxide.

Examples of anti-cellulite agents include xanthine agents.

Examples of tanning actives includes 1, 3-dihydroxy-2-propanone and those disclosed in US2014120131 or US2004132667. Examples of topical anaesthetics include benzocaine, lidocaine and bupivacaine and those disclosed in US2014120131 or US2004132667.

Examples of skin lightening agents include any agent known in the art such as kojic acid, ascorbic acid and those disclosed in US2014120131 or US2004132667.

Examples of sunscreen actives include any suitable organic or inorganic sunscreen active.

Examples include metallic oxides, 2-ethylhexyl-p-methoxycinnamate and those disclosed in US2014120131 or US2004132667.

Examples of skin healing agents includes panthenoic acid as disclosed in US2014120131 or US2004132667.

Examples of anti-inflammatory agents include any agent that enhances the skin appearance, tone or colour and include but are not limited to corticosteroids, hydrocortisone, non-steroidal agents such as ibuprofen and aspirin and those disclosed in US2014120131 or US2004132667.

Examples of flavonoids includes flavanones, methoxy flavonones, unsubstituted chalcone and mixtures thereof and those disclosed in US2014120131 or US2004132667.

Examples of enzymes include lipases, proteases, catalase, super oxide-dismutase, amylase, peroxidase, glucuronidase, ceramidases, hyaluronidases. Examples of enzyme inhibitors include trypsine inhibitors, Bowmann Birk inhibitors, chymotrypsin inhibitors, botanical extracts, flavonoids, quercetin chalcone and those disclosed in US2014120131 or US2004132667 and mixtures thereof. Examples of enzyme activators include coenzyme A, Q10 (ubiquinone), glycyrrhizin, berberine, chrysin and those disclosed in US2014120131 or US2004132667 and mixtures thereof Examples of anti-wrinkle or anti atrophy actives include sulfur containing D and L amino acids, particular, N-acyl derivatives such as N-acetyl-L-cysteine, hydroxyl acids, phytic acid, lipoic acid, lysophosphatidic acid, skin peel agents, vitamin B3, retinoids and those disclosed in US2014120131 or US2004132667 and mixtures thereof.

The anti-oxidant/radical scavenger agent may be any agent that is useful for providing protection against UV radiation or other environmental agents which may cause skin damage such as those disclosed in US2014120131 or US2004132667. Examples of anti-oxidant/radical scavengers include ascorbic acid, its salts and derivatives (vitamin C), tocopherol its salts and derivatives (vitamin E), butylated hydroxyl benzoic acids and their salts, peroxides, gallic acids and alkyl esters, sorbic acid, lipoic acid, amines, lycine pidolate, arginine pilolate, nordihydroguaiaretic acid, bioflavonoids, curcumin, lysine, methionine, proline, superoxide dismutase, silymarin, tea extracts and mixtures thereof.

Examples of chelators include EDTA, NTA, hydoxamic acids, phytic acid, lactoferrin and those disclosed in US2014120131 or US2004132667 and mixtures thereof. A chelator means an agent capable of removing a metal ion by forming a complex so that the metal ion cannot participate in or catalyse chemical reactions. A chelator is useful for protection against UV radiation or other environmental agents that can cause skin damage.

It will be appreciated that a plurality of additional ingredients may be added. The amount of the additional ingredient may be from about 0.001% to about 50% weight of the composition, preferably, about 0.01% to about 20%, preferably about 0.1% to about 10%, about 0.5% to about 10%, about 1% to about 5%, preferably 2% weight of the composition. The amount of additional ingredient included will depend on numerous factors, including the type of additional ingredient used, the nature of the additional ingredient, the component(s) of the topical composition, the amount of active or peptide in the topical composition and/or the intended use of the topical composition. The nature and amount of any additional ingredient should not unacceptably alter the benefits of the peptides of this invention.

The topical composition may be alcohol free.

In some embodiments of the invention, the composition further comprises one or more additional active agents, in addition to the peptide of the invention (also known as the active of the composition). In addition, or alternatively, the composition may be administered with one or more other additional active agents. Typical said additional active agent is present in trace amounts only. In some embodiments, there may be no additional active agent present in the composition. The amount of additional active agent included will depend on numerous factors, including the type of additional active agent used, the nature of the additional active agent, the component(s) of the topical composition, the amount of active or peptide in the topical composition and/or the intended use of the topical composition. The nature and amount of any additional active agent should not unacceptably alter the benefits of the peptides of this invention.

It is to be understood that an ingredient that is considered to be an "active" ingredient in one product may be a "functional" or "excipient" ingredient in another and vice versa. It will also be appreciated that some ingredients play a dual role as both an active ingredient and as a functional or excipient ingredient.

Examples of the additional active agents include glucose transport promoting drugs, skin supplement, agent for treatment and/or care of the skin, anti-inflammatory agent, an anti-aging agent, a cellular growth promoting agent and pharmacological enhancers. Such agents are well known in the art and it will be appreciated that any suitable additional active agent may be used. Additional active agents for treatment and/or care of the skin may include collagen synthesis agents, retinoids, exfoliating agents, anti-cellulite agents, elastase inhibiting agents, melanin synthesis stimulating or inhibiting agents, self-tanning agents, antiaging agents, antimicrobial agents, antifungal agents, fungistatic agents, bactericidal agents, and healing agents. Active agents also include anti-inflammatory agents.

Any additional active agent should be suitable for application to the skin without undue toxicity, incompatibility and/or allergic reaction.

It will be understood that the classification given herein is for clarity and convenience only and not intended to limit the additional ingredient, excipient, or active to that particular application or category listed.

In a particularly preferred embodiment, the methods and uses of the invention involve administration of a peptide or composition of the invention in combination with one or more other active agents, for example, existing growth promoting drugs or pharmacological enhancers available on the market. In such cases, the compounds of the invention may be administered consecutively, simultaneously or sequentially with the one or more other active agents.

The effect of the current invention is accomplished by topical application or administration of the topical composition of the invention described herein to a person, animal or a patient in need of treatment or care. Topical delivery preferably means delivery to a keratinous layer such as the skin, hair and/or nails, but can also mean delivery to a body lumen lined with epithelial cells, for example the lungs or airways, the gastrointestinal tract, the buccal cavity. The effect may be confined to the surface of the skin or may be within the skin or a combination of both.

The topical composition of the invention is administered in a cosmetically or pharmaceutically effective amount. In other words, in an amount that is non-toxic but sufficient amount to provide the desired effect. It will be appreciated that a person skilled in the art would be capable of determining an appropriate dose of the topical compositions of the invention to administer without undue experimentation. Alternatively, a physician will determine the actual dose that is most suitable for a patient depending on the particular condition, disease or disorder to be treated or cared for and the age, body weight and/or health of the person. It will depend on a variety of factors including the activity of the specific compound employed, the metabolic stability and length of action of that compound, the age, body weight, general health, sex, diet, mode and time of administration, rate of excretion, drug combination, the severity of the particular condition, and the individual undergoing therapy. There can, of course, be individual instances where higher or lower dosage ranges are merited, and such are within the scope of this invention. For example, the composition may be administered at a dose of from 0.01 to 50 mg/kg body weight, such as from 0.1 to 30 mg/kg, more preferably from 0.1 to 20 mg/kg body weight, more preferably from 0.1 to 10 mg/kg body weight, preferably 0.1 to 5 mg/kg body weight. In an exemplary embodiment, one or more doses of 10 to 300 mg/day or more preferably, 10 to 150 mg/day, will be administered to the patient. The amount and the frequency is as best suited to the purpose. The frequency of application or administration can vary greatly, depending on the needs of each subject, with a recommendation of an application or administration range from once a month to ten times a day, preferably from once a week to four times a day, more preferably from three times a week to three times a day, even more preferably once or twice a day.

In preferred embodiments, repeated use of the topical composition is provided.

The topical composition may be applied by, but not limited to, rubbing, or massaging into the keratinous tissue, skin or area of the body to be treated or cared for. In some embodiments, the composition is left on or not removed from the area of the body. In other embodiments, the composition is removed after a period of time, such as, but not limited to, from about 2 minutes to 60 minutes, from about 5 minutes to about 30 minutes, preferably from about 10 minutes to about 20 minutes. The composition may be removed immediately after application. In some embodiments of the current invention, the composition of the invention may be applied to an area to be treated by means to achieve a greater penetration of the composition and/or peptide of the invention, such as, but not limited to, iontophoresis, sonophoresis, electroporation, microelectric patches, mechanical pressure, osmotic pressure gradient, occlusive cure, microinjections or needle-free injections by means of pressure, such as injections by oxygen pressure, or any combination thereof.

The peptides of the invention are used in the topical cosmetic or pharmaceutical composition of this invention at cosmetically or pharmaceutically effective concentrations to achieve the desired effect; in a preferred form with regards to the total weight of the composition, between 0.00000001% (in weight) and 20% (in weight); preferably between 0.000001% (in weight) and 15% (in weight), more preferably between 0.0001% (in weight) and 10% (in weight) and even more preferably between 0.0001% (in weight) and 5% (in weight).

In some embodiments of the current invention, the composition may be delivered via any one of liposomes, mixed liposomes, oleosomes, niosomes, ethosomes, millicapsules, capsules, macrocapsules, nanocapsules, nanostructured lipid carriers, sponges, cyclodextrins, vesicles, micelles, mixed micelles of surfactants, surfactant-phospholipid mixed micelles, millispheres, spheres, liposphere, particles, nanospheres, nanoparticles, milliparticles, solid nanoparticles as well as microemulsions including water-in-oil microemulsions with an internal structure of reverse micelle and nanoemulsions microspheres, microparticles.

A variety of methods are available for preparing liposomes. See, e.g., Szoka et al., Ann. Rev. Biophys. Bioeng. 9:467 (1980), U.S. Pat. Nos. 4,186,183, 4,217,344, 4,235,871, 4,261,975, 4,485,054, 4,501,728, 4,774,085, 4,837,028, 4,235,871, 4,261,975, 4,485,054, 4,501,728, 4,774,085, 4,837,028, 4,946,787, PCT Publication No. WO 91/17424, Deamer & Bangham, Biochim. Biophys. Acta 443:629-634 (1976); Fraley, et al., PNAS 76:3348-3352 (1979); Hope et al., Biochim. Biophys. Acta 812:55-65 (1985); Mayer et al., Biochim. Biophys. Acta 858:161-168 (1986); Williams et al., PNAS 85:242-246 (1988); Liposomes (Ostro (ed.), 1983, Chapter 1); Hope et al., Chem. Phys. Lip. 40:89 (1986); Gregoriadis, Liposome Technology (1984) and Lasic, Liposomes: from Physics to Applications (1993)). Suitable methods include, for example, sonication, extrusion, high pressure/homogenization, microfluidization, detergent dialysis, calcium-induced fusion of small liposome vehicles and ether fusion methods, all of which are well known in the art.

These delivery systems may be adapted to achieve a greater penetration of the compound and/or peptides of the invention. This may improve pharmacokinetic and pharmacodynamics properties. The delivery system may be a sustained release system wherein the compound or peptide of the invention is gradually released during a period of time and preferably with a constant release rate over a period of time. The delivery systems are prepared by methods known in the art. The amount of peptide contained in the sustained release system will depend on where the composition is to be delivered and the duration of the release as well as the type of the condition, disease and/or disorder to be treated or cared for.

The topical composition of the invention may be for human or animal usage in human and veterinary medicine.

The topical composition of the invention may be used for pharmaceutical, personal care and/or cosmetic uses.

The composition can be used to treat or care for any disease, disorder or condition of the skin, including but not limited to, psoriasis, dermatitis, allergic dermatitis, eczema, spongiosis, edema, skin cancer, ulcers, acne, scars, cellulitis, elastosis, keratosis, rosacea, varicose veins, inflammatory disorders.

The topical composition may be used to for treating or caring for visible signs of aging including but not limited to wrinkles, stretch marks and dark circles, dryness, fine lines, age spots, red blotches, sagging skin, and conditions caused by sun exposure including sunburn, stress, pollution and/or diet. The topical composition may also be used for delaying, slowing or inhibiting the skins or the onset of aging. The composition may be administered by a medical device, such as a plaster or a patch as described herein.

The topical composition may be used to treat or care for a wound in a mammal. In another embodiment, the topical composition is for use in the treatment or prevention of a disease or condition characterised by damaged epithelial cells or tissue, and/or damaged dermal or epithelial cells or tissue. The disease may be but is not limited to cancer and trauma.

The topical composition may be used to treat or care for any muscle condition, to improve, muscle status in a mammal, to promote recovery of muscle, typically following exercise, to maintain or restore muscle health (for example lean tissue mass) in a mammal, to enhance physical performance, in treatment or prevention of a disease or condition characterised by lethargy or low energy levels.

The topical composition may be used to promote growth of a tissue, promote growth of epithelial tissue, promote growth of skin, promote growth of an organ, promote growth of an organism. The skin can have a normal pathology and/or an abnormal pathology.

The topical composition may also be used to treat or care for any inflammatory disorder.

A further aspect of the invention relates to a pharmaceutical composition comprising a peptide of the invention or a composition of peptides of the invention, admixed with one or more pharmaceutically acceptable diluents, excipients or carriers. Even though the peptides and compositions of the present invention can be administered alone, they will generally be administered in admixture with a pharmaceutical carrier, excipient or diluent, particularly for human therapy. The pharmaceutical compositions may be for human or animal usage in human and veterinary medicine. Examples of such suitable excipients for the various different forms of pharmaceutical compositions described herein may be found in the "Handbook of Pharmaceutical Excipients, 2nd Edition, (1994), Edited by A Wade and P J Weller. In particular, formulations for topical delivery are described in Topical drug delivery formulations edited by David Osborne and Antonio Aman, Taylor & Francis, the complete contents of which are incorporated herein by reference. Acceptable carriers or diluents for therapeutic use are well known in the pharmaceutical art, and are described, for example, in Remington's Pharmaceutical Sciences, Mack Publishing Co. (A. R. Gennaro edit. 1985). Examples of suitable carriers include lactose, starch, glucose, methyl cellulose, magnesium stearate, mannitol, sorbitol and the like. Examples of suitable diluents include ethanol, glycerol and water. The choice of pharmaceutical carrier, excipient or diluent can be selected with regard to the intended route of administration and standard pharmaceutical practice. The pharmaceutical compositions may comprise as, or in addition to, the carrier, excipient or diluent any suitable binder (s), lubricant(s), suspending agent(s), coating agent(s), solubilising agent(s). Examples of suitable binders include starch, gelatin, natural sugars such as glucose, anhydrous lactose, free-flow lactose, beta-lactose, corn sweeteners, natural and synthetic gums, such as acacia, tragacanth or sodium alginate, carboxymethyl cellulose and polyethylene glycol. Examples of suitable lubricants include sodium oleate, sodium stearate, magnesium stearate, sodium benzoate, sodium acetate, sodium chloride and the like. Preservatives, stabilizers, dyes and even flavouring agents may be provided in the pharmaceutical composition. Examples of preservatives include sodium benzoate, sorbic acid and esters of p hydroxybenzoic acid. Antioxidants and suspending agents may be also used.

The peptide or composition of the invention may be adapted for topical, oral, rectal, parenteral, intramuscular, intraperitoneal, intra-arterial, intrabronchial, subcutaneous, intradermal, intravenous, nasal, vaginal, buccal or sublingual routes of administration. For oral administration, particular use is made of compressed tablets, pills, tablets, gellules, drops, and capsules. Preferably, these compositions contain from 1 to 250 mg and more preferably from 10-100 mg, of active ingredient per dose. Other forms of administration comprise solutions or emulsions which may be injected intravenously, intra-arterial, subcutaneously, intradermally, intraperitoneally or intramuscularly, and which are prepared from sterile or sterilisable solutions. The pharmaceutical compositions of the present invention may also be in form of suppositories, vaginal rings, pessaries, suspensions, emulsions, lotions, ointments, creams, gels, sprays, solutions or dusting powders. The composition of the invention may be formulated for topical delivery. Topical delivery generally means delivery to the skin, but can also mean delivery to a body lumen lined with epithelial cells, for example the lungs or airways, the gastrointestinal tract, the buccal cavity. In particular, formulations for topical delivery are described in Topical drug delivery formulations edited by David Osborne and Antonio Aman, Taylor & Francis, the complete contents of which are incorporated herein by reference. Compositions or formulations for delivery to the airways are described in O'Riordan et al (Respir Care, 2002, November 47), EP2050437, WO2005023290, US2010098660, and US20070053845. Composition and formulations for delivering active agents to the iluem, especially the proximal iluem, include microparticles and microencapsulates where the active agent is encapsulated within a protecting matrix formed of polymer or dairy protein that is acid resistant but prone to dissolution in the more alkaline environment of the ileum. Examples of such delivery systems are described in EP1072600.2 and EP13171757.1. An alternative means of transdermal administration is by use of a skin patch. For example, the active ingredient can be incorporated into a cream consisting of an aqueous emulsion of polyethylene glycols or liquid paraffin. The active ingredient can also be incorporated, at a concentration of between 1 and 10% by weight, into an ointment consisting of a white wax or white soft paraffin base together with such stabilisers and preservatives as may be required.

Injectable forms may contain between 10-1000 mg, preferably between 10-250 mg, of active ingredient per dose.

Compositions may be formulated in unit dosage form, i.e., in the form of discrete portions containing a unit dose, or a multiple or sub-unit of a unit dose.

A person of ordinary skill in the art can easily determine an appropriate dose of one of the instant compositions to administer to a subject without undue experimentation. Typically, a physician will determine the actual dosage which will be most suitable for an individual patient and it will depend on a variety of factors including the activity of the specific compound employed, the metabolic stability and length of action of that compound, the age, body weight, general health, sex, diet, mode and time of administration, rate of excretion, drug combination, the severity of the particular condition, and the individual undergoing therapy. The dosages disclosed herein are exemplary of the average case. There can of course be individual instances where higher or lower dosage ranges are merited, and such are within the scope of this invention. Depending upon the need, the agent may be administered at a dose of from 0.01 to 30 mg/kg body weight, such as from 0.1 to 10 mg/kg, more preferably from 0.1 to 1 mg/kg body weight. In an exemplary embodiment, one or more doses of 10 to 300 mg/day or more preferably, 10 to 150 mg/day, will be administered to the patient for the treatment of an inflammatory disorder.

In a particularly preferred embodiment, the methods and uses of the invention involve administration of a peptide or composition of the invention in combination with one or more other active agents, for example, existing anti-inflammatory drugs or pharmacological enhancers available on the market. In such cases, the compounds of the invention may be administered consecutively, simultaneously or sequentially with the one or more other active agents.

In one embodiment of the invention, the peptide of the invention may be administered in the form of a conjugate comprising the peptide, and may optionally include a linker, and a partner molecule, for example a protein such as an antibody molecule intended to increase the half-life of the conjugate in-vivo. In one embodiment, the peptide may be modified to substitute one or more amino acids with amino acids employed to attach partner molecules. For example, an amino acid may be substituted with a lysine residue for the purpose of conjugating a partner molecule such as a PEG molecule.

Definitions

All publications, patents, patent applications and other references mentioned herein are hereby incorporated by reference in their entireties for all purposes as if each individual publication, patent or patent application were specifically and individually indicated to be incorporated by reference and the content thereof recited in full.

Where used herein and unless specifically indicated otherwise, the following terms are intended to have the following meanings in addition to any broader (or narrower) meanings the terms might enjoy in the art:

Unless otherwise required by context, the use herein of the singular is to be read to include the plural and vice versa. The term "a" or "an" used in relation to an entity is to be read to refer to one or more of that entity. As such, the terms "a" (or "an"), "one or more," and "at least one" are used interchangeably herein.

As used herein, the term "comprise," or variations thereof such as "comprises" or "comprising," are to be read to indicate the inclusion of any recited integer (e.g. a feature, element, characteristic, property, method/process step or limitation) or group of integers (e.g. features, element, characteristics, properties, method/process steps or limitations) but not the exclusion of any other integer or group of integers. Thus, as used herein the term "comprising" is inclusive or open-ended and does not exclude additional, unrecited integers or method/process steps.

As used herein, the term "disease" is used to define any abnormal condition that impairs physiological function and is associated with specific symptoms. The term is used broadly to encompass any disorder, illness, abnormality, pathology, sickness, condition or syndrome in which physiological function is impaired irrespective of the nature of the aetiology (or indeed whether the aetiological basis for the disease is established). It therefore encompasses conditions arising from infection, trauma, injury, surgery, radiological ablation, poisoning or nutritional deficiencies.

As used herein, the term "treatment" or "treating" refers to an intervention (e.g. the administration of an agent to a subject) which cures, ameliorates or lessens the symptoms of a disease or removes (or lessens the impact of) its cause(s) (for example, the reduction in accumulation of pathological levels of lysosomal enzymes). In this case, the term is used synonymously with the term "therapy".

Additionally, the terms "treatment" or "treating" refers to an intervention (e.g. the administration of an agent to a subject) which prevents or delays the onset or progression of a disease or reduces (or eradicates) its incidence within a treated population. In this case, the term treatment is used synonymously with the term "prophylaxis".

As used herein, an effective amount or a therapeutically effective amount of an agent defines an amount that can be administered to a subject without excessive toxicity, irritation, allergic response, or other problem or complication, commensurate with a reasonable benefit/risk ratio, but one that is sufficient to provide the desired effect, e.g. the treatment or prophylaxis manifested by a permanent or temporary improvement in the subject's condition. The amount will vary from subject to subject, depending on the age and general condition of the individual, mode of administration and other factors. Thus, while it is not possible to specify an exact effective amount, those skilled in the art will be able to determine an appropriate "effective" amount in any individual case using routine experimentation and background general knowledge. A therapeutic result in this context includes eradication or lessening of symptoms, reduced pain or discomfort, prolonged survival, improved mobility and other markers of clinical improvement. A therapeutic result need not be a complete cure.

The term "human or animal" should be understood to include humans, mammals and other non-mammalian animals such as fish. The human may be an infant, toddler, child, adolescent, adult, or elderly human. In one embodiment of the invention, the human is an elderly person, for example aged 55 or more. In one embodiment, the human is an elderly person experiencing deterioration of lean tissue mass. In one embodiment, the human is a sportsperson. In one embodiment, the human is pregnant woman. In one embodiment, the human is suffering from lethargy or perceived lack of energy.

The term "peptide" used herein refers to a polymer composed of 5 to 50 amino acid monomers typically via peptide bond linkage. Peptides (including fragments and variants thereof) of and for use in the invention may be generated wholly or partly by chemical synthesis or by expression from nucleic acid. For example, the peptides of and for use in the present invention can be readily prepared according to well-established, standard liquid or, preferably, solid-phase peptide synthesis methods known in the art (see, for example, J. M. Stewart and J. D. Young, Solid Phase Peptide Synthesis, 2nd edition, Pierce Chemical Company, Rockford, Illinois (1984), in M. Bodanzsky and A. Bodanzsky, The Practice of Peptide Synthesis, Springer Verlag, New York (1984). When necessary, any of the peptides employed in the invention can be chemically modified to increase their stability. A chemically modified peptide or a peptide analog includes any functional chemical equivalent of the peptide characterized by its increased stability and/or efficacy in vivo or in vitro in respect of the practice of the invention. The term peptide analog also refers to any amino acid derivative of a peptide as described herein. A peptide analog can be produced by procedures that include, but are not limited to, modifications to side chains, incorporation of unnatural amino acids and/or their derivatives during peptide synthesis and the use of cross-linkers and other methods that impose conformational constraint on the peptides or their analogs. Examples of side chain modifications include modification of amino groups, such as by reductive alkylation by reaction with an aldehyde followed by reduction with $NaBH_4$; amidation with methylacetimidate; acetylation with acetic anhydride; carbamylation of amino groups with cyanate; trinitrobenzylation of amino groups with 2, 4, 6, trinitrobenzene sulfonic acid (TNBS); alkylation of amino groups with succinic anhydride and tetrahydrophthalic anhydride; and pyridoxylation of lysine with pyridoxa-5'-phosphate followed by reduction with $NABH_4$. The guanidino group of arginine residues may be modified by the formation of heterocyclic condensation products with reagents such as 2,3-butanedione, phenylglyoxal and glyoxal. The carboxyl group may be modified by carbodiimide activation via o-acylisourea formation followed by subsequent derivatization, for example, to a corresponding amide. Sulfhydryl groups may be modified by methods, such as carboxymethylation with iodoacetic acid or iodoacetamide; performic acid oxidation to cysteic acid; formation of mixed disulphides with other thiol compounds; reaction with maleimide; maleic anhydride or other substituted maleimide; formation of mercurial derivatives using 4-chloromercuribenzoate, 4-chloromercuriphenylsulfonic acid, phenylmercury chloride, 2-chloromercuric-4-nitrophenol and other mercurials; carbamylation with cyanate at alkaline pH. Tryptophan residues may be modified by, for example, oxidation with N-bromosuccinimide or alkylation of the indole ring with 2-hydroxy-5-nitrobenzyl bromide or sulphonyl halides. Tryosine residues may be altered by nitration with tetranitromethane to form a 3-nitrotyrosine derivative. Modification of the imidazole ring of a histidine residue may be accomplished by alkylation with iodoacetic acid derivatives or N-carbethoxylation with diethylpyrocarbonate. Examples of incorporating unnatural amino acids and derivatives during peptide synthesis include, but are not limited to, use of norleucine, 4-amino butyric acid, 4-amino-3-hydroxy-5-phenylpentanoic acid, 6-aminohexanoic acid, t-butylglycine, norvaline, phenylglycine, ornithine, sarcosine, 4-amino-3-hydroxy-6-methylheptanoic acid, 2-thienyl alanine and/or D-isomers of amino acids. Peptide structure modification includes the generation of retro-inverso peptides comprising the reversed sequence encoded by D-amino acids.

"Modified peptide": In an embodiment of the invention the peptide is a modified peptide. The term modified peptide is used interchangeably with the term derivative of the peptide. The modified peptide includes a peptide which has been substituted with one or more groups as defined herein. The modification may be any modified that provides the peptides and or the composition of the invention with an increased ability to penetrate a cell. The modification may be any modification that increases the half-life of the composition or peptides of the invention. In one embodiment, the group is a protecting group. The protecting group may be an N-terminal protecting group, a C-terminal protecting group or a side-chain protecting group. The peptide may have one or more of these protecting groups. The person skilled in the art is aware of suitable techniques to react amino acids with these protecting groups. These groups can be added by preparation methods known in the art, for example the methods as outlined in paragraphs [0104] to [0107] of US2014120141. The groups may remain on the peptide or may be removed. The protecting group may be added during synthesis. In an embodiment of the invention the peptides may be substituted with a group selected from one or more straight chain or branched chain, long or short chain, saturated, or unsaturated, substituted with a hydroxyl, amino, amino acyl, sulfate or sulphide group or unsubstituted having from 1 to 29 carbon atoms. N-acyl derivatives include acyl groups derived from acetic acid, capric acid, lauric acid, myristic acid, octanoic acid, palmitic acid, stearic acid, behenic acid, linoleic acid, linolenic acid, lipoic acid, oleic acid, isosteric acid, elaidoic acid, 2-ethylhexaneic acid, coconut oil fatty acid, tallow fatty acid, hardened tallow fatty acid, palm kernel fatty acid, lanolin fatty acid or similar acids. These may be substituted or unsubstituted. When substituted they are preferably substituted with hydroxyl, or sulphur containing groups such as but not limited to $SO_3H$, SH, or S—S. In an embodiment of the current invention, the peptide is $R_1$—X—$R_2$. $R_1$ and/or $R_2$ groups respectively bound to the amino-terminal (N-terminal) and carboxyl-terminal (C-terminal) of the peptide sequence. In one embodiment, the peptide is $R_1$—X. Alternatively, the peptide is X—$R_2$. Preferably, $R_1$ is H, $C_{1-4}$ alkyl, acetyl, benzoyl or trifluoroacetyl. X is the peptide of the invention; $R_2$ is OH or $NH_2$. In an embodiment, $R_1$ is selected from the group formed by H, a non-cyclic substituted or unsubstituted aliphatic group, substituted or unsubstituted alicyclyl, substituted or unsubstituted heterocyclyl, substituted or unsubstituted heteroarylalkyl, substituted or unsubstituted aryl, substituted or unsubstituted aralkyl, Tert-butyloxycarbonyl, 9-fluorenylmethyloxycarbonyl (Fmoc) and $R_5$—CO—, wherein $R_5$ is selected from the group formed by H, a non-cyclic substituted or unsubstituted aliphatic group, substituted or unsubstituted alicyclyl, substituted or unsubstituted aryl, substituted or unsubstituted aralkyl, substituted or unsubstituted heterocyclyl and substituted or unsubstituted heteroarylalkyl; $R_2$ is selected from the group formed by —$NR_3R_4$, —$OR_3$ and —$SR_3$, wherein $R_3$ and $R_4$ are independently selected from the group formed by H, a non-cyclic substituted or unsubstituted aliphatic group, substituted or unsubstituted alicyclyl, substituted or unsubstituted heterocyclyl, substituted or unsubstituted heteroarylalkyl, substituted or unsubstituted aryl, and substituted or unsubstituted aralkyl; and with the condition that $R_1$ and $R_2$ are not α-amino acids. In accordance with another preferred embodiment, $R_2$ is —$NR_3R_4$, —$OR_3$ or —$SR_3$ wherein $R_3$ and $R_4$ are independently selected from the group formed by H, substituted or unsubstituted $C_1$-$C_{24}$ alkyl, substituted or unsubstituted $C_2$-$C_{24}$ alkenyl, Tert-butyloxycarbonyl, 9-fluorenylmethyloxycarbonyl (Fmoc), substituted or unsubstituted $C_2$-$C_{24}$ alkynyl, substituted or unsubstituted $C_3$-$C_{24}$ cycloalkyl, substituted or unsubstituted $C_5$-$C_{24}$ cycloalkenyl, substituted or unsubstituted $C_8$-$C_{24}$ cycloalkynyl, substituted or unsubstituted $C_6$-$C_{30}$ aryl, substituted or unsubstituted $C_7$-$C_{24}$ aralkyl, substituted or unsubstituted heterocyclyl ring of 3-10 members, and substituted or unsubstituted heteroarylalkyl of 2 to 24 carbon atoms and 1 to 3 atoms other than carbon wherein the alkyl chain is of 1 to 6 carbon atoms. Optionally, $R_3$ and $R_4$ can be bound by a saturated or unsaturated carbon-carbon bond, forming a cycle with the nitrogen atom. More preferably $R_2$ is —$NR_3R_4$ or —$OR_3$, wherein $R_3$ and $R_4$ are independently selected from the group formed by H, substituted or unsubstituted $C_1$-$C_{24}$ alkyl, substituted or unsubstituted $C_2$-$C_{24}$ alkenyl, substituted or unsubstituted $C_2$-$C_{24}$ alkynyl, substituted or unsubstituted $C_3$-$C_{10}$ cycloalkyl, substituted or unsubstituted $C_6$-$C_{15}$ aryl and substituted or unsubstituted heterocyclyl of 3-10 members, substituted or unsubstituted heteroarylalkyl with a ring of 3 to 10 members and an alkyl chain of 1 to 6 carbon atoms. More preferably $R_3$ and $R_4$ are selected from the group formed by H, methyl, ethyl, hexyl, dodecyl, or hexadecyl. Even more preferably $R_3$ is H and $R_4$ is selected from the group formed by H, methyl, ethyl, hexyl, dodecyl, or hexadecyl. In accordance with an even more preferred embodiment, $R_2$ is selected from —OH and —$NH_2$. In accordance with another embodiment of this invention $R_1$ is selected from the group formed by H, acetyl, lauroyl, myristoyl or palmitoyl, and $R_2$ is —$NR_3R_4$ or —$OR_3$ wherein $R_3$ and $R_4$ are independently selected from H, methyl, ethyl, hexyl, dodecyl and hexadecyl, preferably $R_2$ is —OH or —$NH_2$. More preferably, $R_1$ is acetyl or palmitoyl and $R_2$ is —$NH_2$. In a preferred embodiment, the acyl group is bound to the N-terminal end of at least one amino acid of the peptide. In an embodiment of the invention, the peptide is modified to comprise a side chain protecting group. The side chain protecting group may be one or more of the group comprising benzyl or benzyl based groups, t-butyl-based groups, benzyloxy-carbonyl (Z) group, and allyloxycarbonyl (alloc) protecting group. The side chain protecting group may be derived from an achiral amino acid such as achiral glycine. The use of an achiral amino acid helps to stabilise the resultant peptide and also facilitate the facile synthesis route of the present invention. Preferably, the peptide further comprises a modified C-terminus, preferably an amidated C-terminus. The achiral residue may be alpha-aminoisobutyric acid (methylalaine). It will be appreciated that the specific side chain protecting groups used will depend on the sequence of the peptide and the type of N-terminal protecting group used.

"Conjugate": In one embodiment of the invention the peptide is conjugated, linked or fused to a binding partner, for example one or more polyethylene glycol polymers or other compounds, such as molecular weight increasing compounds or lipophilic groups. The molecular weight increasing compound is any compound that will increase the molecular weight, typically by 10% to 90%, or 20% to 50% of the resulting conjugate and may have a molecular weight of between 200 and 20,000, preferably between 500 and 10,000. The molecular weight increasing compound may be PEG, any water-soluble (amphiphilic or hydrophilic) polymer moiety, homo or co-polymers of PEG, a monomethyl-substituted polymer of PEG (mPEG) and polyoxyethylene glycerol (POG), polyamino acids such as poly-lysine, poly-glutamic acid, poly-aspartic acid, particular those of L conformation, pharmacologically inactive proteins such as albumin, gelatin, a fatty acid, olysaccharide, a lipid amino acid and dextran. The polymer moiety may be straight chained or branched and it may have a molecular weight of 500 to 40000 Da, 5000 to 10000 Da, 10000 to 5000, Da. The compound (binding partner) may be any suitable cell penetrating compound, such as tat peptide, penetratin, pep-1. The compound (binding partner) may be an antibody molecule. The compound (binding partner) may be a lipophilic moiety or a polymeric moiety. The lipophilic substituent and polymeric substituents are known in the art. The lipophilic substituent includes an acyl group, a sulphonyl group, an N atom, an O atom or an S atom which forms part of the ester, sulphonyl ester, thioester, amide or sulphonamide. The lipophilic moiety may include a hydrocarbon chain having 4 to 30 C atoms, preferably between 8 and 12 C atoms. It may be linear or branched, saturated or unsaturated. The hydrocarbon chain may be further substituted. It may be cycloalkane or heterocycloalkane. The peptide may be modified at the N-terminal, C-terminal or both. The polymer or compound (binding partner) is preferably linked to an amino, carboxyl or thio group and may be linked by N-termini or C-termini of side chains of any amino acid residue. The polymer or compound (binding partner) may be conjugated to the side chain of any suitable residue. The polymer or compound (binding partner) may be conjugated via a spacer. The spacer may be a natural or unnatural amino acid, succinic acid, lysyl, glutamyl, asparagyl, glycyl, beta-alanyl, gamma-amino butanoyl. The polymer or compound (binding partner) may be conjugated via an ester, a sulphonyl ester, a thioester, an amide, a carbamate, a urea, a sulphonamide. A person skilled in the art is aware of suitable means to prepare the described conjugate.

The term "natural" as applied to a bioactive (i.e. glucose transport promoting) peptide means a peptide that includes (a) a bioactive (i.e. glucose transport promoting) fragment of a plant protein, typically rice or pea protein, or variants of pea protein including lentil, sweet pea, or chick pea or variants of rice protein including oat, grass, corn, wild rice and bananas, or (b) a bioactive (i.e. glucose transport promoting) variant of the fragment of a plant protein, for example a bioactive (i.e. glucose transport promoting) fragment of a homolog of the plant protein. The peptides or fragments of the invention may be isolated from plant protein or made synthetically using methods known to a person skilled in the art and described herein.

"C-terminal domain" as applied to a fragment means the first three amino acids at the c-terminus of the fragment.

"N-terminal domain" as applied to a fragment means the last three amino acids at the n-terminus of the fragment.

"Bioactive" as applied to a peptide or fragment means having a biological activity when administered to a mammal. The biological activity may be a health promoting activity. Examples of biological activities include glucose transport promoting, anti-bacterial, anti-inflammatory, or cellular growth or proliferation promoting. In one embodiment, the term "bioactive" means glucose transport promoting.

"Glucose transport promoting" or "glucose transport promoting activity" as applied to a peptide or fragment means a peptide or fragment that is capable of increasing GLUT4 translocation into skeletal muscle compared with an untreated control when employed at a concentration of 2 µM in the in-vitro assay described below. Preferably the peptide or fragment is capable of increasing GLUT4 translocation compared with an untreated control by at least 50% (i.e a relative unit increase in GLUT4 translocation of 1% to 1.5%).

"Antibacterial" or "antibacterial activity" as applied to a peptide or fragment means a peptide or fragment that is capable of visibly inhibiting the growth of a bacteria in the following agar-plate based growth inhibition assay: Peptide stock=5 mg/mL dissolved in DMSO. Bacterial inoculums were adjusted to McFarland 0.5 standard and MHA plates swabbed. Blank disks were placed in the plates and 10 µL of each compound (at 64 µg/mL—maximum concentration tested) added. Plates were incubated at 37° C. for 16-18 hours. Appropriate controls (DMSO; Mueller-Hinton media alone; and two antibiotic discs—ciprofloxacin and tetracycline) were also performed.

"Anti-inflammatory" as applied to a peptide or fragment means a peptide or fragment that is capable of significantly reducing the secretion of TNFα by LPS-stimulated J774.2 macrophages (compared with untreated LPS-stimulated J774.2 macrophages) when the macrophages are treated with 100 µM of the peptide or fragment. J774.2 macrophages were treated with 100 µM of synthetic peptide for 24 hours and then stimulated with (A) LPS (10 ng/ml) for five hours or (B) LPS (10 ng/ml) for 5 hours followed by ATP (5 mM) for one hour. Supernatant was collected and levels of TNFα were determined by ELISA.

"Cellular growth or proliferation promoting" as applied to a peptide or fragment means a peptide or fragment that is capable of increasing elastin production or cellular proliferation of human skin treated with a 20 µM solution of peptide or fragment in the following assay. Skin explants were prepared from abdominal plastic surgery. Some explants were delipidated with alcohol to obtain a dehydrated skin. These explants were maintained in maintenance medium supplied by the provider Biopredic International for 5 days. Test items are applied twice per day with 5 µL per explant. At the end of the test, viabilities controls are realized with the MTT on two explants, the third explant is fixed in the formaldehyde 4% for histology and cell staining. For each time of analysis (D1 and D5), histologies on delipidated explants, treated explants with test items, the DMSO 0.3% control and water control, are performed.

After receipt in the laboratory, each skin explant in the maintenance medium is delipidated with 5 µL alcohol during 3 hours. After 3 hours, all skin explants are treated two per day with test items, and they are incubated at 37° C.+/−2° C., 5% CO2 for 1 day or 5 days. Integrity of the system is realized at day 1 and day 5 with a viability control with MTT. Histology is realized by the laboratory Gredeco and the immunostaining to elastin and Ki67 are realized by the same laboratory. Immunostaining to filaggrin is realized by the laboratory Intertek. The detection of elastin (rabbit monoclonal antibody, clone P15502, LSBio) is performed using an immunoperoxidase technique two layers (ABC kit, Vector Laboratories) and revealed by AEC (3-amino-9-ethylcarbazole). The immunohistochemical staining intensity in the elastic fibers is evaluated using a semi-quantitative histological score. Epithelial proliferation was analyzed by immunohistochemistry using anti-Ki67 antibody. Immunodetection was performed using an indirect immunoperoxidase technique three layers, amplified (DAKO kit) and revealed by AEC (3-Amino-9-ethylcarbazole). Counting the number of labeled cells (keratinocytes of the basal layer of the epidermis) is performed and provides the total number of basal cells to calculate the % of labeled cells. The specific staining of filaggrin is performed with an immunoperoxidase staining (ABC kit, Fisher). The intensity of immunohistochemical marker in the epidermis is evaluated relative to the negative control of the solvent (Water or DMSO 0.3%).

"Enriched in peptides having a molecular weight of less than 10 KD" as applied to a composition of the invention means that the dry weight % of peptides in the composition having a molecular weight of less than 10 KD is greater than the dry weight % of polypeptide/protein in the composition having a molecular weight of 10 KD or greater.

"Homolog" of a reference protein should be understood to mean a protein from a different species of plant having at least 60%, 70%, 80%, 90%, 91%, 92%, 93%, 94%, 95%, 96%, 97%, 98%, 99% sequence homology with the reference protein. Thus, for example, homologs of pea protein P13918 include:

>gi|137584|sp|P08438.1|VCL_VICFA RecName: Full=Vicilin; Flags: Precursor [*Vicia faba*]

>gi=22057|emb|CAA68559.1|vicilin [*Vicia faba* var. *minor*] >gi|383931031|gb|AFH56916.1|vicilin [*Vicia faba*]

>gi|502105533|ref|XP_004492829.1|PREDICTED: vicilin-like isoform X1 [*Cicer arietinum*] ChickPea >gi|29539109|emb|CAD87730.1|allergen Len c 1.0101 [*Lens culinaris*] Lentil A "variant" of a bioactive (i.e. glucose transport promoting) fragment shall be taken to mean a fragment having an amino acid sequence that is substantially identical to the reference bioactive (i.e. glucose transport promoting) fragment, and which has the relevant bioactivity (i.e. glucose transport promoting activity) as defined above. Thus, for example, the term should be taken to include fragments that are altered in respect of one or more amino acid residues. Preferably such alterations involve the insertion, addition, deletion and/or substitution of 5 or fewer amino acids, more preferably of 4 or fewer, even more preferably of 3 or fewer, most preferably of 1 or 2 amino acids only. Insertion, addition and substitution with natural and modified amino acids is envisaged. The variant may have conservative amino acid changes, wherein the amino acid being introduced is similar structurally, chemically, or functionally to that being substituted. In one embodiment, one or more L-amino acids are replaced with D-amino acids. Generally, the variant will have at least 70% amino acid sequence homology, preferably at least 80% sequence homology, more preferably at least 90% sequence homology, and ideally at least 95%, 96%, 97%, 98% or 99% sequence homology with the reference glucose transport promoting fragment. In this specification, the term "sequence identity" should be understand to comprise both sequence identity and similarity, i.e. a variant (or homolog) that shares 70% sequence identity with a reference sequence is one in which any 70% of aligned residues of the variant (or homolog) are identical to or conservative substitutions of the corresponding residues in the reference sequence across the entire length of the sequence. Sequence identity is the amount of characters which match exactly between two different sequences. Hereby, gaps are not counted and the measurement is relational to the shorter of the two sequences. In terms of "sequence homology", the term should be understood to mean that a variant (or homolog) which shares a defined percent similarity or identity with a reference sequence when the percentage of aligned residues of the variant (or homolog) are either identical to, or conservative substitutions of, the corresponding residues in the reference sequence and where the variant (or homolog) shares the same function as the reference sequence. This alignment and the percent homology or sequence identity can be determined using software programs known in the art, for example, one alignment program is BLAST, using default parameters. Details of these programs can be found at the following Internet address: <www.ncbi.nlm.nih.gov/blast/Blast.cgi>.

Variants of SEQ ID NO: 7 including variants having 1, 2 or 3 conservative amino acid substitutions, 1, 2 to 3 non-conservative amino acid substitutions, 1-2 amino acid additions, 1, 2 or 3 amino acid deletions, are provided below:

```
One conservative amino acid substitution:
                                     (SEQ ID NO: 85)
ILDLAIPVNRPGQL;

(SEQ ID NO: 86)
VLELAIPVNRPGQL;

(SEQ ID NO: 87)
VLDLAVPVNRPGQL;

(SEQ ID NO: 88)
VLDLAIPINRPGQL;

(SEQ ID NO: 89)
VLDLAIPVNKPGQL;

(SEQ ID NO: 90)
VLDLAIPVEKPGQL;

(SEQ ID NO: 91)
VLDLAIPVNKPGEL
```

```
Two conservative amino acid substitutions:
                                     (SEQ ID NO: 92)
ILELAIPVNRPGQL;

(SEQ ID NO: 93)
ILDLAVPVNRPGQL;

(SEQ ID NO: 94)
VLELAVPVNRPGQL;

(SEQ ID NO: 95)
VLELAIPVNKPGQL;

(SEQ ID NO: 96)
ILDLAIPVNKPGQL;

(SEQ ID NO: 97)
VLDLAVPVNKPGQL;

(SEQ ID NO: 98)
VLDLAIPVEKPGEL;

(SEQ ID NO: 99)
ILDLAIPVNKPGEL;

(SEQ ID NO: 100)
VLELAIPVEKPGQL.

Three conservative amino acid substitutions:
                                     (SEQ ID NO: 101)
ILELAVPVNRPGQL;

(SEQ ID NO: 102)
ILELAIPVNKPGQL;

(SEQ ID NO: 103)
VLELAVPVNKPGQL;

(SEQ ID NO: 104)
ILELAIPVNRPGEL;

(SEQ ID NO: 105)
ILDLAIPVNKPGEL;

(SEQ ID NO: 106)
VLDLAVPVEKPGQL;

(SEQ ID NO: 107)
VLDLAVPVERPGEL;

(SEQ ID NO: 108)
VLELAIPVERPGEL.

One non-conservative amino acid substitution
                                     (SEQ ID NO: 109)
KLDLAIIVNRPGQL;

(SEQ ID NO: 110)
VLDLAIPVNRPGQK;

(SEQ ID NO: 111)
VLDLAIPVNRPGQL;

(SEQ ID NO: 112)
VLDLAIPVNRPGQL;

(SEQ ID NO: 113)
VLDLAIPVNRPCQL;

(SEQ ID NO: 114)
VLDLWIPVNRPGQL;

(SEQ ID NO: 115)
VLDLAIPVNRPGQL;

(SEQ ID NO: 116)
VLYLAIPVNRPGQL.

Two non-conservative amino acid substitution
                                     (SEQ ID NO: 117)
VLDLYIPVGRPGQL;
```

```
                                                 (SEQ ID NO: 118)
VKDLAIPWNRPGQL;

(SEQ ID NO: 119)
VLDLAIPVNRPCCL;

(SEQ ID NO: 120)
VLDLAGGVNRPGQL;

(SEQ ID NO: 121)
VLDLAIPKNEPGQL;

(SEQ ID NO: 122)
PLDLAIPVNDPGQL;

(SEQ ID NO: 123)
VLDLAIPVNRPIQL;

(SEQ ID NO: 124)
VLDHAIPVNRPGQL

Three non-conservative amino acid substitution
                                                 (SEQ ID NO: 125)
VLDLAIPVNRPGGG;

(SEQ ID NO: 126)
VLDLHIPGNEPGQL;

(SEQ ID NO: 127)
VYKLAIPVNEPGQL;

(SEQ ID NO: 128)
VLDLAIPVNRPYPG;

(SEQ ID NO: 129)
VLDYAIPKNDPGQL;

(SEQ ID NO: 130)
VLDLAIPVNRPGQL;

(SEQ ID NO: 131)
RRRLAIPVNRPGQL;

(SEQ ID NO: 132)
VLDLAIGVNRGPQL

One or two amino acid additions
                                                 (SEQ ID NO: 133)
VLDLAIPVNRPGFQL;

(SEQ ID NO: 134)
VLDLADIPVNRPGQL;

(SEQ ID NO: 135)
VLDLAIPVGNRPGQL;

(SEQ ID NO: 136)
VLQQDLAIPVNRPGQL;

(SEQ ID NO: 137)
VLDLAIPVNRGPGQKL;

(SEQ ID NO: 138)
VLDGLPLAIPVNRPGQL;

(SEQ ID NO: 139)
VLDLAIPVNRPGQLLL;

(SEQ ID NO: 140)
VLDLFLGAIPVNRPGQL

One, two or three amino acid deletions
                                                 (SEQ ID NO: 141)
VLDLAIPVNRGQL;

(SEQ ID NO: 142)
VLDLAPVNRPGQL;

(SEQ ID NO: 143)
LDLAIPVNRPGQL;

(SEQ ID NO: 144)
VLDLAIPVNRPGQ;

(SEQ ID NO: 145)
DLAIPVNRPGQL;

(SEQ ID NO: 146)
VLDLAIPVNRPG;

(SEQ ID NO: 147)
VLDLAINRPGQL;

(SEQ ID NO: 148)
VLDAIVNPGQL
```

Variants of SEQ ID NO: 8 include SEQ ID NO: 7 (three deletions), SEQ ID NO: 14 (one amino acid deletion), and SEQ ID NO: 15 (one addition). Variants of SEQ ID NO: 9 include SEQ ID NO: 13 (one addition) and SEQ ID NO: 11 (three amino acid additions). Variants of SEQ ID NO: 10 include SEQ ID NO: 158 and SEQ ID NO: 161. Variants of SEQ ID NO: 11 include SEQ ID NO: 9 and SEQ ID NO: 13. Variants of SEQ ID NO: 12 include SEQ ID NO: 8 and SEQ ID NO: 16. Variants of SEQ ID NO: 13 include SEQ ID NO: 9 and SEQ ID NO: 11. Variants of SEQ ID NO: 14 include SEQ ID NO: 10 and SEQ ID NO: 15. Variants of SEQ ID NO: 15 include SEQ ID NO: 7, SEQ ID NO: 8, SEQ ID NO: 12 and SEQ ID NO: 14. Variants of SEQ ID NO: 16 include SEQ ID NO: 12. Variants of SEQ ID NO: 17 include SEQ ID NO: 12 and SEQ ID NO: 13. Variants of SEQ ID NO: 18 include SEQ ID NO: 19. Variants of SEQ ID NO: 19 include SEQ ID NO: 18.

The term "variant" should also be taken to include fragments of peptides of the invention. Typically the fragment has between 8 and 23 contiguous amino acids in length. Generally, the fragment has a charge of −5 to +3. Suitably, the fragment comprises a c-terminal amino acid that is not C, I, K, M, P, T or W. Suitably, the fragment has an n-terminal amino acid that typcially is not C, D, H, M, P, T, V, W. The charge of a peptide, fragment or region is determined using the method of Cameselle, J. C., Ribeiro, J. M., and Sillero, A. (1986). Derivation and use of a formula to calculate the net charge of acid-base compounds. Its application to amino acids, proteins and nucleotides. Biochem. Educ. 14, 131-136.

A fragment of a peptide of the invention" or "peptide fragment" may have at least 3, 4, 5, 6, 7, 8, 9, 10, 11, 12, 13, 14, 15, 16, 17, 18, 19, 20, 21 or 22 amino acids and typically has a bioactivity, for example anti-inflammatory activity, anti-ageing activity, glucose transport promoting activity, or anti-bacterial activity. In one embodiment, the fragment consists of at least 30%, 40%, 50%, 60%, 70%, 80%, or 90% of the reference sequence. Examples of fragments of the invention are provided below:

```
                                                 (SEQ ID NO: 149)
VLDLAIPVNRPGQ;

(SEQ ID NO: 150)
VLDLAIPVNRPG;

(SEQ ID NO: 151)
VLDLAIPVNRP;

(SEQ ID NO: 152)
LDLAIPVNRPGQL;

(SEQ ID NO: 153)
DLAIPVNRPGQL;
```

```
                        (SEQ ID NO: 154)
LAIPVNRPGQL;

(SEQ ID NO: 155)
LDLAIPVNRPGQ;

(SEQ ID NO: 156)
DLAIPVNRPG;

(SEQ ID NO: 157)
LAIPVNRP;

(SEQ ID NO: 158)
VLDLAIPVN;

(SEQ ID NO: 159)
AIPVNRPGQL;

(SEQ ID NO: 160)
VNRPGQL;

(SEQ ID NO: 161)
VLDLAIPV,
and (SEQ ID NO: 10)
VLDLAIPVNR.
```

"Pharmaceutical compositions": A further aspect of the invention relates to a pharmaceutical composition comprising a peptide of the invention or a composition of peptides of the invention, admixed with one or more pharmaceutically acceptable diluents, excipients or carriers. Even though the peptides and compositions of the present invention can be administered alone, they will generally be administered in admixture with a pharmaceutical carrier, excipient or diluent, particularly for human therapy. The pharmaceutical compositions may be for human or animal usage in human and veterinary medicine. Examples of such suitable excipients for the various different forms of pharmaceutical compositions described herein may be found in the "Handbook of Pharmaceutical Excipients, $2^{nd}$ Edition, (1994), Edited by A Wade and PJ Weller. In particular, formulations for topical delivery are described in Topical drug delivery formulations edited by David Osborne and Antonio Aman, Taylor & Francis, the complete contents of which are incorporated herein by reference. Acceptable carriers or diluents for therapeutic use are well known in the pharmaceutical art, and are described, for example, in Remington's Pharmaceutical Sciences, Mack Publishing Co. (A. R. Gennaro edit. 1985). Examples of suitable carriers include lactose, starch, glucose, methyl cellulose, magnesium stearate, mannitol, sorbitol and the like. Examples of suitable diluents include ethanol, glycerol and water. The choice of pharmaceutical carrier, excipient or diluent can be selected with regard to the intended route of administration and standard pharmaceutical practice. The pharmaceutical compositions may comprise as, or in addition to, the carrier, excipient or diluent any suitable binder(s), lubricant(s), suspending agent(s), coating agent(s), solubilising agent(s). Examples of suitable binders include starch, gelatin, natural sugars such as glucose, anhydrous lactose, free-flow lactose, beta-lactose, corn sweeteners, natural and synthetic gums, such as acacia, tragacanth or sodium alginate, carboxymethyl cellulose and polyethylene glycol. Examples of suitable lubricants include sodium oleate, sodium stearate, magnesium stearate, sodium benzoate, sodium acetate, sodium chloride and the like. Preservatives, stabilizers, dyes and even flavouring agents may be provided in the pharmaceutical composition. Examples of preservatives include sodium benzoate, sorbic acid and esters of p-hydroxybenzoic acid. Antioxidants and suspending agents may be also used.

The peptide or composition of the invention may be adapted for topical, oral, rectal, parenteral, intramuscular, intraperitoneal, intra-arterial, intrabronchial, subcutaneous, intradermal, intravenous, nasal, vaginal, buccal or sublingual routes of administration. For oral administration, particular use is made of compressed tablets, pills, tablets, gellules, drops, and capsules. Preferably, these compositions contain from 1 to 250 mg and more preferably from 10-100 mg, of active ingredient per dose. Other forms of administration comprise solutions or emulsions which may be injected intravenously, intra-arterial, subcutaneously, intradermally, intraperitoneally or intramuscularly, and which are prepared from sterile or sterilisable solutions. The pharmaceutical compositions of the present invention may also be in form of suppositories, vaginal rings, pessaries, suspensions, emulsions, lotions, ointments, creams, gels, sprays, solutions or dusting powders. The composition of the invention may be formulated for topical delivery. Topical delivery generally means delivery to the skin, but can also mean delivery to a body lumen lined with epithelial cells, for example the lungs or airways, the gastrointestinal tract, the buccal cavity. In particular, formulations for topical delivery are described in Topical drug delivery formulations edited by David Osborne and Antonio Aman, Taylor & Francis, the complete contents of which are incorporated herein by reference. Compositions or formulations for delivery to the airways are described in O'Riordan et al (Respir Care, 2002, November 47), EP2050437, WO2005023290, US2010098660, and US20070053845. Composition and formulations for delivering active agents to the iluem, especially the proximal iluem, include microparticles and microencapsulates where the active agent is encapsulated within a protecting matrix formed of polymer or dairy protein that is acid resistant but prone to dissolution in the more alkaline environment of the ileum. Examples of such delivery systems are described in EP1072600.2 and EP13171757.1. An alternative means of transdermal administration is by use of a skin patch. For example, the active ingredient can be incorporated into a cream consisting of an aqueous emulsion of polyethylene glycols or liquid paraffin. The active ingredient can also be incorporated, at a concentration of between 1 and 10% by weight, into an ointment consisting of a white wax or white soft paraffin base together with such stabilisers and preservatives as may be required.

Injectable forms may contain between 10-1000 mg, preferably between 10-250 mg, of active ingredient per dose.

Compositions may be formulated in unit dosage form, i.e., in the form of discrete portions containing a unit dose, or a multiple or sub-unit of a unit dose.

A person of ordinary skill in the art can easily determine an appropriate dose of one of the instant compositions to administer to a subject without undue experimentation. Typically, a physician will determine the actual dosage which will be most suitable for an individual patient and it will depend on a variety of factors including the activity of the specific compound employed, the metabolic stability and length of action of that compound, the age, body weight, general health, sex, diet, mode and time of administration, rate of excretion, drug combination, the severity of the particular condition, and the individual undergoing therapy. The dosages disclosed herein are exemplary of the average case. There can of course be individual instances where higher or lower dosage ranges are merited, and such are within the scope of this invention. Depending upon the need, the agent may optionally be administered at a dose of from 0.01 to 30 mg/kg body weight, such as from 0.1 to 10 mg/kg, more preferably from 0.1 to 1 mg/kg body weight. In an exemplary embodiment, one or more doses of 10 to 300 mg/day or more preferably, 10 to 150 mg/day, will be administered to the patient.

In a particularly preferred embodiment, the methods and uses of the invention involve administration of a peptide or composition of the invention in combination with one or more other active agents, for example, existing glucose transport promoting drugs or pharmacological enhancers available on the market. In such cases, the compounds of the invention may be administered consecutively, simultaneously or sequentially with the one or more other active agents.

In one embodiment of the invention, the peptide of the invention may be administered in the form of a conjugate comprising the peptide, and may optionally include a linker, and a partner molecule, for example a protein such as an antibody molecule intended to increase the half-life of the conjugate in-vivo. In one embodiment, the peptide may be modified to substitute one or more amino acids with amino acids employed to attach partner molecules. For example, an amino acid may be substituted with a lysine residue for the purpose of conjugating a partner molecule such as a PEG molecule.

"Man-made" as applied to comestible products should be understood to mean made by the hand of a human and not existing in nature.

"Improving muscle status" means improving the muscle health, for example promoting skeletal muscle protein synthesis, skeletal glucose absorbtion, improving lean tissue mass in therapeutic or non-therapeutic context, promoting muscle recovery generally after activity exercise, or improving muscle performance. The methods or uses may be therapeutic or non-therapeutic. The term "improving lean tissue mass status" should be understood to mean increasing lean tissue mass, or inhibiting or preventing the rate of lean tissue mass degradation.

"Promoting muscle recovery" means causing an increase in absorbtion of glucose in skeletal muscle compared with untreated skeletal muscel.

"Disease or condition characterised by lethargy or low energy levels" means any condition or disease characterised by a feeling or tiredness or low energy. Examples include allergies, asthma, anemia, cancer and its treatments, chronic pain, heart disease, infection, depression, eating disorders, grief, sleeping disorders, thyroid problems, medication side effects, alcohol use, or drug use.

"Maintaining or restoring muscle health" means helping retain or restore mammalian muscle health resulting from damage incurred during exercise. By promoting glucose transport in skeletal muscle the peptides promote recovery from exercise, and relieve muscle soreness/pain and injury connected with exercise. They can also be used to decrease and prevent muscle cramping, and to allow a faster recovery from muscle cramping. Cramping can result from physical stress, mental stress, and or Repetitive Strain Injury stress. By promoting glucose transport the peptides help reduce Myopathy of the muscle, and help prevent Sarcopenia in mammals, promote recovery from injuries during exercise, and relieve muscle soreness/pain and injury connected with exercise. The invention also relates to a peptide or composition of the invention for use in maintaining or restoring muscle health in a mammal.

"Metabolic disorder characterised by dysregulated glucose or insulin levels in a mammal" should be understood to include pre-diabetes, diabetes; Type-1 diabetes; Type-2 diabetes; metabolic syndrome; obesity; diabetic dyslipidemia; hyperlipidemia; hypertension; hypertriglyceridemia; hyperfattyacidemia; hypercholerterolemia; hyperinsulinemia, MODY, and HNF1A-MODY.

"Improving glycaemic management" should be understood to mean one or more of lowering plasma blood glucose levels, especially post-prandial blood glucose levels, treating or preventing hyperglycaemia, increasing post prandial insulin secretion, regulating glucose homeostasis, and reducing or attenuating insulin resistance.

DETAILED DESCRIPTION OF THE INVENTION

Example 1

Measuring glucose uptake using 2-deoxyglucose (2-DG) is a widely accepted method used to investigate glucose uptake in skeletal muscle cells. 2-DG is taken up by glucose transporters and metabolized to 2-DG-6-phosphate (2-DG6P). The amount of accumulated non-metabolized 2-DG6P is proportional to glucose uptake by cells.
Method:
1. Human skeletal myoblasts (Sigma 150-05a) were seeded in a 96 well plate at 10,000 cells per well in Skeletal Muscle Differentiation medium and allowed to differentiated for 72 h prior to experimentation.
2. The differentiated cells were serum starved for 24 h prior to stimulation with insulin or synthetic peptides. After starvation, the serum free media was removed, cells rinsed with Phosphate Buffered Saline (PBS) and media replaced with 100 µl of Krebs-Ringer-Phosphate-HEPES (KRPH) and incubated for 1 h.
3. The cells were then stimulated with 100 nM insulin for 30 minutes or 5 µg/ml, 0.5 µg/ml or 0.05 µg/ml synthetic peptide for 3 h respectively.
4. Following stimulation the cells were incubated with 10 µl/well of 2-DG solution for 40 min and glucose uptake was measured using the 'PrismColor Glucose Uptake Assay Kit' (Molecutools), all steps were carried out according to the manufacturer's instructions.
5. Results were calculated as a percentage of the untreated control. An increase in optical density reading indicates greater incorporation of 2-DG6P and increase in glucose uptake.

All experiments were carried out in duplicate on three plates (6 wells/condition). Significance was determined using the Students t-test (*p<0.05 compared to control, p<0.01 compared to control, * p<0.001 compared to control)

Figure 1A:
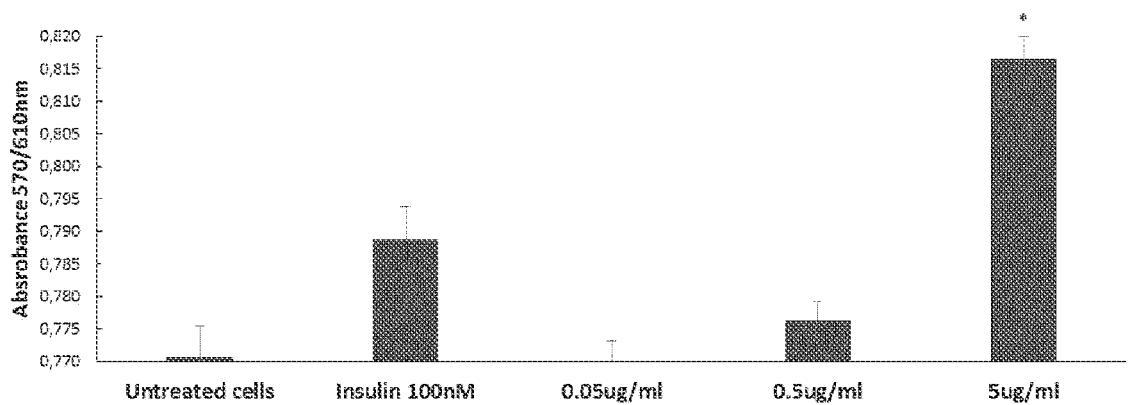
FIG. 1A: The effect of synthetic peptide SEQ ID NO: 51 (Rice) on glucose uptake in skeletal muscle cells.
Figure 1B:
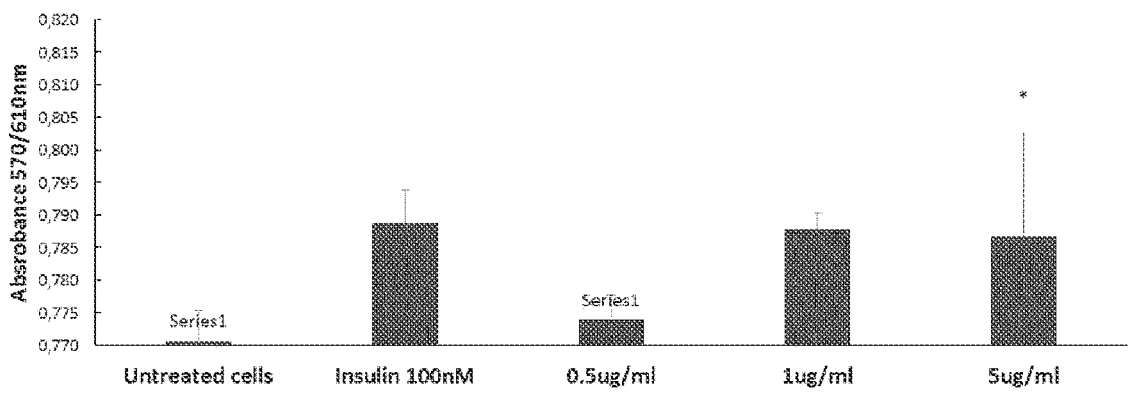
FIG. 1B: The effect of synthetic peptides—SEQ ID NO: 13 (Pea) on glucose uptake in skeletal muscle cells.
Figure 2:
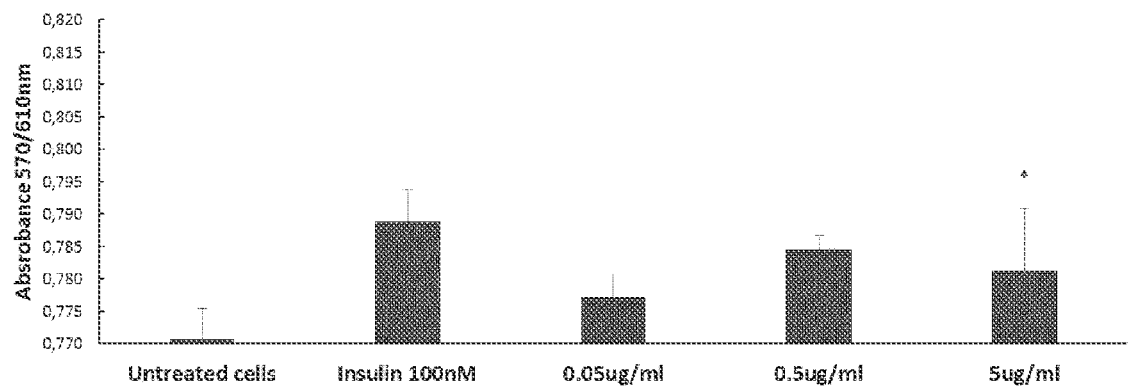
FIG. 2: The effect of synthetic peptide SEQ ID NO: 66 (Rice) on glucose uptake in skeletal muscle cells.

The results are shown in FIGS. 1 and 2—all synthetic peptides caused a significant increase in glucose uptake in the cells.

Example 2

Study Description

Skeletal muscle is the predominant site of glucose disposal (80%) under insulin-stimulated or post-prandial conditions. Under these conditions, transport of glucose into skeletal muscle is facilitated principally by the insulin-responsive glucose transport protein GLUT4, which translocates to the cell surface upon insulin or contractile stimulation.

We determined the effect of six synthetic peptides (SP1-6) and four peptide compositions on in vitro GLUT4 translocation using the L6 rat skeletal muscle cell line. A clone of the L6 cell line containing overexpression of GLUT4 tagged with a c-myc epitope (courtesy of Prof. Amira Klip, Hospital for Sick Children, Toronto) was used to investigate the efficacy of each synthetic peptide and peptide composition for effects on GLUT4 translocation in a dose-response design.

```
SP1 (E_685two_BE)
                                [SEQ ID NO: 85]
DTFYNAAWDPSNR SP2 (E_64two_BE)
                                [SEQ ID NO: 7]
VLDLAIPVNRPGQL SP3 (E_93_BE)
                                [SEQ ID NO: 86]
YQHQQGGKQEQENEGNNIFSGFK

SP4 (I_641_BE)
                                [SEQ ID NO: 87]
ALDWAIANLLR

SP5 (I_1021_BE)
                                [SEQ ID NO: 88]
YDYENVDAGAAK

SP6 (I_24_BE)
                                [SEQ ID NO: 89]
EVQDSPLDACR
```

The following compositions of peptides were tested for skeletal muscle glucose transport activity in an in-vitro test:
I_2_BE (comprises peptides of SEQ ID NO: 7 and SEQ ID NO: 10)
E_1_BE (comprises peptides of SEQ ID NOs: 48, 49, 50, 51, 54, 58, 60, 61, 62, 63)

Cell Culture

L6-GLUT4myc cells were grown in 10% FBS and 2 µg/ml blasticidin. Cells were grown for 48-72 hours before being seeded in 24-well plates at 15,000 cells per well in 2% FBS and allowed to differentiate for 6 to 8 days prior to experimentation.

L6-GLUT4myc cells were serum-starved for three hours prior to incubation with 100 nM of insulin for 30 mins, or 200, 20, 2.0 and 0.2 µM of SP, and 2, 1, 0.5 and 0.25 mg/ml of peptide composition for 3 hours respectively. A 3 hour incubation period was selected based on previous findings identifying that incubation with branch chain amino acid containing di-peptides for 3 hours increases glucose uptake in L6 myotubes 1. Treatments were staggered in order to determine GLUT4myc translocation at the same time point.

Measurement of GLUT4myc Translocation in L6 Myotubes

The quantity of myc-tagged GLUT4 at the cell surface was measured by antibody-coupled colorimetric assay. Briefly, after incubation with either insulin for 30 mins or synthetic peptide or peptide composition for 3 hours respectively, L6-GLUT4myc cells were fixed via incubation with 3% paraformaldehyde (PFA). A 0.1 M glycine solution was then added to quench PFA and cells were blocked with 5% goat serum. The myotube monolayer was exposed to anti-myc antibody and then incubated with peroxidase conjugated donkey anti-mouse IgG. 1 mL of o-phenylenediamine dihydrochloride (OPD) reagent was added to each well and this reaction was stopped by adding 250 µl/well of 3 M HCL. To determine GLUT4 translocation to cell surface, a measured aliquot of each condition was determined spectrophotometrically on a plate reader using absorbance at 492 nm.

Synthetic Peptides

Peptides were first diluted in a suitable solvent. Dimethyl sulfoxide (DMSO) was the solvent of choice for peptides with poor predicted water solubility. Final concentration of DMSO in each well at 200, 20, 2 and 0.2 µM for each synthetic peptide are shown in Table 1.

Peptide Compositions

Peptide compositions were prepared by adjusting the pH to between 6-7 using 1 M NaOH or HCL and subsequently sterile filtered.

TABLE 1

Concentration of DMSO per well for each synthetic peptide

| Peptide | Concentration of DMSO per well (%) | | | |
| --- | --- | --- | --- | --- |
|  | 200 µM | 20 µM | 2 µM | 0.2 µM |
| SP1 (E_685two_BE) | 4.0 | 0.4 | 0.04 | 0.004 |
| SP2 (E_64two_BE) | 0.9 | 0.09 | 0.009 | 0.0009 |
| SP3 (E_93_BE) | 0.8 | 0.08 | 0.008 | 0.0008 |
| SP4 (I_641_BE) | 0.2 | 0.02 | 0.002 | 0.0002 |
| SP5 (I_1021_BE) | 3.0 | 0.3 | 0.03 | 0.003 |
| SP6 (I_24_BE) | 0.0 | 0.0 | 0.0 | 0.0 |

Synthetic Peptides

Figure 3:
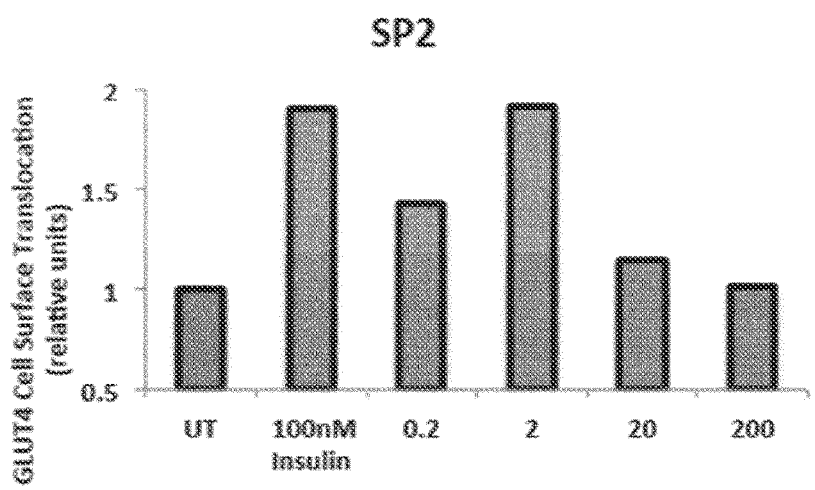
FIG. 3: The effect of synthetic peptide SEQ ID NO: 7 (Rice) on GLUT4 translocation in L6-GLUT4myc skeletal muscle cells.

In addition to an untreated control, 100 nM insulin was utilised to stimulate a maximal GLUT4 translocation response i.e. a positive control in each experiment. The average increase in cell surface GLUT4 translocation in response to 100 nM insulin was 1.72-fold when compared to untreated control (FIG. 3). Treatments were staggered so that all conditions (untreated, insulin and sample) were processed at the same time-point. There was a trend for SP2 to increase GLUT4 translocation at a concentration ranging from 0.2-2 µM. SP1 at 200 µM tended to decrease translocation due to poor cell viability.

Peptide Compositions

Figure 4:
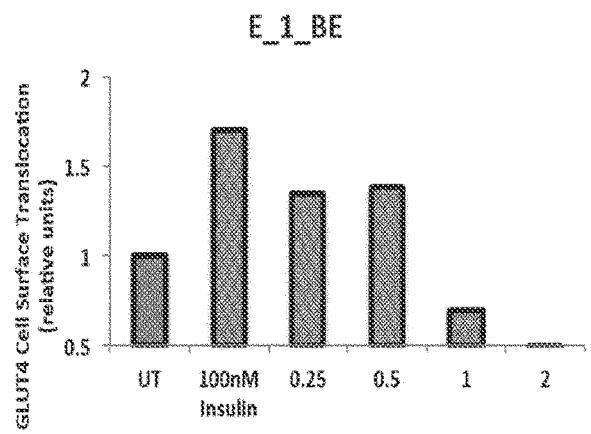
FIG. 4: The effect of peptide composition E_1_BE on GLUT4 translocation in L6-GLUT4myc skeletal muscle cells.
Figure 5:
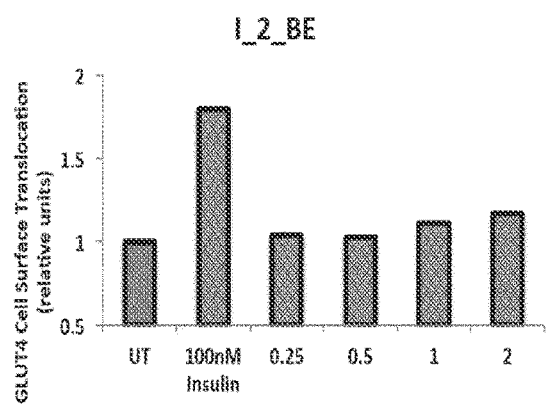
FIG. 5: The effect of peptide composition I_2_BE on GLUT4 translocation in L6-GLUT4myc skeletal muscle cells.

Peptide composition E_1BE tended to increase GLUT4 translocation at a concentration ranging from 0.25-0.5 mg/ml, however 1 and 2 mg/ml induced progressive cell death. Furthermore, there was a trend for composition I_2_BE to increase GLUT4 translocation in a dose-dependent manner (FIGS. 4-6).

Conclusion of the Experiment

SP2 and compositions E_1_BE and I_2_BE displayed a trend for stimulatory effect on skeletal muscle GLUT4 translocation and warrant further investigation for their potential to facilitate glucose transport in skeletal muscle.

Example 3

Anti-Hyperglycaemic Properties of Peptide Compositions I_2_BE and E_1_BE in db/db Mice

Preparation

I_2_BE or E_1_BE is administered as a solution or suspension in Purified Water. According to stability data, test item formulations at 10 mg/ml in Purified Water are stable for 10 hours at +2-+8° C. protected from light. Therefore test item formulations are kept at +2-+8° C. protected from light and used within 10 hours after preparation. Aspect of formulations and maximal duration of storage are detailed below.

Material

Species: Mouse.

Strain: BKS.Cg-Dock7m+/+Leprdb/J (db/db diabetic mice) (souche JAX™ Mice strain).

Choice of species: The mouse was chosen because of its acceptance as a predictor of pharmacological effects of drugs in man and the recognition by regulatory authorities that this species is suitable for pharmacodynamic studies.

Age: 8-9 weeks on the day of randomisation.

Weight: On the day of randomisation, a maximum range of 2.5 g between each group should be achieved. The body weight of the animals on the day of randomisation will be mentioned in the report. About 10% excess animals will be ordered to allow selection of animals on the basis of body weight; if unassigned to groups, these will be available as spare animals, in case of unforeseen events.

Study Design

The study involves 3 groups of 12 animals each. Groups will be as follows:

Group 1: control group dosed with the vehicle (Purified Water), po
Group 2: I_2_BE at 100 mg/kg, po
Group 3: E_1_BE at 100 mg/kg, po Allocation of treatment to each animal is randomly determined before the start of the study.

Homogeneity of groups will be validated on the criterion of body weight and glycaemia measured on the day of randomisation.

Justification of the Number of Animals Per Group:

The number of animals per group is the minimum number enabling an accurate assessment of the pharmacokinetics profile.

Study Calendar

D-4: Weighing, glycaemia measurements, inclusion and randomisation of animals
D1: Weighing of animals, start of daily oral administrations of test items or vehicle, and glycaemia measurements
D8: Weighing of animals and glycaemia measurements
D15: Weighing of animals and glycaemia measurements
D16-D18: Oral Glucose Tolerance Test (OGTT)
D22: Weighing of animals and glycaemia measurements
D29: Weighing of animals and glycaemia measurements
D29-D31: Blood sampling followed by the organs sampling Glycaemia Measurements Blood glucose level is measured weekly from D1 up to D29, 90±30 minutes after the daily treatment. A drop of blood is collected from the tail vein of non fasted db/db mice and is put on the extremity of a glucose strip (Nova Biomedical) placed into the Glucose Meter (Nova Biomedical).

Oral Glucose Tolerance Test (OGTT)

Over the third week (D16-D18) and after an overnight fasting period, the OGTT is performed. After a blood glucose level measurement (predose value) and 30 minutes after the daily oral administrations of test items or vehicle, animals are dosed by the oral route with 10 mL/kg of a glucose solution at 0.2 g/mL (2 g/kg) in Purified Water. Afterwards, blood glucose level are measured following the same procedure described above, at times 15, 30, 60, 90 and 120 minutes after the glucose overload.

Intermediate Results

The effects of I_2_BE and E_1_BE on body weight and glycaemia are compared with those of the vehicle and the delta corresponding to the evolution of blood sugar in each group is calculated from D1 to D15. Evolution of blood glucose from D-5 to D1 and therefor prior to treatment shows that progression of the disease is the same in all three groups. Strong trends of activity were observed for both peptide compositions compare to control between D1 and D15 showing that both peptide compositions are able to control the evolution of blood sugar in diabetic animals.

Results

The effects of I_2_BE and E_1_BE on body weight and glycaemia are compared with those of the vehicle using an analysis of variance for repeated measurements with a Dunnett's test in case of significance ($P \leq 0.05$). For OGTT, the results of glycemia after the glucose overload in treated animals is compared with those of the vehicle animals using an analysis of variance for repeated measurements with a Dunnett's test in case of significance ($P=0.05$). Biochemical results (plasma glucose, HbAlc and insulin) are expressed as absolute values. The effects of I_2_BE and E_1_BE on biochemical parameters are compared with those of the vehicle using an analysis of variance with a Dunnett's test in case of significance ($P \leq 0.05$).

SEQUENCES
PROTEIN: P13918 - 1 - Pea

[SEQ ID NO: 1]

MAATTMKASFPLLMLMGISFLASVCVSSRSDPQNPPIFKSNKFQTLFENENGHIRLLQKFDQRSKIFENLQNYRLLEYKSKPHTIFLPQHTDADYI

LVVLSGKAILTVLKPDDRNSFNLERGDTIKLPAGTIAYLVNRDDNEELRVLDLAIPVNRPGQLQSFLLSGNQNQQNYLSGFSKNILEASFNTDYEE

IEKVLLEEHEKETQHRRSLKDKRQQSQEENVIVKLSRGQIEELSKNAKSTSKKSVSSESEPFNLRSRGPIYSNEFGKFFEITPEKNPQLQDLDIFVNS

VEIKEGSLLLPHYNSRAIVIVTVNEGKGDFELVGQRNENQQEQRKEDDEEEEQGEEEINKQVQNYKAKLSSGDVFVIPAGHPVAVKASSNLDLL

GFGINAENNQRNFLAGDEDNVISQIQRPVKELAFPGSAQEVDRILENQKQSHFADAQPQQRERGSRETRDRLSSV

-continued

PEPTIDE:  
VLDLAIPVNRPGQL  
[SEQ ID NO: 7]

PEPTIDE:  
VLDLAIPVNRPGQLSF  
[SEQ ID NO: 8]

PEPTIDE:  
SFLLSGNQNQQNYLS  
[SEQ ID NO: 9]

PEPTIDE:  
VLDLAIPVNR  
[SEQ ID NO: 10]

PEPTIDE:  
SFLLSGNQNQQNYLSGFS  
[SEQ ID NO: 11]

PEPTIDE:  
LAIPVNRPGQLQSFLLSG  
[SEQ ID NO: 12]

PEPTIDE:  
SFLLSGNQNQQNYLSG  
[SEQ ID NO: 13]

PEPTIDE:  
LDLAIPVNRPGQL  
[SEQ ID NO: 14]

PEPTIDE:  
VLDLAIPVNRPGQLQ  
[SEQ ID NO: 15]

PEPTIDE:  
LAIPVNRPGQLQSFLLSGNQNQ  
[SEQ ID NO: 16]

PEPTIDE:  
SFLLSGNQNQQNYLSGFSKNILE  
[SEQ ID NO: 17]

PEPTIDE:  
GSLLLPHYN  
[SEQ ID NO: 18]

PEPTIDE:  
GSLLLPHYNS  
[SEQ ID NO: 19]

PEPTIDE:  
SSNLDLLGFG  
[SEQ ID NO: 20]

PEPTIDE:  
FLPQHTD  
P13918  
[SEQ ID NO: 181]

PEPTIDE:  
PGQLQSFLLSGNQNQQNYLSGF  
P13918  
[SEQ ID NO: 190]

PEPTIDE:  
QLQSFLLSGNQNQQNYLSGFSK  
P13918  
[SEQ ID NO: 191]

PEPTIDE:  
QSFLLSGNQNQQ  
P13918  
[SEQ ID NO: 192]

PEPTIDE:  
PGQLQSFLLSGN  
P13918  
[SEQ ID NO: 193]

-continued

PEPTIDE: [SEQ ID NO: 194]
QSFLLSGNQ
P13918

PEPTIDE: [SEQ ID NO: 195]
QNQQNYLSGFSK
P13918

PEPTIDE: [SEQ ID NO: 204]
PGQLQSFLLSGNQNQQNYLSGFSK
P13918

PEPTIDE: [SEQ ID NO: 207]
SKPHTIFLPQHTDADYILVVLSGK
P13918

PEPTIDE: [SEQ ID NO: 216]
VLDLAIPVNRPGQLQSFLLSGNQNQQNYLSGFSK

PEPTIDE: [SEQ ID NO: 217]
QSFLLSGNQNQQNYLSG

PEPTIDE: [SEQ ID NO: 218]
RLSSV

PROTEIN: Q9M3X6 - 2 - Pea [SEQ ID NO: 2]
MATTIKSRFPLLLLLGIIFLASVVCVTYANYDEGSEPRVPAQRERGRQEGEKEEKRHGEWRPSYEKEEDEEEGQRERGRQEGEKEEKRHGEWR

PSYEKQEDEEEKQKYRYQREKEDEEEKQKYQYQREKKEQKEVQPGRERWEREEDEEQVDEEWRGSQRREDPEERARLRHREERTKRDRRHQ

REGEEEERSSESQERRNPFLFKSNKFLTLFENENGHIRLLQRFDKRSDLFENLQNYRLVEYRAKPHTIFLPQHIDADLILVVLSGKAILTVLSPNDR

NSYNLERGDTIKLPAGTTSYLVNQDDEEDLRLVDLVIPVNGPGKFEAFDLAKNKNQYLRGFSKNILEASYNTRYETIEKVLLEEQEKDRKRRQQG

EETDAIVKVSREQIEELKKLAKSSSKKSLPSEFEPINLRSHKPEYSNKFGKLFEITPEKKYPQLQDLDLFVSCVEINEGALMLPHYNSRAIVVLLVNEG

KGNLELLGLKNEQQEREDRKERNNEVQRYEARLSPGDVVIIPAGHPVAITASSNLNLLGFGINAENNERNFLSGSDDNVISQIENPVKELTFPGS

VQEINRLIKNQKQSHFANAEPEQKEQGSQGKRSPLSSILGTFY

PEPTIDE: [SEQ ID NO: 21]
AFDLAKNKNQYLRGFS

PEPTIDE: [SEQ ID NO: 22]
QYLRGFSKNILE

PEPTIDE: [SEQ ID NO: 23]
NLLGFGINAE

PEPTIDE: [SEQ ID NO: 24]
SNLNLLGFG

PEPTIDE: [SEQ ID NO: 25]
LAKNKNQYLRGFSKN

PEPTIDE: [SEQ ID NO: 26]
LAKNKNQYLRGFSK

PEPTIDE: [SEQ ID NO: 27]
LRGFSKNILE

PEPTIDE: [SEQ ID NO: 28]
YSNKFGKLFE

PEPTIDE:

-continued

PEPTIDE: [SEQ ID NO: 29]
AFDLAKNKNQYLRGF

PEPTIDE: [SEQ ID NO: 30]
AFDLAKNKNQYLRGFSK

PEPTIDE: [SEQ ID NO: 31]
NKNQYLRGFS

PEPTIDE: [SEQ ID NO: 32]
NKNQYLRGFSKNILE

PEPTIDE: [SEQ ID NO: 33]
SSNLNLLGFG

PEPTIDE: [SEQ ID NO: 34]
EYSNKFGKLFE

PEPTIDE: [SEQ ID NO: 35]
ASSNLNLLG

PEPTIDE: [SEQ ID NO: 36]
LNLLGFGI

PEPTIDE: [SEQ ID NO: 37]
NKFGKLFE

PEPTIDE: [SEQ ID NO: 38]
VQPGRERWEREEDEEQVDE

PEPTIDE: [SEQ ID NO: 39]
RERWEREEDEEQVDE

PEPTIDE: [SEQ ID NO: 40]
ASSNLNLLGF

PEPTIDE: [SEQ ID NO: 41]
LAKNKNQYLRGFS

PEPTIDE: [SEQ ID NO: 42]
ELLGLKNE

PEPTIDE: [SEQ ID NO: 43]
ASSNLNLL

PEPTIDE: [SEQ ID NO: 44]
YPQLQDLDL

PEPTIDE: [SEQ ID NO: 45]
LLGLKNEQQE

PEPTIDE: [SEQ ID NO: 46]
LVVLSGKAIL

PEPTIDE: [SEQ ID NO: 162]
LRGFSK
Q9M3X6

PEPTIDE: [SEQ ID NO: 163]
GALMLPHYN
Q9M3X6

-continued

PEPTIDE:  [SEQ ID NO: 164]

GALMLPHYNSR
Q9M3X6

PEPTIDE:  [SEQ ID NO: 196]

YLRGFS
Q9M3X6

PEPTIDE  [SEQ ID NO: 203]

LVDLVIPVNGPGKFEAFDLAK
Q9M3X6

PEPTIDE:  [SEQ ID NO: 226]

LRGFSKN

PROTEIN: Q0DEV5 - 1 - Rice  [SEQ ID 3]

MSALTTSQLATSATGFGIADRSAPSSLLRHGFQGLKPRSPAGGDATSLSVTTSARATPKQQRSVQRGSRRFPSVVVYATGAGMNVVFVGAEM

APWSKTGGLGDVLGGLPPAMAANGHRVMVISPRYDQYKDAWDTSVVAEIKVADRYERVRFFHCYKRGVDRVFIDHPSFLEKVWGKTGEKIY

GPDTGVDYKDNQMRFSLLCQAALEAPRILNLNNNPYFKGTYGEDVVFVCNDWHTGPLASYLKNNYQPNGIYRNAKVAFCIHNISYQGRFAFE

DYPELNLSERFRSSFDFIDGYDTPVEGRKINWMKAGILEADRVLTVSPYYAEELISGIARGCELDNIMRLTGITGIVNGMDVSEWDPSKDKYITA

KYDATTAIEAKALNKEALQAEAGLPVDRKIPLIAFIGRLEEQKGPDVMAAAIPELMQEDVQIVLLGTGKKKFEKLLKSMEEKYPGKVRAVVKFNA

PLAHLIMAGADVLAVPSRFEPCGLIQLQGMRYGTPCACASTGGLVDTVIEGKTGFHMGRLSVDCKVVEPSDVKKVAATLKRAIKVVGTPAYEE

MVRNCMNQDLSWKGPAKNWENVLLGLGVAGSAPGIEGDEIAPLAKENVAAP

PEPTIDE:  [SEQ ID NO: 47]

YDATTAIEAK

PEPTIDE:  [SEQ ID NO: 189]

HPSF
Q0DEV5

PROTEIN: P14323 - 2 - Rice  [SEQ ID NO: 4]

MASSVFSRFSIYFCVLLLCHGSMAQLFNPSTNPWHSPRQGSFRECRFDRLQAFEPLRKVRSEAGVTEYFDEKNELFQCTGTFVIRRVIQPQGLL

VPRYTNIPGVVYIIQGRGSMGLTFPGCPATYQQQFQQFSSQGQSQSQKFRDEHQKIHQFRQGDIVALPAGVAHWFYNDGDAPIVAVYVYDV

NNNANQLEPRQKEFLLAGNNNRAQQQQVYGSSIEQHSGQNIFSGFGVEMLSEALGINAVAAKRLQSQNDQRGEIIHVKNGLQLLKPTLTQQ

QEEQAQAQDQYQQVQYSERQQTSSRWNGLEENFCTIKVRVNIENPSRADSYNPRAGRITSVNSQKFPILNLIQMSATRVNLYQNAILSPFWNV

NAHSLVYMIQGRSRVQVVSNFGKTVFDGVLRPGQLLIIPQHYAVLKKAEREGCQYIAIKTNANAFVSHLAGKNSVFRALPVDVVANAYRISRE

QARSLKNNRGEEHGAFTPRFQQQYYPGLSNESESETSE

PEPTIDE:  [SEQ ID NO: 48]

NGLQLLKPTL

PEPTIDE:  [SEQ ID NO: 49]

GLQLLKPTL

PEPTIDE:  [SEQ ID NO: 50]

GVLRPGQLL

PEPTIDE:  [SEQ ID NO: 51]

DGVLRPGQLL

PEPTIDE:  [SEQ ID NO: 52]

LQLLKPTLTQQQE

PEPTIDE:  [SEQ ID NO: 53]

FLLAGNNNR

PEPTIDE: [SEQ ID NO: 54]
EFLLAGNNNR

PEPTIDE: [SEQ ID NO: 55]
FLLAGNNNRAQQQQVYGSSIE

PEPTIDE: [SEQ ID NO: 56]
FLLAGNNNRAQQQQ

PEPTIDE: [SEQ ID NO: 57]
FLLAGNNNRAQQQQVYG

PEPTIDE: [SEQ ID NO: 58]
FLLAGNNNRAQQQQVY

PEPTIDE: [SEQ ID NO: 59]
FQQQYYPGLSNESESETSE

PEPTIDE: [SEQ ID NO: 165]
VFDGVLRPG
P14323

PEPTIDE: [SEQ ID NO: 166]
LQSQND
P14323

PEPTIDE: [SEQ ID NO: 167]
LQSQNDQRGEI
P14323

PEPTIDE: [SEQ ID NO: 168]
QSQNDQRGEIIHVK
P14323

PEPTIDE: [SEQ ID NO: 169]
RGEIIHVK
P14323

PEPTIDE: [SEQ ID NO: 170]
RLQSQNDQ
P14323

PEPTIDE: [SEQ ID NO: 171]
RLQSQNDQRG
P14323

PEPTIDE: [SEQ ID NO: 172]
RLQSQNDQRGEIIH
P14323

PEPTIDE: [SEQ ID NO: 199]
TVFDGVLRPGQL
P14323

PEPTIDE: [SEQ ID NO: 211]
FGKTVFDGVLRPGQL
P14323

PEPTIDE: [SEQ ID NO: 206]
RLQSQNDQRGEIIHVK
P14323

PEPTIDE:
[SEQ ID NO: 219]
QKEFLLAGNNNR
(also in P14614)

PROTEIN: P14614 - 3 - Rice
[SEQ ID 5]
MATIAFSRLSIYFCVLLLCHGSMAQLFGPNVNPWHNPRQGGFRECRFDRLQAFEPLRRVRSEAGVTEYFDEKNEQFQCTGTFVIRRVIEPQGL
LVPRYSNTPGMVYIIQGRGSMGLTFPGCPATYQQQFQQFLPEGQSQSQKFRDEHQKIHQFRQGDIVALPAGVAHWFYNEGDAPVVALYVF
DLNNNANQLEPRQKEFLLAGNNNREQQMYGRSIEQHSGQNIFSGFNNELLSEALGVNALVAKRLQGQNDQRGEIIRVKNGLKLLRPAFAQQ
QEQAQQQEQAQAQYQVQYSEEQQPSTRCNGLDENFCTIKARLNIENPSHADTYNPRAGRITRLNSQKFPILNLVQLSATRVNLYQNAILSPF
WNVNAHSLVYIVQGHARVQVVSNLGKTVFNGVLRPGQLLIIPQHYVVLKKAEHEGCQYISFKTNANSMVSHLAGKNSIFRAMPVDVIANAYR
ISREQARSLKNNRGEELGAFTPRYQQQTYPGFSNESENEALE

PEPTIDE:
[SEQ ID NO: 60]
LSEALGVNAL

PEPTIDE:
[SEQ ID NO: 61]
LRPAFAQQQEQAQQQEQA

PEPTIDE:
[SEQ ID NO: 62]
LRPAFAQQQE

PEPTIDE:
[SEQ ID NO: 63]
LRPAFAQQQEQAQQQE

PEPTIDE:
[SEQ ID NO: 186]
HNPR
P14614

PEPTIDE:
[SEQ ID NO: 187]
WHN
P14614

PEPTIDE:
[SEQ ID NO: 212]
TVFNGVLRPGQLL
P14614

PEPTIDE:
[SEQ ID NO: 220]
LLRPAFAQQQEQAQQQEQA

PEPTIDE:
[SEQ ID NO: 221]
VKNGLKLLRPAF

PEPTIDE:
[SEQ ID NO: 222]
FLLAGNNNRE

PEPTIDE:
[SEQ ID NO: 223]
GLKLLRPAFAQQQE

PEPTIDE:
[SEQ ID NO: 224]
LKLLRPAFAQQQE

PEPTIDE:
[SEQ ID NO: 225]
LLRPAFAQQQE

PROTEIN: P07728 - 4 - Rice
[SEQ ID NO: 6]
MASINRPIVFFTVCLFLLCNGSLAQQLLGQSTSQWQSSRRGSPRECRFDRLQAFEPIRSVRSQAGTTEFFDVSNEQFQCTGVSVVRRVIEPRGL
LLPHYTNGASLVYIIQGRGITGPTFPGCPESYQQQFQQSGQAQLTESQSQSQKFKDEHQKIHRFRQGDVIALPAGVAHWCYNDGEVPVVAIY
VTDLNNGANQLDPRQRDFLLAGNKRNPQAYRREVEERSQNIFSGFSTELLSEALGVSSQVARQLQCQNDQRGEIRVEHGLSLLQPYASLQE QEQGQVQSRERYQEGQYQQSQYGSGCSNGLDETFCTLRVRQNIDNPNRADTYNPRAGRVTNLNTQNFPILSLVQMSAVKVNLYQNALLSP FWNINAHSVVYITQGRARVQVVNNNGKTVFNGELRRGQLLIIPQHYAVVKKAQREGCAYIAFKTNPNSMVSHIAGKSSIFRALPNDVLANAY

RISREEAQRLKHNRGDEFGAFTPIQYKSYQDVYNAAESS

PEPTIDE:                                                                                                [SEQ ID NO: 64]

HGLSLLQPYA

PEPTIDE:                                                                                                [SEQ ID NO: 65]

HGLSLLQPYASL

PEPTIDE:                                                                                                [SEQ ID NO: 66]

HGLSLLQPY

PEPTIDE:                                                                                                [SEQ ID NO: 177]

RSQNIF
P07728

PEPTIDE:                                                                                                [SEQ ID NO: 178]

PNSM
P07728

PEPTIDE:                                                                                                [SEQ ID NO: 213]

MASINRPIVFFTVCLFLLCNGSLA

PEPTIDE:                                                                                                [SEQ ID NO: 214]

FLLAGNKRNPQ

PEPTIDE:                                                                                                [SEQ ID NO: 215]

FLLAGNKRN

PROTEIN: P29835 - 5 - RICE                                                                              [SEQ ID NO: 227]

MASKVVFFAAALMAAMVAISGAQLSESEMRFRDRQCQREVQDSPLDACRQVLDRQLTGRERFQPMFRRPGALGLRMQCC

QQLQDVSRECRCAAIRRMVRSYEESMPMPLEQGWSSSSSEYYGGEGSSSEQGYYGEGSSEEGYYGEQQQQPGMTRVRLTRA

RQYAAQLPSMCRVEPQQCSIFAAGQY

[SEQ ID NO: 173]
MPMP
P29835

[SEQ ID NO: 174]
PMPL
P29835

PEA PROTEIN 3: P15838 - 3 -                                                                             [SEQ ID NO: 228]

MATKLLALSLSFCFLLLGGCFALREQPEQNECQLERLNALEPDNRIESEGGLIETWNPNNKQFRCAGVALSRATLQHNALRRPYYSNAPQEIFIQ

QGNGYFGMVFPGCPETFEEPQESEQGEGRRYRDRHQKVNRFREGDIIAVPTGIVFWMYNDQDTPVIAVSLTDIRSSNNQLDQMPRRFYLAG

NHEQEFLRYQHQQGGKQEQENEGNNIFSGFKRDFLEDAFNVNRHIVDRLQGRNEDEEKGAIVKVKGGLSIISPPEKQARHQRGSRQEEDEDE

DEERQPRHQRGSRQEEEEDEDEERQPRHQRRRGEEEEEDKKERRGSQKGKSRRQGDNGLEETVCTAKLRLNIGPSSSPDIYNPEAGRIKTVTS

LDLPVLRWLKLSAEHGSLHKNAMFVPHYNLNANSIIYALKGRARLQVVNCNGNTVFDGELEAGRALTVPQNYAVAAKSLSDRFSYVAFKTND

RAGIARLAGTSSVINNLPLDVVAATFNLQRNEARQLKSNNPFKFLVPARQSENRASA

[SEQ ID NO: 175]
LEPDNR
P15838

[SEQ ID NO: 176]
GIARLAGTSSVIN
P15838

PROTEIN: Q0D7S0 - 3 - RICE
                                                                                                        [SEQ ID NO: 229]

-continued

MASNKVVFSVLLLAVVSVLAATATMAEYHHQDQVVYTPGPLCQPGMGYPMYPLPRCRALVKRQCVGRGTAAAAEQVRRDCCRQLAAVDD

SWCRCEAISHMLGGIYRELGAPDVGHPMSEVFRGCRRGDLERAAASLPAFCNVDIPNGGGGVCYWLARSGY

[SEQ ID NO: 179]

GHPM
Q0D7S0

[SEQ ID NO: 180]

HPMS
Q0D7S0

RICE PROTEIN 8: Q6K7K6

[SEQ ID NO: 230]

MASMSTILPLCLGLLLFFQVSMAQFSFGGSPLQSPRGFRGDQDSRHQCRFEHLTALEATH

QQRSEAGFTEYYNIEARNEFRCAGVSVRRLVVESKGLVLPMYANAHKLVYIVQGRGVFGM

ALPGCPETFQSVRSPFEQEVATAGEAQSSIQKMRDEHQQLHQFHQGDVIAVPAGVAHWLY

NNGDSPVVAFTVIDTSNNANQLDPKRREFFLAGKPRSSWQQQSYSYQTEQLSRNQNIFAG

FSPDLLSEALSVSKQTVLRLQGLSDPRGAIIRVENGLQALQPSLQVEPVKEEQTQAYLPT

KQLQPTWLRSGGACGQQNVLDEIMCAFKLRKNIDNPQSSDIFNPHGGRITRANSQNFPIL

NIIQMSATRIVLQNNALLTPHWTVNAHTVMYVTAGQGHIQVVDHRGRSVFDGELHQQQIL

LIPQNFAVVVKARREGFAWVSFKTNHNAVDSQIAGKASILRALPVDVVANAYRLSREDSR

HVKFNRGDEMAVFAPRRGPQQYAEWQINEK

[SEQ ID NO: 182]

EWQINEK
Q6K7K6

[SEQ ID NO: 183]

GPQQYAEWQINEK
Q6K7K6

[SEQ ID NO: 184]

PQQYAEWQ
Q6K7K6

[SEQ ID NO: 185]

RGPQQYA
Q6K7K6

[SEQ ID NO: 205]

RGPQQYAEWQINEK
Q6K7K6

[SEQ ID NO: 208]

RGPQQYAEWQINEK
Q6K7K6

[SEQ ID NO: 198]

RGPQQYAEWQIN
Q6K7K6

RICE PROTEIN 7: Q6K5O8

[SEQ ID NO: 231]

MATTTSLLSSCLCALLLAPLFSQGVDAWESRQGASRQCRFDRLQAFEPLRKVRSEAGDTE

YFDERNEQFRCAGVFVIRRVIEPQGLVVPRYSNTPALAYIIQGKGYVGLTFPGCPATHQQ

QFQLFEQRQSDQAHKFRDEHQKIHEFRQGDVVALPASVAHWFYNGGDTPAVVVYVYDIKS

FANQLEPRQKEFLLAGNNQRGQQIFEHSIFQHSGQNIFSGENTEVLSEALGINTEASKRL

QSQNDQRGDIIRVKHGLQLLKPTLTQRQEEHRQYQQVQYREGQYNGLDENFCTIKARVNI

```
ENPSRADYYNPRAGRITLLNNQKFPILNLIGMGAARVNLYQNALLSPFWNINAHSVVYII

QGSVRVQVANNQGRSVFNGVLHQGQLLIIPQNHAVIKKAEHNGCQYVAIKTISDPTVSWV

AGKNSILRALPVDVIANAYRISRDEARRLKNNRADEIGPFTPRFPQKSQRGYQFLTEGLS

LIGM
```

[SEQ ID]
```
GYVGLTFPGCPATHQQQFQLFEQR
Q6K508
```

PROTEIN: P02855 - 4 - PEA [SEQ ID NO: 232]
```
DNAEIEKILLEEHEKETHHRRGLRDKRQQSQEKNVIVKVSKKQIEELSKNAKSSSKKSVSSRSEPFNLKSSDPIYSNQYGKFFEITPKKNPQLQDLD

IFVNYVEIKEGSLWLPHYNSRAIVIVTVNEGKGDFELVGQRNENQQGLREEDDEEEEQREEETKNQVQSYKAKLTPGDVFVIPAGHPVAVRAS

SNLNLLGFGINAENNQRNFLAGEEDNVISQIQKQVKDLTFPGSAQEVDRLLENQKQSYFANAQPQQRETRSQEIKEHLYSILGAF
```

[SEQ ID NO: 201]
```
KNPQLQDLDIFVNYVEIK
P02855
```

PROTEIN: P02857 - 1 - PEA [SEQ ID NO: 233]
```
MAKLLALSLSFCFLLLGGCFALREQPQQNECQLERLDALEPDNRIESEGGLIETWNPNNKQFRCAGVALSRATLQRNALRRPYYSNAPQEIFIQ

QGNGYFGMVFPGCPETFEEPQESEQGEGRRYRDRHQKVNRFREGDIIAVPTGIVFWMYNDQDTPVIAVSLTDIRSSNNQLDQMPRRFYLAG

NHEQEFLQYQHQQGGKQEQENEGNNIFSGFKRDYLEDAFNVNRHIVDRLQGRNEDEEKGAIVKVKGGLSIISPPEKQARHQRGSRQEEDED

EEKQPRHQRGSRQEEEEDEDEERQPRHQRRRGEEEEEDKKERGGSQKGKSRRQGDNGLEETVCTAKLRLNIGPSSSPDIYNPEAGRIKTVTSL

DLPVLRWLKLSAEHGSLHKNAMFVPHYNLNANSIIYALKGRARLQVVNCNGNTVFDGELEAGRALTVPQNYAVAAKSLSDRFSYVAFKTNDR

AGIARLAGTSSVINNLPLDVVAATFNLQRNEARQLKSNNPFKFLVPARESENRASA
```

[SEQ ID NO: 202]
```
LDALEPDNR
P02857
```

PROTEIN: P09918 - 14 - Pisum sativum [SEQ ID NO: 234]
```
MFSGVTGILNRGHKIKGTVVLMRKNVLDINSLTTVGGVIGQGFDILGSTVDNLTAFLGRSVSLQLISATKPDATGKGKLGKATFLEGIISSLPTLG AGQSAFKIHFEWDDDMGIPGAFYIKNFMQTEFFLVSLTLDDIPNHGSIYFVCNSWIYNAKHHKIDRIFFANQTYLPSETPAPLVHYREEELNNLR GDGTGERKEWERIYDYDVYNDLGNPDSGENHARPVLGGSETYPYPRRGRTGRKPTRKDPNSESRSDYVYLPRDEAFGHLKSSDFLTYGLKAVS QNVVPALESVFFDLNFTPNEFDSFDEVHGLYEGGIKLPTNILSQISPLPVLKEIFRTDGENTLKYPPPKVIQVSRSGWMTDEEFAREMLAGVNPN VICCLQEFPPRSKLDSQIYGDHTSKISKEHLEPNLEGLTVEEAIQNKKLFLLDHHDSIMPYLRRINSTSTKAYATRTILFLNNNQNLKPLAIELSLPHP QGDEHGAVSYVYQPALEGVESSIWLLAKAYVIVNDSCYHQLVSHWLNTHAVVEPFVIATNRHLSCLHPIYKLLYPHYRDTMNINSLARLSLVND GGIIEKTFLWGRYSMEMSSKVYKNWVFTEQALPADLIKRGMAIEDPSSPCGVKLVVEDYPYAVDGLEIWAIIKTWVQDYVSLYYTSDEKLRQD SELQAWWKELVEVGHGDKKNEPWWPKMQTREDLIEVCSIVIWTASALHAAVNFGQYSYGGLILNRPTLSRRFMPEKGSAEFEELVKSPQKA YLKTITPKFQTLIDLSVIEILSRHASDELYLGERDNPNWTSDKRALEAFKKFGNKLAEIEKKLTQRNNDEKLRNRHGPVEMPYTLLYPSSKEGLTFR

GIPNSISI
```

[SEQ ID NO: 209]
```
HGPVEMPYTLLYPSSK
P09918
```

[SEQ ID NO: 210]
```
LGLSPQDALK
Q43819
```

[SEQ ID NO: 188]
```
WDP
B5A8N6
```

[SEQ ID NO: 197]
```
PVEMPTLLYPS
```

-continued

Examples of homologs for each protein
P13918 (Pea)
>gi|137584|sp|P08438.1|VCL_VICFA RecName: Full = Vicilin; Flags: Precursor [Vicia faba]
>gi|22057|emb|CAA68559.1| vicilin [Vicia faba var. minor] >gi|383931031|gb|AFH56916.1| vicilin
[Vicia faba]

[SEQ ID NO: 67]

MAATTLKDSFPLLTLLGIAFLASVCLSSRSDQDNPFVFESNRFQTLFENENGHIRLLQKFDQHSKLLENLQNYRLLEYKSKPHTIFLPQQTDADFIL

VVLSGKAILTVLLPNDRNSFSLERGDTIKLPAGTIGYLVNRDDEEDLRVLDLVIPVNRPGEPQSFLLSGNQNQPSILSGFSKNILEASFNTDYKEIEK

VLLEEHGKEKYHRRGLKDRRQRGQEENVIVKISRKQIEELNKNAKSSSKKSTSSESEPFNLRSREPIYSNKFGKFFEITPKRNPQLQDLNIFVNYVEI

NEGSLLLPHYNSRAIVIVTVNEGKGDFELVGQRNENQQGLREEYDEEKEQGEEEIRKQVQNYKAKLSPGDVLVIPAGYPVAIKASSNLNLVGFGI

NAENNQRYFLAGEEDNVISQIHKPVKELAFPGSAQEVDTLLENQKQSHFANAQPRERERGSQEIKDHLYSILGSF

>gi|502105533|ref|XP_004492829.1| PREDICTED: vicilin-like isoform X1 [Cicer arietinum] ChickPea

[SEQ ID NO: 68]

MAIKARFPLLVLLGIVFLASVCAKSDKENPFFFKSNNCQTLFENENGHVRLLQRFDKRSQLFENLQNYRLMEYNSKPHTLFLPQHNDADFILVVL

RGRAILTVLNPNDRNTFKLERGDTIKLPAGTIAYLANRDDNEDLRVLDLAIPVNRPGQFQSFSLSGNENQQSYFQGFSKKILEASFNSDYEEIERV

LLEEQEQKPEQRRGHKGRQQSQETDVIVKISREQIEELSKNAKSNCKKSVSSESEPFNLRSRSPIYSNRFGNFFEITPEKNPQLKDLDIFVNSVEIK

EGSLLLPHFNSRATVILVVNEGKGEVELVGLRNENEQENKKEDEEEEDRNVQVQRFQSKLSSGDVVVIPASHPFSINASSDLFLLGFGINAQN

NQRNFLAGEEDNVISQIQRPVKEVAFPGSAEEVDRLLKNQRQSHFANAQPQQKRKGSQRIRSPF

>gi|29539109|emb|CAD87730.1| allergen Len c 1.0101 [Lens culinaris] Lentil

[SEQ ID NO: 69]

SRSDQENPFIFKSNRFQTIYENENGHIRLLQRFDKRSKIFENLQNYRLLEYKSKPHTIFLPQFTDADFILVVLSGKAILTVLNSNDRNSFNLERGDTI

KLPAGTIAYLANRDDNEDLRVLDLAIPVNRPGQLQSFLLSGTQNQPSFLSGFSKNILEAAFNTEYEEIEKVLLEEQEQKSQHRRSLRDKRQEITNE

DVIVKVSREQIEELSKNAKSSSKKSVSSESEPFNLRSRNPIYSNKFGKFFEITPEKNPQLDLDIFVNSVEIKEGSLLLPNYNSRAIVIVTVNEGKGDF

ELVGQRNENQQEQREENDEEEGQEEETTKQVQRYRARLSPGDVLVIPAGHPVAINASSDLNLIGFGINAKNNQRNFLAGEEDNVISQIQRPV

KELAFPGSSREVDRLLTNQKQSHFANAQPLQIE

Q9M3X6 (Pea)
>gi|164512526|emb|CAP06312.1| cvc [Pisum abyssinicum]

[SEQ ID NO: 70]

MATTVESRFPLLLFPGIIFLASVCVTYANYDEGSETRVPGQRERGRQEGEKEEKRHGEWRPSYEKEEDEEEKQKYRYQREKEDEEEKQKYRYQR

EKKEEKEVQPGRERWEREEDEEQVDEEWRGSQRRQDPEERARLRHREERTKRDRRHKREGEEEERSSESQEQRNPFLFKSNKFLTLFENENG

HIRRLQRFDKRSDLFENLQNYRLVEYRAKPHTIFLPQHIDADLILVVLNGKAILTVLSPNDRNSYNLERGDTIKIPAGTTSYLVNQDDEEDLRVVD

FVIPVNRPGKFEAFGLSENKNQYLRGFSKNILEASLNTKYETIEKVLLEEQEKKPQQLRDRKRRQQGGERDAIIKVSREQIEELRKLAKSSSKKSLPS

EFEPFNLRSHKPEYSNKFGKLFEITPEKKYPQLQDLDILVSCVEINKGALMLPHYNSRAIVVLLVNEGKGNLELLGLKNEQQEREDRKERNNEVQ

RYEARLSPGDVVIIPAGHPVAISASSNLNLLGFGTNAENNQRNFLSGSDDN

>gi|164512538|emb|CAP06318.1| cvc [Lathyrus annuus]

[SEQ ID NO: 71]

MATTIKSRFPLLLLLGIIFLASVCVTWANYDEGSEPRVPGQRERGRQEGEKEEKRHGEWRPSYEEEYDEGLEPKVPGKRERGRQEGEKEEKRHE

EWRPSYEKEEDEEEKQKYNYQREKKEHKEVQPGRERWERKQDEKQVEEDEEPGEEQWRGSKRHEDPEERARLRHREEKTKSYVEDNEETSS

KEGRNPFLFKSNKFLTLFENENGHIRRLQRFDERSDIFENLQNYRLVEYRAKPHTMFLPQHIDADLILVVLNGKAILTVLSPNDRNSYNLERGDT

VKLPAGTTSYLVNQDDEEDLRVVDLAIPVNRPGKFEAFGLSANKNQYLRGFSKNILEASLNTKYETIEKVLLEERRDQKGRQQGQETNAIVKVSR

EQIEELRKLAKSSSKKSLLSESEPLNLRSQNPKYSNKFGKFFEITPKKKYPQLQDLDVSISCVEINKGALLLPHYNSRSIGILLVNEGKGNLELVGFKN

EQQRQRENEETNKKLQRYEARLSSGDVVVIPEGHPVAISASSNLNLLGFGINAANNQRNFLTGSDDN

>gi|164512558|emb|CAP06328.1| cvc [Vicia villosa]

[SEQ ID NO: 72]

MATTIKSRFPVLLLLGIIFLTSVCVTYANYDEGREPSVPGQRERGRQEGEKEEKRHGEWRPSEEDEEEKYKYEEGRVPGQRERGRQEGEKEEKR

HGKWRPSEEEDEEEKYRYEEGSEPRGPGQRETGRQEGEKEKQRPEREPSYEKEEDEEEKQKYQYHREKKEQREVRPGRERFERHEDEEQWRG

IQRHEDPEERARERYRAEIAKRQVEEEREERDIPHEREQRNPFLFKSNKFQTLFQNENGYIRRLQRFDKRSDLFENLQNYRLVEYRAKPHTIFLPQ

HIDADLIIVVLSGRAILTVLSPDDRNSYNLERGDTIKLPAGTTSYLVNQDDEEDLRVVDLAIPVNRPGKVESFLLSGNKNQYLRGFSKNILEASFNT

NYETIERVLLEEQDKESQQSIGQKRRSQRQETNALVKVSREQLEDLKRLAKSSSQEGLSSQFEPINLRSQNPKYSNKFGKVFEITPEKKYPQLQDL

-continued

DLFVSSVDIKEGALMLPHYNSRAIVVLLVNEGRGNLELVGLKNEQQEQREKEDEQQERNNQVQRYEARLSPGDVVIIPAGHPVAVRASSDLNL

LAFGINAENNQRNFLAGSDDN

QODEV5 (Rice)
>gi|83375868|gb|ABC17777.1| waxy [*Oryza rufipogon*]
[SEQ ID NO: 73]

MSALTTSQLATSATGFGIADRSAPSSLLRHGFQGLKPRSPAGGDATSLSVTTSARATPKQQRSVQRGSRRFPSVVVYATGAGMNVVFVGAEM

APWSKTGGLGDVLGGLPPAMAANGHRVMVISPRYDQYKDAWDTSVVAEIKVADRYERVRFFHCYKRGVDRVFVDHPSFLEKVWGKTGEKI

YGPDTGVDYKDNQMRFSLLCQAPRILNLNNNPYFKGTYGEDVVFVCNDWHTGPLASYLKNNYQPNGIYRNAKVAFCIHNISYQGRFAFEDYP

ELNLSERFRSSFDFIDGYDTPVEGRKINWMKAGILEADRVLTVSPYYAEELISGIARGCELDNIMRLTGITGIVNGMDVSEWDPSKDKYITAKYD

ATTAIEAKALNKEALQAEAGLPVDRKIPLIAFIGRLEEQKGPDVMAAAIPELMQEDVQIVLLGTGKKKFEKLLKSMEEKYPGKVRAVVKFNAPLA

HLIMAGADVLAVPSRFEPCGLIQLQGMRYGTPCACASTGGLVDTVIEGKTGFHMGRLSVDCKVVEPSDVKKVAATLKRAIKVVGTPAYEEMV

RNCMNQDLSWKGPAKNWENVLLGLGVAGSAPGIEGDEIAPLAKENVAAP

>gi|297614332|gb|ADI48504.1| glycogen synthetase [*Oryza officinalis*]
[SEQ ID NO: 74]

MSALTTSQLATSATGFGIADRSAPSSLLRHGFQGLKPRSPAGGDASSLSVTTSARATPKQQRSVQRGSRRFPSVVVYATGAGMNVVFVGAEM

APWSKTGGLGDVLGGLPPAMAANGHRVMVISPRHDQYKDAWDTSVVAEIKVADRYERVRFFHCYKRGVDRVFIDHPSFLEKVWGKTGEKI

YGPDTGVDYKDNQMRFSLLCQAALEAPRILNLNNNPYFKGTYGEDVVFVCNDWHTGPLPSYLKNNYQPNGIYRNAKVAFCIHNISYQGRFAF

EDYPELNLSERFRSSFDFIDGYDTPVEGRKINWMKAGILESDRVLTVSPYYAEELISGIARGCELDNIMRLTGITGIVNGMDVSEWDPSKDKYIA

AKYDATTAIEAKALNKEALQAEAGLPVDRKIPLIAFIGRLEEQKGPDVMAAAIPELMQENVQIVLLGTGKKKFEKLLKSMEEKYPGKVRAVVKF

NAPLAHLIMAGADVLAVPSRFEPCGLIQLQGMRYGTPCACASTGGLVDTVIEGKTGFHMGRLSVDCKVVEPSDVQKVATTLKRAIKIVGTPAY

NEMVRNCMNQDLSWKGPAKNWENVLLGLGVAGSAPGVEGEEIAPLAKENVAAP

>gi|389620054|gb|AFK93486.1| granule-bound starch synthase [*Hordeum vulgare* subsp. *vulgare*]
[SEQ ID NO: 75]

MAALATSQLATSGTVLGVTDRFRRPGFQGLRPRNPADAALGMRTIGASAAPKQSRKAHRGSRRCLSVVVRATGSGMNLVFVGAEMAPWS

KTGGLGDVLGGLPPAMAANGHRVMVVSPRYDQYKDAWDTSVISEIKVADEYERVRFFHCYKRGVDRVFIDHPWFLEKVRGKTKEKIYGPDA

GTDYEDNQQRFSLLCQAALEAPRILNLNNNPYFSGPYGEDVVFVCNDWHTGLLACYLKSNYQSNGIYRTAKVAFCIHNISYQGRFSFDDFAQL

NLPDRFKSSFDFIDGYDKPVEGRKINWMKAGILQADKVLTVSPYYAEELISDEARGCELDNIMRLTGITGIVNGMDVSEWDPTKDKFLAVNYDI

TTALEAKALNKEALQAEVGLPVDRKVPLVAFIGRLEEQKGPDVMIAAIPEILKEEDVQIILLGTGKKKFEKLLKSMEEKFPGKVRAVVRFNAPLAH

QMMAGADLLAVTSRFEPCGLIQLQGMRYGTPCVCASTGGLVDTIVEGKTGFHMGRLSVDCNVVEPADVKKVATTLKRAVKVVGTPAYQEM

VKNCMIQDLSWKGPAKNWEDVLLELGVEGSEPGIVGEEIAPLAMENVAAP

P14323 (Rice)
>gi|573918992|ref|XP_006647120.1|PREDICTED: glutelin type-B 2-like [*Oryza brachyantha*]
[SEQ ID NO: 76]

MATTVFSRFSTYFCVLLLCHGSMAQLFNPSTNPWHNPRQGSSRECRFDRLQPFEPLRKVRSEAGVTEYFDEKNELFQCTGTFVIRRVIQPGLL

VPRYTNAPGLVYIIQGRGSIGLTFPGCPATYQQQFQQFLPQEQSQSQKFRDEHQKIHQFRQGDIVALPAGVAHWFYNDGDAPVVAVYVYDV

KNSANQLEPRQREFLLGGNNMRAQQVYGSSAEQHSRQNIFSGFGVEILSEALGISTVTTKRLQSQNDQRGEIIHVKNGLQFLKPTLTQQQEQA

QAQYQEVQYSEQQQTSSRWNGLDENFCTIKARMNIENTSRADTYNPRAGRTTSLNSQKFPILNLVQMSATRVNLYQNAILSTFWNVNAHSL

VYTIQGRARVQVVSNFGKTVFDGELRPGQLLIIPQHYVVLKKAQREGFRYIAIKTNANAFVSQLVGKNSVFRSLPVDVIANVYRISREQARSLKN

NRGEEHGAFAPRSQQQSYPGFSNQSESETSE

>gi|573919041|ref|XP_006647142.1| PREDICTED: glutelin type-B 4-like [*Oryza brachyantha*]
[SEQ ID NO: 77]

MATTTFSRFSIYFCVLLLCHGSMAQLFSPTLNPWHSSRRGGSRDCRFDRLQAFEPLRRVRSEAGVTEYFDERNEQFQCTGTFVIRRVIEPQGLL

VPRYTNTPGVVYIMQGRGSMGLTFPGCPATYQQQFQQFLPEGQSQSQKFRDEHQKIHQFRQGDIVALPAGVAHWFYNEGDTPVVALYVFD

INNSANQLEPRQKDFLLAGNNNREQQVYGRSIEKHSGQNIFSGFNHELLSEALGISTLAAKRLQGQNDHRGEIIRVRNGLQLLKPTFTQQQEQ

AQSQYQVQYSEKQQESTRCNGLDENFCTINARLNIENPSRADTYNPRAGRITHLNNQKFPILNLVQMSATRVNLYQNAILSPYWNVNAHSLV

YMVQGHARVQVVSNLGKTVFNSVLRPGQLLIIPQHYVVLKKAEREGCQYIAFKTNANSIVSQLAGKNSILRAMPVDVVANAYRISREQARDLK

NNRGEELGAFTPKFEQQSYPGLSNESESEASE

>gi|109894635|gb|ABG47337.1| glutelin precursor [*Zizania latifolia*]

[SEQ ID NO: 78]

MNMATINGPTIFFTVCLFLLCHGSLAQLLGQSTSQWQSSHRGSSRQCRFDRLQAFEPVRSVRSQAGTTEFFDASNELFQCAGVSIVRRIIEPRG

LLLPQYTNGATIMYIIQGRGITGQTFPGCPESYQQQFQQSMQAQLTGSQSQSQKFKDEHQKINRFRQGDVIALPAGVAHWCYNDGEVPVVA

IYVIDINNAANQLDPRQRDFLLAGNMRSPQAYRREVENQSQNIFSGFSAELLSEALGISTGVARQLQCQNDQRGEIVREHGLSLLQPYASLQE

QEQKQEQPRERYQVTQHQQSQYGGGCSNGLDETFCAMRIWQNIDNPNLADTYNPRAGRVTNLNSQKFPILNLIQMSAVKVNLYQNALLSP

FWNINSHSVVYVTQGCARVQVVNNNGKTVFNGELRRGQLLIIPQHYVVVKKAQREGCAYIAFKTNPNSMVSHIVGKSSIFRALPTDVLANAY

RISREDAQRLKHNRGDELGAFTPLQYKSYQDVSSVAASS

P14614 (Rice)
>gi|115445309|ref|NP_001046434.1| Os02g0248800 [*Oryza sativa Japonica* Group] >gi|37993738|gb|
AAR06952.1| glutelin type-B [*Oryza sativa Japonica* Group] >gi|47497729|dbj|BAD19794.1|
glutelin type-B [*Oryza sativa Japonica* Group] >gi|113535965|dbj|BAF08348.1| Os02g0248800 [*Oryza
sativa Japonica* Group] >gi|215768942|dbj|BAH01171.1| unnamed protein product [*Oryza sativa
Japonica* Group] >gi|284431772|gb|ADB84627.1| glutelin  [*Oryza sativa Japonica* Group]

[SEQ ID NO: 79]

MTISVFSRFSIYFCVLLLCNGSMAQLFDPATNQWQTHRQGSFRECRFERLQAFEPLQNVRSEAGVTEYFDETNELFQCTGTFVIRRVIQPQGLL

IPRYANTPGMVYIIQGRGSMGLTFPGCPATYQQQSQQFLFQGESQSQKFIDEHQKIHQFRQGDIVVLPTGVAHWFYNDGDTPVVALYVYDI

NNSANQLEPRHREFLLAGKNNRVQQVYGRSIQQHSGQNIFNGFSVEPLSEALNINTVTTKRLQSQNDQRGEIIHVKNGLQLLKPTLTQRQEQE

QAQYQEVQYSEKPQTSSRWNGLEENLCTIKTRLNIENPSRADSYDPRAGRITSLDSQKFPILNIIQMSATRVNLYQNAILTPFWNVNAHSLMYV

IRGRARVQVVSNFGKTVFDGVLRPEQLLIIPQNYVVLKKAQHEGCQYIAINTNANAFVSHLAGVDSVFHALPVDVIANAYCISREEARRLKNNR

GDEYGPFPPRLQQQIYPEFSNESKGETSE

>gi|428674402|gb|AFZ41188.1| glutelin, partial [*Oryza sativa Japonica* Group]

[SEQ ID NO: 80]

LLCHGSMAQIFSLGINPWQNPRQGGSRECRFDRLQAFEPLRKVRHEAGVTEYFDEKNEQFQCTGTLVIRRIIEPQGLLLPRYSNTPGLVYIIQGT

GVLGLTFPGCPATYQKQFRHFGLEGGSQRQGKKLRDENQKIHQFRQGDVVALPSGIPHWFYNEGDTPVVALFVFDVNNNANQLEPRQKEFL

LAGNNIEQQVSNPSINKHSGQNIFNGFNTKLLSEALGVNIEVTRRLQSQNDRRGDIIRVKNGLRLIKPTITQQQEQTQDQYQQIQYHREQRSTS

KYNGLDENFCAIRARLNIENPNHADTYNPRAGRITNLNSQKFSILNLVQMSATRVNLYQNAILSPFWNINAHSLVYTIQGRARVQVVSNHGKA

VFNGVLRPGQLLIIPQNYVVMKKAELEGFQFIAFKTNPNAMVNHIAGKNSVLRAMPVDVIANAYRISRQEARSLKNNRGEEIGAFTPRYQQQ

KIHQEYSNPNESETQ

>gi|226510|prf||1515394A seed storage globulin

[SEQ ID NO: 81]

MATTRFPSLLFYSCIFLLCNGSMAQLFGQSFTPWQSSRQGGLRGCRFDRLQAFEPLRQVRSQAGITEYFDEQNEQFRCAGVSVIRRVIEPGLL

LPQYHNAPGLVYILQGRGFTGLTFPGCPATFQQQFQPFDQARFAQGQSKSQNLKDEHQRVHHIKQGDVVALPAGIVHWCYNDGDAPIVAV

YVFDVNNNANQLEPRQKEFLLAGNNKREQQFGQNIFSGFSVQLLSEALGISQQAAQKIQSQNDQRGEIIRVSQGLQFLKPFVSQQGPVEHQA

YQPIQSQQEQSTQYQVGQSPQYQEGQSTQYQSGQSWDQSFNGLEENFCSLEARQNIENPKRADTYNPRAGRITHLNSKNFPTLNLVQMSA

TRVNLYQNAILSPYWNINAHSVMHMIQGRARVQVVNNHGQTVFNDILRRGQLLIIPQHYVVLKKAEREGCQYISFKTTPNSMVSYIAGKTSIL

RALPVDVLANAYRISRQESQNLKNNRGEEFGAFTPKFAQTGSQSYQDEGESSSTEKASE

P07728 (Rice)
>gi|531874314|gb|AGT59174.1| glutelin, partial [*Oryza sativa Indica* Group]

[SEQ ID NO: 82]

CRFDRLQAFEPIRSVRSQAGTTEFFDVSNEQFQCTGVSAVRRVIEPRGLLLPHYTNGASLVYIIQGRGITGPTFPGCPESYQQQFQQSGQAQLT

ESQSQSHKFKDEHQKIHRFRQGDVIALPAGVAHWCYNDGEVPVVAIYVTDLNNGANQLDPRQRDFLLAGNKRNPQAYRREVEERSQNIFSG

FSTELLSEALGVSSQVARQLQCQNDQRGEIVREHGLSLLQPYASLQEEQGQVQSRERYQEGQYQQSQYGSGCSNGLDETFCTMKVRQNI

DNPNRADTYNPRAGRVTNLNTQNFPILNLVQMSAVKVNLYQNALLSPFWNINAHSVVYITQGRARVQVVNNNGKTVFNGELRRGQLLIIPQ

HYAVVKKAQREGCAYIAFKTNPNSMVSHIAGKSSIFRALPNDVLANAYRISREEAQRLKHNRGDEFGAFTPIQYKSYQDVYNAAESS

>gi|109894635|gb|ABG47337.1| glutelin precursor [*Zizania latifolia*]

[SEQ ID NO: 83]

MNMATINGPTIFFTVCLFLLCHGSLAQLLGQSTSQWQSSHRGSSRQCRFDRLQAFEPVRSVRSQAGTTEFFDASNELFQCAGVSIVRRIIEPRG
LLLPQYTNGATIMYIIQGRGITGQTFPGCPESYQQQFQQSMQAQLTGSQSQSQKFKDEHQKINRFRQGDVIALPAGVAHWCYNDGEVPVVA
IYVIDINNAANQLDPRQRDFLLAGNMRSPQAYRREVENQSQNIFSGFSAELLSEALGISTGVARQLQCQNDQRGEIVRVEHGLSLLQPYASLQE
QEQKQEQPRERYQVTQHQQSQYGGGCSNGLDETFCAMRIWQNIDNPNLADTYNPRAGRVTNLNSQKFPILNLIQMSAVKVNLYQNALLSP
FWNINSHSVVYVTQGCARVQVVNNNGKTVFNGELRRGQLLIIPQHYVVVKKAQREGCAYIAFKTNPNSMVSHIVGKSSIFRALPTDVLANAY
RISREDAQRLKHNRGDELGAFTPLQYKSYQDVSSVAASS

>gi|472867|emb|CAA52764.1| 11S globulin [*Avena sativa*]

[SEQ ID NO: 84]

MATTSFPSMLFYFCIFLLFHGSMAQLFGQSSTPWQSSRQGGLRGCRFDRLQAFEPLRQVRSQAGITEYFDEQNEQFRCTGVSVIRRVIEPQGL
VLPQYHNAPALVYILQGRGFTGLTFPGCPATFQQQFQPFDQSQFAQGQRQSQTIKDEHQRVQRFKQGDVVALPAGIVHWCYNDGDAPIVA
IYVFDVNNNANQLEPRQKEFLLAGNNKREQQSGNNIFSGLSVQLLSEALGISQQAAQRIQSQNDQRGEIIRVSQGLQFLKPIVSQQVPGEQQV
YQPIQTQEGQATQYQVGQSTQYQVGKSTPYQGGQSSQYQAGQSWDQSFNGLEENFCSLEARKNIENPQHADTYNPRAGRITRLNSKNFPIL
NIVQMSATRVNLYQNAILSPFWNINAHSVIYMIQGHARVQVVNNNGQTVFNDILRRGQLLIVPQHFVVLKKAEREGCQYISFKTNPNSMVSH
IAGKSSILRALPIDVLANAYRISRQEARNLKNNRGEEFGAFTPKLTQKGFQSYQDIEEGSSSPVRASE

---

The invention claimed is:

1. A comestible powder composition comprising a peptide that is up to 50 amino acids and comprises an amino acid sequence having at least 80% identity to the amino acid sequence SEQ ID NO: 154.

2. The comestible powder composition of claim 1, wherein the 3 amino acid sequence has 1 amino acid deletion compared with SEQ ID NO: 154.

3. The comestible powder composition of claim 1, wherein the comestible powder is a nutritional supplement or a food additive.

4. The comestible powder composition of claim 1, wherein the peptide is chemically modified.

5. The comestible powder composition of claim 4, wherein the peptide is chemically modified to increase stability or efficacy of the peptide.

6. The comestible powder composition of claim 1, wherein the peptide is chemically modified by modifications to side chains, by incorporation of an N-terminal protecting group, by incorporation of a C-terminal protecting group, by incorporation of a side-chain protecting group, by cyclisation, by incorporation of unnatural amino acids.

7. The comestible powder composition of claim 1, wherein the peptide is conjugated, linked, or fused to a binding partner.

8. The comestible powder composition of claim 7, wherein the binding partner is a molecular weight increasing compound, lipophilic group, or a binding partner that increases the half-life or lipophilicity of the conjugate compared with the half-life or lipophilicity of the peptide.

9. The comestible powder composition of claim 1, wherein the peptide consists of an amino acid sequence that is at least 80% identical but less than 100% identical to SEQ ID NO: 154.

10. A non-therapeutic composition for improving muscle status in a human or animal comprising a peptide that is up to 50 amino acids and comprises an amino acid sequence having at least 80% identity to the amino acid sequence SEQ ID NO: 154.

11. A therapeutic composition comprising a peptide that is up to 50 amino acids and comprises an amino acid sequence having at least 80% identity to the amino acid sequence SEQ ID NO: 154 and a pharmaceutically acceptable excipient.

12. A confectionary bar or beverage comprising the comestible powder composition of claim 1.

* * * * *